(12) United States Patent
Okazaki

(10) Patent No.: US 10,428,194 B2
(45) Date of Patent: Oct. 1, 2019

(54) MODIFIED ACRYLIC RESIN CURED PRODUCT, AND LAMINATE THEREOF, AND PRODUCTION METHODS THEREFOR

(71) Applicant: MITSUI CHEMICALS, INC., Minato-ku, Tokyo (JP)

(72) Inventor: Koju Okazaki, Ichihara (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 128 days.

(21) Appl. No.: 15/553,208

(22) PCT Filed: Feb. 24, 2016

(86) PCT No.: PCT/JP2016/055432
§ 371 (c)(1),
(2) Date: Aug. 24, 2017

(87) PCT Pub. No.: WO2016/136811
PCT Pub. Date: Sep. 1, 2016

(65) Prior Publication Data
US 2018/0030230 A1 Feb. 1, 2018

(30) Foreign Application Priority Data

Feb. 25, 2015 (JP) .................. 2015-034993

(51) Int. Cl.
*C08J 7/18* (2006.01)
*B32B 27/30* (2006.01)
(Continued)

(52) U.S. Cl.
CPC ................. *C08J 7/18* (2013.01); *B32B 27/30* (2013.01); *B32B 27/308* (2013.01); *B32B 37/14* (2013.01);
(Continued)

(58) Field of Classification Search
CPC ....... C08J 7/18; C08J 2351/00; B32B 27/308; B32B 37/14; B32B 2307/728; B32B 2307/412; C08F 267/06; G02B 1/18
See application file for complete search history.

(56) References Cited

U.S. PATENT DOCUMENTS

| 5,994,488 A | 11/1999 | Yokota et al. |
| 8,772,422 B2 | 7/2014 | Saxena et al. |

(Continued)

FOREIGN PATENT DOCUMENTS

| JP | 06-329736 A | 11/1994 |
| JP | 09-176252 A | 7/1997 |

(Continued)

OTHER PUBLICATIONS

Extended Search Report issued by the European Patent Office in corresponding European Patent Application No. 16755555.6-1102 dated Oct. 8, 2018 (5 pages).

(Continued)

*Primary Examiner* — Shane Fang
(74) *Attorney, Agent, or Firm* — Buchanan, Ingersoll & Rooney PC

(57) ABSTRACT

The purpose of the present invention is to provide a modified acrylic resin cured product, particularly, a modified acrylic resin film, having excellent lubricity and excellent transparency, and a laminate including the modified acrylic resin film. The modified acrylic resin cured product (C) according to the present invention is obtained by treating the surface of a cured product (X) including an acrylic resin by using a compound (A) containing, in each molecule, one or more anionic hydrophilic groups forming an ion pair with an onium ion of an amino silicone, and one or more groups selected from the group consisting of a group containing a (Continued)

polymerizable carbon-carbon double bond, an amino group, a mercapto group and a hydroxy group.

12 Claims, 1 Drawing Sheet

(51) Int. Cl.

| | | |
|---|---|---|
| C08F 20/38 | (2006.01) | |
| C08F 2/48 | (2006.01) | |
| C08J 7/04 | (2006.01) | |
| C08J 7/12 | (2006.01) | |
| C08F 265/06 | (2006.01) | |
| C08F 8/44 | (2006.01) | |
| G02B 1/10 | (2015.01) | |
| G02B 1/14 | (2015.01) | |
| G02B 1/18 | (2015.01) | |
| B32B 37/14 | (2006.01) | |
| C08F 267/06 | (2006.01) | |
| C08L 83/04 | (2006.01) | |
| C09D 183/08 | (2006.01) | |
| C09D 183/10 | (2006.01) | |
| C08G 77/388 | (2006.01) | |
| C08G 77/392 | (2006.01) | |
| C08G 77/395 | (2006.01) | |
| C08L 83/08 | (2006.01) | |
| C08L 83/10 | (2006.01) | |

(52) U.S. Cl.
CPC ............. *C08F 2/48* (2013.01); *C08F 8/44* (2013.01); *C08F 20/38* (2013.01); *C08F 265/06* (2013.01); *C08F 267/06* (2013.01); *C08G 77/388* (2013.01); *C08G 77/392* (2013.01); *C08G 77/395* (2013.01); *C08J 7/04* (2013.01); *C08J 7/12* (2013.01); *C08L 83/04* (2013.01); *C08L 83/08* (2013.01); *C08L 83/10* (2013.01); *C09D 183/08* (2013.01); *C09D 183/10* (2013.01); *G02B 1/10* (2013.01); *G02B 1/14* (2015.01); *G02B 1/18* (2015.01); *B32B 2307/412* (2013.01); *B32B 2307/728* (2013.01); *C08J 2351/00* (2013.01); *C08J 2383/04* (2013.01)

(56) References Cited

U.S. PATENT DOCUMENTS

| | | |
|---|---|---|
| 2006/0263611 A1 | 11/2006 | Weberg et al. |
| 2009/0191373 A1 | 7/2009 | Okazaki et al. |
| 2009/0234089 A1 | 9/2009 | Ueyama et al. |
| 2012/0184698 A1 | 7/2012 | Ueyama et al. |
| 2013/0121948 A1 | 5/2013 | Dussaud et al. |
| 2013/0156959 A1 | 6/2013 | Okazaki |
| 2013/0172419 A1 | 7/2013 | Saxena et al. |
| 2014/0256870 A1 | 9/2014 | Okazaki et al. |
| 2015/0126682 A1* | 5/2015 | Okazaki ............... C08J 7/18 525/326.6 |
| 2016/0032036 A1 | 2/2016 | Okazaki |
| 2016/0237199 A1* | 8/2016 | Yoshida ............... C08F 290/06 |
| 2017/0217137 A1* | 8/2017 | Vitner ............... C09D 7/40 |

FOREIGN PATENT DOCUMENTS

| | | |
|---|---|---|
| JP | 10-212355 A | 8/1998 |
| JP | 2001-098007 A | 4/2001 |
| JP | 2005-266747 A | 9/2005 |
| JP | 2006-051690 A | 2/2006 |
| JP | 2007-331154 A | 12/2007 |
| JP | 2008-545523 A | 12/2008 |
| JP | 2011-229734 A | 11/2011 |
| JP | 2012-007073 A | 1/2012 |
| JP | 2015-500353 A | 1/2015 |
| KR | 10-2014-0116905 A | 10/2014 |
| WO | WO 2007/064003 A1 | 6/2007 |
| WO | WO 2009/099164 A1 | 8/2009 |
| WO | WO 2012/014829 A1 | 2/2012 |
| WO | 2013/103536 A1 | 7/2013 |
| WO | WO 2013/187311 A1 | 12/2013 |
| WO | 2014/168122 A1 | 10/2014 |

OTHER PUBLICATIONS

Notification of Reason for Refusal issued by the Korean Intellectual Property Office in corresponding Korean Patent Application No. 10-2017-7025299 dated Jul. 10, 2018 (15 pages including partial English translation).

International Search Report (PCT/ISA/210) dated May 31, 2016, by the Japanese Patent Office as the International Searching Authority for International Application No. PCT/JP2016/055432.

Written Opinion (PCT/ISA/237) dated May 31, 2016, by the Japanese Patent Office as the International Searching Authority for International Application No. PCT/JP2016/055432.

Trend, annual research report by Toagosei Co., LTD., Feb. 1999, issue, pp. 39-44 (partial English translation included).

Koubunshi High Polymers, The Society of Polymer Science, 1995, vol. 44(5), p. 307 (English translation included).

Mirai Zairyou, Expected Materials for the Future, 2002, vol. 2(1), pp. 36-41 (partial English translation included).

* cited by examiner

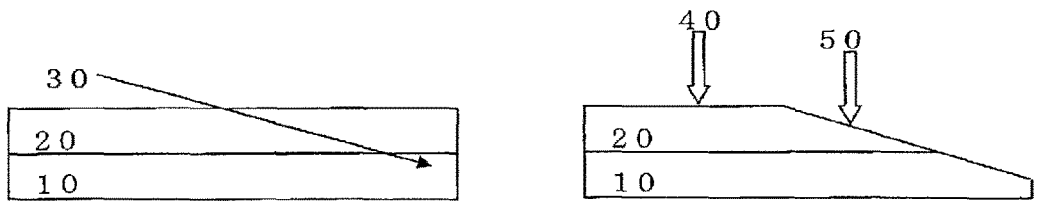

MODIFIED ACRYLIC RESIN CURED PRODUCT, AND LAMINATE THEREOF, AND PRODUCTION METHODS THEREFOR

TECHNICAL FIELD

The present invention relates to modified acrylic resin cured products excellent in slipperiness and transparency, modified acrylic resin films in particular, and to laminates having the modified acrylic resin films layered.

BACKGROUND ART

In recent years, there have been increasing demands that substrates made of organic materials such as plastics and inorganic materials such as glass be improved in terms of antifogging properties and antifouling properties.

To solve the fogging problems, a method has been proposed in which an antifogging coating containing a reactive surfactant and an acrylic oligomer is applied to provide enhanced hydrophilicity and water absorption (see, for example, Non Patent Document 1). The fouling problems have been addressed by methods in which the hydrophilicity of the surface of materials is enhanced so that fouling such as airborne hydrophobic substances which have become attached to surfaces such as exterior walls can be detached and removed from the surfaces by water spray or rainfall (see, for example, Non Patent Documents 2 and 3).

Further, hydrophilic materials have been proposed in which a monomer composition which is capable of cross-linking polymerization is applied onto the surface of a substrate and is incompletely polymerized while controlling the UV dose to form a crosslinked polymer, and subsequently a hydrophilic monomer is applied and UV rays are applied again to block- or graft-polymerize the hydrophilic monomer to the surface of the crosslinked polymer (Patent Document 1 and Patent Document 2).

However, because this simple block- or graft-polymerization of a hydrophilic monomer to the surface of a substrate results in the surface having a high surface energy though hydrophilic groups are present only on the surface, the surface becomes less slippery and causes friction which easily cuts and removes the hydrophilicity, posing a drawback in that the hydrophilicity is reduced in a short period and this does not allow the antifogging properties and fouling removal properties (antifouling properties) to be maintained for a prolonged time.

To solve the above problem, the present inventors have proposed monolayer films in which specific anionic hydrophilic groups have a concentration gradient (an uneven distribution) between the inside of the film and the film surface and the anionic hydrophilic groups are present in a higher concentration near the surface (Patent Document 3 and Patent Document 4). Films obtained by the present invention are component gradient films having hydrophilic groups also in their inside; are excellent in durability, transparent, very highly hydrophilic; are excellent in antifogging properties, antifouling properties, antistatic properties, quick-drying properties (whether the drying rate of attached water is fast or not), and chemical resistance; and, moreover, are rigid and excellent in abrasiveness.

RELATED ART DOCUMENTS

Patent Documents

Patent Document 1: JP 2001-98007 A
Patent Document 2: JP 2011-229734 A
Patent Document 3: WO 2007/064003
Patent Document 4: WO 2012/014829

Non Patent Documents

Non Patent Document 1: TREND, annual research report by TOAGOSEI CO., LTD., 1999, February issue, pp. 39-44
Non Patent Document 2: Koubunshi (Polymers), 44(5), p. 307
Non Patent Document 3: Mirai Zairyou (Future materials), 2(1), pp. 36-41

SUMMARY OF THE INVENTION

Problems to be Solved by the Invention

As with films described in the aforementioned Patent Document 3, films which are transparent, highly hydrophilic, and excellent in abrasiveness may be exposed to wiping-off of fouling, when applied to optical components such as eyeglass lenses. Such films may also be required to have a high slipperiness so that the fouling can be smoothly wiped off.

An object of the present invention is to provide modified acrylic resin cured products excellent in slipperiness and transparency, modified acrylic resin films in particular, and laminates having the modified acrylic resin films layered.

Means for Solving the Problems

To achieve the above object, the present inventors have carried out extensive studies and have completed the invention by finding out that cured products, particularly films, which have a high slipperiness can be provided by treating the surface of a cured product composed of an acrylic resin with a compound (A) having, in the molecule, one or more of anionic hydrophilic groups forming an ion pair with a specific onium ion and one or more of groups selected from the group consisting of groups containing a polymerizable carbon-carbon double bond, amino groups, mercapto groups, and hydroxyl groups.

In other words, the present invention relates to the following items [1] to [14].

[1] A modified acrylic resin cured product (C) obtained by treating the surface of a cured product (X) composed of an acrylic resin with a compound (A) having, in the molecule, one or more of anionic hydrophilic groups forming an ion pair with an onium ion of an amino silicone, and one or more of groups selected from the group consisting of groups containing a polymerizable carbon-carbon double bond, amino groups, mercapto groups, and hydroxyl groups.

[2]

The modified acrylic resin cured product (C) according to [1], wherein the amino silicone has a molecular weight of 100 to 1,000,000.

[3]
The modified acrylic resin cured product (C) according to [2], wherein the amino silicone having a molecular weight of 100 to 1,000,000 is one or more selected from compounds represented by the following general formulae (a1) to (a3):

General Formula (a1):

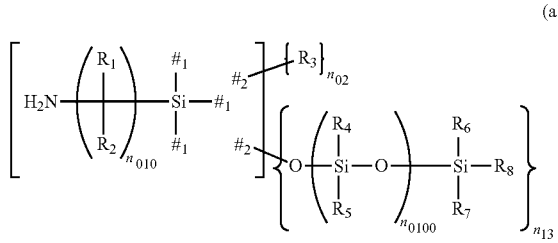

(a1)

(wherein in the formula (a1), $R_1$ to $R_8$ are independently a hydrogen atom, a $C_{1-6}$ alkyl group, or a $C_{1-6}$ alkoxy group; $n_{010}$ is an integer of 0 to 10; $n_{0100}$ is an integer of 0 to 100; $n_{02}$ is an integer of 0 to 2; $n_{13}$ is an integer of 1 to 3; $n_{02}+n_{13}=3$; $\#_1$ and $\#_2$ represent bonding hands; and $\#_1$ and $\#_2$ are bonded together);

General Formula (a2):

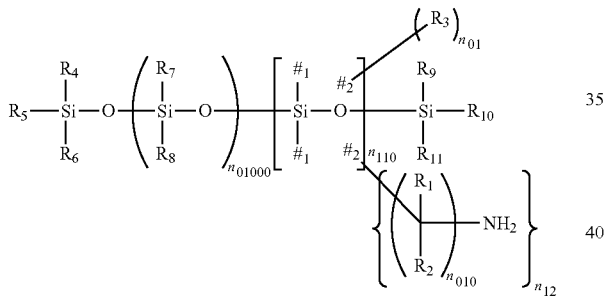

(a2)

(wherein in the formula (a2), $R_1$ to $R_{11}$ are independently a hydrogen atom, a $C_{1-6}$ alkyl group, or a $C_{1-6}$ alkoxy group; $n_{01000}$ is an integer of 0 to 1000; $n_{110}$ is an integer of 1 to 10; $n_{010}$ is an integer of 0 to 10; $n_{12}$ is an integer of 1 to 2; $n_{0l}$ is an integer of 0 to 1; $n_{0l}+n_{12}=2$; $\#_1$ and $\#_2$ represent bonding hands; $\#_1$ and $\#_2$ are bonded together; and the compounds represented by the formula (a2) do not include the compounds represented by the formula (a1));

General Formula (a3):

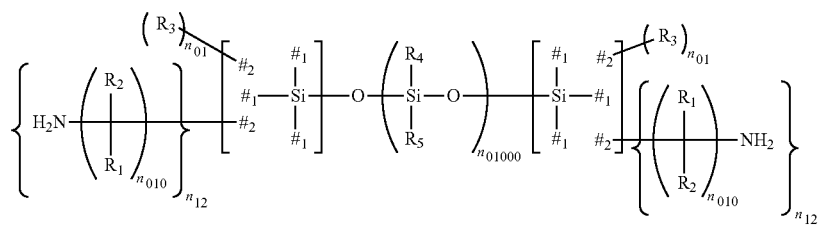

(a3)

(wherein in the formula (a3), $R_1$ to $R_5$ are independently a hydrogen atom, a $C_{1-6}$ alkyl group, or a $C_{1-6}$ alkoxy group; $n_{o1000}$ is an integer of 0 to 1000; $n_{010}$ is an integer of 0 to 10; $n_{01}$ is an integer of 0 to 2; $n_{12}$ is an integer of 1 to 3; $n_{01}+n_{12}=3$; $n_{01}$s and $n_{12}$s each may be the same as or different from one another; $\#_1$ and $\#_2$ represent bonding hands; and $\#_1$ and $\#_2$ are bonded together).

[4]
The modified acrylic resin cured product (C) according to any of [1] to [3], wherein the surface treatment is carried out in the copresence of
a compound (A') having, in the molecule,
one or more of anionic hydrophilic groups forming an ion pair with one or more selected from the group consisting of hydrogen ions, alkali metal ions, alkaline earth metal ions, ammonium ions, and amine ions other than an onium ion of the amino silicone, and
one or more of groups selected from the group consisting of groups containing a polymerizable carbon-carbon double bond, amino groups, mercapto groups, and hydroxyl groups.

[5]
The modified acrylic resin cured product (C) according to any of [1] to [4], wherein the compound (A) is one or more selected from compounds represented by the general formulae (A1) to (A6):

General Formula (A1):

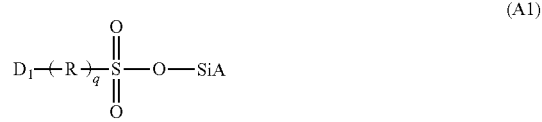

(A1)

(wherein in the formula (A1), $D_1$ is a (meth)acryloyloxy group (only when q is 1), a (meth)acryloylthio group (only when q is 1), a (meth)acrylamido group (only when q is 1), a vinyl group, an isopropenyl group, a (meth)allyl group, a styryl group, a mercapto group, an amino group, a methylamino group, or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups, and ester groups; and q is 0 or 1);

General Formula (A2):

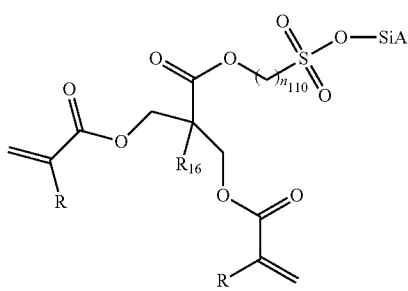

(wherein in the formula (A2), R represents a hydrogen atom or a methyl group; Rs may be the same as or different from one another; $R_{16}$ is a hydrogen atom or a $C_{1-6}$ alkyl group; SiA is an onium ion of an amino silicone having a molecular weight of 100 to 1,000,000; and $n_{110}$ is an integer of 1 to 10);

General Formula (A3):

(wherein in the formula (A3), $D_1$ is a (meth)acryloyloxy group (only when q is 1), a (meth)acryloylthio group (only when q is 1), a (meth)acrylamido group (only when q is 1), a vinyl group, an isopropenyl group, a (meth)allyl group, a styryl group, a mercapto group, an amino group, a methylamino group or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups, and ester groups; and q is 0 or 1);

General Formula (A4):

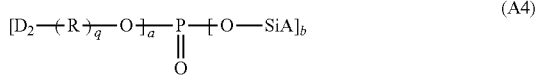

(wherein in the formula (AA), $D_2$ is a (meth)acryloyloxy group, a (meth)acryloylthio group, a (meth)acrylamido group, a vinyl group, an isopropenyl group, a (meth)allyl group, a styryl group, a mercapto group, an amino group, a methylamino group or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups, and ester groups; a and b are independently an integer of 1 or 2; a+b=3; when a is 2, $D_2$s and Rs each may be the same as or different from one another; when b is 2, SiAs may be the same as or different from one another; and q is 0 or 1);

General Formula (A5):

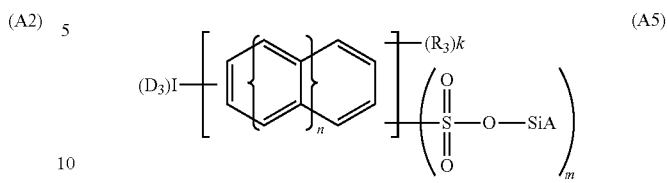

(wherein in the formula (A5), $D_3$, $R_3$, and $SO_3SiA$ are groups bonded to carbons on rings included in the formula; $D_3$ is independently a vinyl group, an isopropenyl group, a (meth)allyl group, a styryl group, a mercapto group, an amino group, a methylamino group, an ethylamino group, or a hydroxyl group; SiA is an onium ion of an amino silicone having a molecular weight of 100 to 1,000,000; $R_3$ is independently a hydrogen atom, a methyl group, an ethyl group, a methoxy group, an ethoxy group, a fluorine atom, a chlorine atom, a bromine atom, or an iodine atom; k is an integer of 0 to 10; l and m are independently an integer of 1 to 11; k+l+m=6+2n; n is an integer of 0 to 3; when l is 2 or greater, $D_3$s may be the same as or different from one another; when k is 2 or greater, $R_3$s may be the same as or different from one another; and when m is 2 or greater, SiAs may be the same as or different from one another);

General Formula (A6):

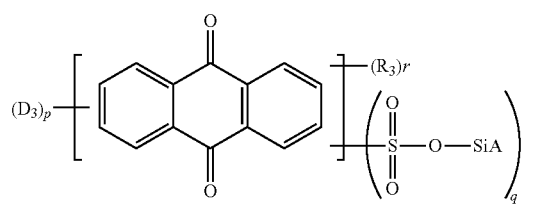

(wherein in the formula (A6), $D_3$, $R_3$, and $SO_3SiA$ are groups bonded to carbons on rings included in the formula; $D_3$ is independently a vinyl group, an allyl group, an isopropenyl group, a styryl group, a mercapto group, an amino group, a methylamino group, an ethylamino group, or a hydroxyl group; SiA is an onium ion of an amino silicone having a molecular weight of 100 to 1,000,000; $R_3$ is independently a hydrogen atom, a methyl group, an ethyl group, a methoxy group, an ethoxy group, a fluorine atom, a chlorine atom, a bromine atom, or an iodine atom; r is an integer of 0 to 6; q and p are independently an integer of 1 to 7; p+q+r=8; when p is 2 or greater, $D_3$s may be the same as or different from one another; when r is 2 or greater, $R_3$s may be the same as or different from one another; and when q is 2 or greater, SiAs may be the same as or different from one another).

[6]

The modified acrylic resin cured product (C) according to [5], wherein the compound represented by the general formula (A1) is a compound represented by the general formula (A7):

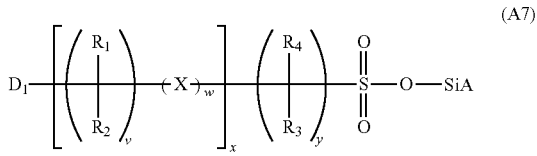
(A7)

(wherein in the formula (A7), $D_1$ is a (meth)acryloyloxy group (when any of x and y is 1 or greater), a (meth)acryloylthio group (when any of x and y is 1 or greater), a (meth)acrylamido group (when any of x and y is 1 or greater), a vinyl group, an isopropenyl group, a (meth)allyl group, a styryl group, a mercapto group, an amino group, a methylamino group or an ethylamino group;
X is an oxygen atom, a sulfur atom, —NH—, or —NCH$_3$—;
SiA is an onium ion of an amino silicone having a molecular weight of 100 to 1,000,000; $R_1$ to $R_4$ are independently a hydrogen atom, a $C_{1-6}$ alkyl group, or a $C_{1-6}$ alkoxy group; v and y are independently an integer of 0 to 10; w is 0 or 1 (when any of v and y is 0, w is 0); x is an integer of 0 to 10; when v is 2 or greater, $R_1$s and $R_2$s each may be the same as or different from one another; when y is 2 or greater, $R_3$s and $R_4$s each may be the same as or different from one another; when x is 2 or greater, $R_1$s and $R_2$s each may be the same as or different from one another).

[7]
The modified acrylic resin cured product (C) according to any of [1] to [6], which is a modified acrylic resin film.

[8]
The modified acrylic resin cured product (C) according to [7],
wherein the cured product (X) composed of an acrylic resin is
an acrylic resin film (Xm1) which has an anionic hydrophilic group and in which the concentration of the anionic hydrophilic groups at the surface is higher than the concentration of the anionic hydrophilic groups at the depth of half the film thickness from the surface;

[9]
A laminate including a substrate and the modified acrylic resin cured product (C) according to [7] or [8].

[10]
A method for producing a modified acrylic resin film (Cm), including the following step (S1):
Step (S1): the step of treating the surface of an acrylic resin film (Xm)
with a compound (A) having, in the molecule,
one or more of anionic hydrophilic groups forming an ion pair with an onium ion of an amino silicone, and
one or more of groups selected from the group consisting of groups containing a polymerizable carbon-carbon double bond, amino groups, mercapto groups, and hydroxyl groups.

[11]
A method for producing a modified acrylic resin film (Cm), including the following step (S1):
Step (S1): the step of treating the surface of an acrylic resin film (Xm1) which has an anionic hydrophilic group and in which the concentration of the anionic hydrophilic groups at the surface is higher than the concentration of the anionic hydrophilic groups at the depth of half the film thickness from the surface
with a compound (A) having, in the molecule,
one or more of anionic hydrophilic groups forming an ion pair with an onium ion of an amino silicone, and
one or more of groups selected from the group consisting of groups containing a polymerizable carbon-carbon double bond, amino groups, mercapto groups, and hydroxyl groups.

[12]
A method for producing a laminate including a substrate and a modified acrylic resin film (Cm), including the following steps (S0) and (S1):
Step (S0): the step of forming an acrylic resin film (Xm) on the substrate;
Step (S1): the step of forming the modified acrylic resin film (Cm) by treating
the surface of the acrylic resin film (Xm)
with a compound (A) having, in the molecule,
one or more of anionic hydrophilic groups forming an ion pair with an onium ion of an amino silicone, and
one or more of groups selected from the group consisting of groups containing a polymerizable carbon-carbon double bond, amino groups, mercapto groups, and hydroxyl groups.

[13]
A method for producing a laminate including a substrate and a modified acrylic resin film (Cm), including the following steps (S0-1) and (S1-1):
Step (S0-1): the step of forming, on the substrate, an acrylic resin film (Xm1) which has an anionic hydrophilic group and in which the concentration of the anionic hydrophilic groups at the surface is higher than the concentration of the anionic hydrophilic groups at the depth of half the film thickness from the surface;
Step (S1-1): the step of forming the modified acrylic resin film (Cm) by treating the surface of the acrylic resin film (Xm1)
with a compound (A) having, in the molecule,
one or more of anionic hydrophilic groups forming an ion pair with an onium ion of an amino silicone, and
one or more of groups selected from the group consisting of groups containing a polymerizable carbon-carbon double bond, amino groups, mercapto groups, and hydroxyl groups.

[14]
The method for producing a laminate according to [13], wherein the acrylic resin film (Xm1) is such that the concentration of the anionic hydrophilic groups at the surface opposite to the side adjacent to the substrate constituting the laminate is higher than the concentration of the anionic hydrophilic groups at the depth of half the film thickness from the surface.

Effect of the Invention

The present invention can provide cured products, particularly films, excellent in slipperiness and transparency. The present invention can also provide various kinds of laminates in which the films according to the present invention are layered on a substrate and the like.

BRIEF DESCRIPTION OF THE DRAWING

The FIGURE is a view illustrating the preparation of samples in Examples.

DESCRIPTION OF EMBODIMENTS

[Modified Acrylic Resin Cured Product (C)]
A modified acrylic resin cured product (C) according to the present invention is a cured product obtained by treating, with the undermentioned compound (A), the surface of a cured product (X) composed of an acrylic resin.

As used herein, the term "cured product" refers to a product which is not in the softened and fluidized state but in the solidified state. In addition, as obvious from the description "obtained by treating the surface of a cured product (X)", both the cured product (X) and the modified acrylic resin cured product (C) according to the present invention have a surface and some shape.

<Cured Product (X) Composed of Acrylic Resin>

In the present invention, a cured product which undergoes surface treatment with the undermentioned compound (A) is a cured product (X) composed of an acrylic resin (hereinafter may be referred to simply as "cured product (X)"). In other words, in the present invention, this cured product (X) serves as a base for obtaining a modified acrylic resin cured product (C) according to the present invention.

Here, an acrylic resin that constitutes the cured product (X) used in the present invention is not limited to a particular one but may be a known acrylic resin. In a typical aspect of the present invention, however, an acrylic resin that contains a constituent unit having an anionic hydrophilic group can preferably be used as an acrylic resin that constitutes the cured product (X). Here, examples of anionic hydrophilic groups include hydrophilic functional groups selected from sulfonic groups, carboxyl groups, or phosphoric groups, and, of these, sulfonic groups are particularly preferable because higher hydrophilicity is imparted to the surface.

In view of the shape of the cured product (X), the cured product (X) is an object to which surface treatment is carried out with the undermentioned compound (A), and naturally, the cured product (X) itself should have at least one surface to which such surface treatment is to be carried out. To this extent, the cured product (X) is not limited to a particular shape but may be film-like, plate-like, or block-like. In addition, considering that the modified acrylic resin cured product (C) is obtained by treating the surface of the cured product (X) with the compound (A), the cured product (X) may have a shape which the resulting modified acrylic resin cured product (C) should have as a final molded product. In a typical aspect of the present invention, however, the cured product (X) in the film-like shape is preferably adopted out of the products. In other words, in a preferred aspect of the present invention, the cured product (X) composed of an acrylic resin is a film-like cured product composed of an acrylic resin, i.e., an acrylic resin film (hereinafter referred to as "acrylic resin film (Xm)"). This means that, in a preferred aspect of the present invention, the modified acrylic resin cured product (C) obtained from the cured product (X) is a modified acrylic resin film, in other words, specifically a modified acrylic resin film (Cm) obtained by treating the surface of the acrylic resin film (Xm) with the compound (A). Such a modified acrylic resin cured product (C) and a modified acrylic resin film (Cm) will be described later.

Here, an acrylic resin that constitutes such an acrylic resin film (Xm) may or may not have an anionic hydrophilic group. In addition, in the acrylic resin film (Xm), the distribution of the anionic hydrophilic groups may be uniform or uneven. However, the acrylic resin film (Xm) used in the present invention as the cured product (X) composed of an acrylic resin is particularly preferably an acrylic resin film (Xm1) which has an anionic hydrophilic group and in which the concentration of the anionic hydrophilic groups at the surface is higher than the concentration of the anionic hydrophilic groups at the depth of half the film thickness from the surface (hereinafter may also be referred to as "acrylic resin film (Xm1)").

Below, such an "acrylic resin film (Xm1)" will be described. Out of acrylic resin films (Xm) that can become cured products (X), those which do not fall under the "acrylic resin film (Xm1)" will be described in the section "Acrylic Resin Film (Xm0)" as undermentioned.

<<Acrylic Resin Film (Xm1)>>

Examples of cured products (X) which particularly preferably undergo surface treatment with the undermentioned compound (A) include an acrylic resin film (Xm1) which has an anionic hydrophilic group and in which the concentration of the anionic hydrophilic groups at the surface is higher than the concentration of the anionic hydrophilic groups at the depth of half the film thickness from the surface. Herein, the acrylic resin film (Xm1) may be referred to as "film with anionic hydrophilic groups gradient (gradient film)" or simply "gradient film".

The anionic hydrophilic groups of the acrylic resin film (Xm1) that are used in the present invention are analyzed by TOF-SIMS. The property that the concentration of the anionic hydrophilic groups at the surface is higher than the concentration of the anionic hydrophilic groups at the depth of half the film thickness from the surface is usually represented as follows. That is, using the anion concentration ratio Sa/Da (the ratio of the anion concentration on the film surface, Sa, to the anion concentration at the depth of half the film thickness from the surface, Da), any ratio Sa/Da exceeding 1.0 is defined to indicate that the concentration of the anionic hydrophilic groups at the surface is higher than the concentration of the anionic hydrophilic groups at the depth of half the film thickness from the surface. This Sa/Da may be also referred to as the degree of the gradient of anionic hydrophilic groups.

Here, as the acrylic resin film (Xm1), an acrylic resin-based hydrophilic gradient film having a degree of the gradient of anionic hydrophilic groups (Sa/Da) of 1.1 or greater is preferably used. Further, the acrylic resin film (Xm1) preferably has a higher surface hydrophilicity, and preferably has a water contact angle of 30° or less, more preferably 20° or less, still more preferably 10° or less.

The acrylic resin film (Xm1) used in the present invention has anionic hydrophilic groups in high concentrations at the surface and inside near the surface. In the treatment with the undermentioned hydrophilic compound (A), this configuration allows the film to exhibit high affinity for the hydrophilic compound (A). As a result, it is probable that the treatment takes place without fail on the surface to allow a large number of anionic hydrophilic groups to be grafted, while at the same time the penetration of the hydrophilic compound into an inner portion of the film near the surface is facilitated and the grafting of the anionic hydrophilic groups is effected even in the inside of the film. Thus, high concentrations of the anionic hydrophilic groups on and near the film surface may be obtained more easily when the acrylic resin films (Xm1) are treated with the compound (A) than when other film materials are treated with the hydrophilic compound (A). As a result, hydrophilicity is markedly increased. Even if the surface has become degraded or decomposed to some degree, the anionic hydrophilic groups present in the inner portion near the surface will back up or repair the surface and consequently a decrease in hydrophilicity will be suppressed (durability will be improved). The inventive configuration will also realize a good balance between hydrophilicity and other properties such as transparency. Further, excellent adhesion may be obtained between the acrylic resin film (Xm1) and the portion formed of the compound (A).

(Method for Producing Acrylic Resin Film (Xm1))

The acrylic resin films (Xm1) used in the present invention can be obtained by a suitable method which can form a structure such that the concentration of the anionic hydrophilic groups at the surface is higher than the concentration of the anionic hydrophilic groups at the depth of half the film thickness from the surface, i.e., a film structure with the anionic hydrophilic groups made gradient at the surface. Here, in the present invention, a specific method for forming such a film structure is not limited to a particular one, and examples of particularly preferable methods out of those include a first method and a second method as described below.

The "first method", the "second method", and acrylic resin films (Xm1-1) and (Xm1-2) obtained by these methods respectively will be described below.

First Method and Acrylic Resin Film (Xm1-1)

In the present invention, an example of a first method preferably adopted as a method for producing the acrylic resin film (Xm1) is a method in which anionic hydrophilic groups are concentrated at the surface by utilizing the evaporation of a solvent. What this method is based on is that, in a gas-liquid system composed of a mixture containing a crosslinking monomer, a hydrophilic monomer having an anionic hydrophilic group, and a high polarity solvent, and the outside, the molecules of the high polarity solvent inside the mixture migrate toward the surface (gas-liquid interface to the outside) when the high polarity solvent evaporates into the outside. Then, according to this method, the hydrophilic monomers having an anionic hydrophilic group migrate toward the surface (gas-liquid interface to the outside) in the form of accompanying the high polarity solvent, resulting in increasing the concentration of the hydrophilic monomers at the surface of the mixture, which is polymerized (or crosslinked) to thereby yield a gradient film.

From a different point of view, it follows that an example of the acrylic resin film (Xm1) preferably adopted in the present invention is an acrylic resin film (Xm1-1) obtained by applying, to a substrate, a mixture containing a crosslinking monomer, a hydrophilic monomer having an anionic hydrophilic group, and a high polarity solvent, evaporating at least part of the high-boiling solvent, and then polymerizing the resulting mixture.

Thus, the first method specifically includes:

the step of applying, to a substrate surface, a mixture containing a hydrophilic monomer (I) having an anionic hydrophilic group, a crosslinking monomer (II), and a high polarity solvent;

the step of evaporating at least part of the high polarity solvent from the applied mixture; and the step of polymerizing the mixture obtained by the evaporation;

and such a first method results in obtaining the acrylic resin film (Xm1-1). Specific aspects of such a producing method are described in Patent Documents 3 and 4.

Hydrophilic Monomer (I) Having an Anionic Hydrophilic Group

A hydrophilic monomer (I) having an anionic hydrophilic group used to obtain the acrylic resin film (Xm1-1) in the present invention gives a hydrophilic constituent unit that constitutes the acrylic resin film (Xm1-1). Here, as a "hydrophilic monomer (I) having an anionic hydrophilic group", specifically a compound having an anionic hydrophilic group and at least one functional group with a polymerizable carbon-carbon double bond is used.

Examples of anionic hydrophilic groups that constitute a "compound having an anionic hydrophilic group and at least one functional group with a polymerizable carbon-carbon double bond" include sulfonate groups, carboxyl groups, phosphate groups, O-sulfate groups (—O—SO$_3^-$), N-sulfate groups (—NH—SO$_3^-$), and the like. Of the anionic hydrophilic groups, sulfonate groups, carboxyl groups, and phosphate groups are preferable.

The anionic hydrophilic group may be in salt form and included in the "compound having an anionic hydrophilic group and at least one functional group with a polymerizable carbon-carbon double bond".

Thus, the sulfonate group, the carboxyl group, and the phosphate group may be typically in the forms of the following formulae (α), (β), and (γ1) or (γ2) respectively, and be present in the "compound having an anionic hydrophilic group and at least one functional group with a polymerizable carbon-carbon double bond".

—SO$_3$Z  (α)

—COOZ  (β)

—OP=O(OZ)$_2$  (γ1)

(—O)$_2$P=O(OZ)$_1$  (γ2)

In the formulae (α) to (γ2), Z is at least one monovalent cation selected from a hydrogen ion, an ammonium ion, an alkali metal ion, and an alkaline earth metal having a 1/2 atomic valence.

The functional groups with a polymerizable carbon-carbon double bond that constitute a "compound having an anionic hydrophilic group and at least one functional group with a polymerizable carbon-carbon double bond" are not particularly limited as long as the functional groups can initiate radical polymerization or ion polymerization, and examples thereof include acryloyl group, methacryloyl group, acryloyloxy group, methacryloyloxy group, acryloylthio group, methacryloylthio group, acrylamido group, methacrylamido group, allyl group, vinyl group, isopropenyl group, maleyl group (—CO—CH=CH—CO—), itaconyl group (—CO—CH$_2$—C(=CH$_2$)—CO—) and styryl group. As used herein, acryloyl and methacryloyl may be collectively referred to as (meth)acryloyl, acryloyloxy and methacryloyloxy as (meth)acryloyloxy, acryloylthio and methacryloylthio as (meth)acryloylthio, and acrylamido and methacrylamido as (meth)acrylamido.

The "compounds having an anionic hydrophilic group and at least one functional group with a polymerizable carbon-carbon double bond" may be used singly or in mixture of two or more kinds thereof. In addition, the "compounds having an anionic hydrophilic group and at least one functional group with a polymerizable carbon-carbon double bond" may be produced by a known method or by a method corresponding to a known method, or may be commercially available.

Specific examples of the "compound having an anionic hydrophilic group and at least one functional group with a polymerizable carbon-carbon double bond" include, but are not limited to, various compounds listed as Compound (I) in Patent Document 3 and various compounds listed as Compound (IV) in Patent Document 4.

Crosslinking Monomer (II)

A crosslinking monomer (II) used to obtain the acrylic resin film (Xm1-1) in the present invention gives a constituent unit that forms the skeleton of the acrylic resin film (Xm1-1). Here, as the "crosslinking monomer (II)", specifically a polyvalent monomer having two or more (meth) acryloyl groups but having no anionic hydrophilic group is used. Examples of functional groups having a (meth)acryloyl group that constitute such a polyvalent monomer include acryloyl groups, methacryloyl groups, acryloyloxy groups, methacryloyloxy groups, acryloylthio groups, methacryloylthio groups, acrylamido groups, and methacrylamido groups.

Out of the polyvalent monomers, preferred are those compounds which have one or more hydroxyl groups and two or more (meth)acryloyl groups; those compounds which have one or more bonds selected from ether bonds and thioether bonds, and two or more (meth)acryloyl groups; those compounds which have one or more ester bonds (except ester bonds also forming moieties of (meth)acryloyl groups) and two or more (meth)acryloyl groups; those compounds which have one or more groups selected from alicyclic groups and aromatic groups, and two or more (meth)acryloyl groups; and those compounds which have one or more heterorings and two or more (meth)acryloyl groups.

The polyvalent monomers may be used singly or in mixture of two or more kinds thereof. The polyvalent monomers may be produced by a known method or by a method corresponding to a known method, or may be commercially available.

Specific examples of polyvalent monomers include, but are not limited to, various compounds listed as Compound (II) in Patent Document 3 and various compounds listed as Compound (II) in Patent Document 4.

The ratio of the hydrophilic monomer (I) having an anionic hydrophilic group to the crosslinking monomer (II) can be set as appropriate on the basis of the description of Patent Documents 3 and 4.

High Polarity Solvent

In the present invention, a high polarity solvent is used in the production of the acrylic resin film (Xm1-1) in order to form a film structure with anionic hydrophilic groups made gradient at the surface. Examples of such "high polarity solvents" can include solvents containing a compound having a solubility parameter $\sigma(cal/cm^3)$ of 9.3 or greater, preferably 9.5 or greater. Examples of such solvents which have a solubility parameter in the preferred range include methanol, ethanol, 1-propanol, isopropanol (IPA), 1-butanol, isobutanol, 1-pentanol (1-amyl alcohol), cyclohexanol, cyclohexanone; 2-methoxy-1-propanol (methoxypropanol), 2-methoxy-1-ethanol (methoxyethanol), 2-ethoxy-1-ethanol (ethoxyethanol); DMF (N,N'-dimethylformamide); acetonitrile; water; and the like. In a case in which the solvent is a solvent mixture including two or more compounds, at least one thereof has only to satisfy the aforementioned condition of the solubility parameter.

The ratio of the high polarity solvent to the hydrophilic monomer (I) having an anionic hydrophilic group and the crosslinking monomer (II) can be set as appropriate on the basis of the description of Patent Document 4.

Other Components

Mixtures used in the aforementioned first method may further include additives, if necessary, such as silica particles, polymerization initiators, polymerization accelerators, UV absorbers, hindered amine light stabilizers (HALSs), solvents, catalysts, infrared absorbers, radical scavengers, internal mold release agents, antioxidants, polymerization inhibitors, dyes, binders, dispersants and leveling agents, in addition to the hydrophilic monomer (I) having an anionic hydrophilic group, the crosslinking monomer (II) and the high polarity solvent. In addition, when the polymerization is carried out by heating, a thermal radical generator such as an organic peroxide may further be included, and when the polymerization is carried out by radiation irradiation, a photopolymerization initiator such as a photo radical polymerization initiator may further be included.

In the first method, the step of applying, to a substrate, a mixture containing the hydrophilic monomer (I) having an anionic hydrophilic group, the crosslinking monomer (II), the high polarity solvent, and the like is carried out.

Specific examples of substrates serving for this application include those which are the same as described in the section "Substrate" as undermentioned. As methods and conditions for application, those conventionally known can be applied as appropriate.

In addition, as conditions for the subsequent evaporation of the high polarity solvent, those conventionally known can be applied as appropriate.

In the production of the acrylic resin film (Xm1-1) according to the first method, the polymerization may be performed by, for example, heating, the irradiation of a radiation ray such as light, and the like. As specific conditions for polymerization, those conventionally known can be applied as appropriate.

Second Method and Acrylic Resin Film (Xm1-2)

In the present invention, an example of a second method preferably adopted as a method for producing an acrylic resin film (Xm1) is a method in which anionic hydrophilic groups are concentrated at the surface by utilizing the interaction between a surfactant and the outside. What this method is based on is that air constituting the outside has hydrophobicity and that, in a gas-liquid system composed of a mixture containing a crosslinking monomer, a hydrophilic monomer having an anionic hydrophilic group, and a surfactant, and the outside, the surfactant assembles at the surface (gas-liquid interface to the outside) in the aspect in which the hydrophobic part faces toward the outside and the hydrophilic part faces toward the internal side of the mixture. Then, according to this method, the hydrophilic monomer having an anionic hydrophilic group migrates toward the surface in the form of being drawn along by the hydrophilic part of the surfactant assembled at the surface (gas-liquid interface to the outside), resulting in increasing the concentration of the hydrophilic monomer at the surface of the mixture, which is polymerized (or crosslinked) to thereby yield a gradient film.

From a different point of view, an example of another acrylic resin film (Xm1) preferably adopted in the present invention is an acrylic resin film (Xm1-2) obtained by applying, to a substrate, a mixture containing a crosslinking monomer, a hydrophilic monomer having an anionic hydrophilic group, and a surfactant, and then polymerizing the resulting mixture.

Thus, the second method specifically includes:

the step of applying, to a substrate surface, a mixture containing a hydrophilic monomer (I) having an anionic hydrophilic group, a crosslinking monomer (II), and a surfactant (III); and the step of polymerizing the applied mixture;

and such a second method results in obtaining the acrylic resin film (Xm1-2). In other words, out of acrylic resin films (Xm1), the acrylic resin film (Xm1-2) obtained by this second method results in containing the surfactant (III) as the result of the surfactant being included in the polymerization mixture.

Unlike the first method, this second method does not need to count on the evaporation of a solvent for hydrophilic monomers having an anionic hydrophilic group to assemble at the surface. Accordingly, in carrying out this method, the use of a solvent does not have to be made essential, and in the case of using a solvent together, it does not have to be a high polarity solvent as long as it can dissolve a crosslinking monomer, a hydrophilic monomer having an anionic hydrophilic group, and the like, whereby the advantage is given that the range of selection for a solvent is broadened. In addition, this second method has another advantage that an acrylic resin film (Xm1) can be formed stably. Accordingly, out of acrylic resin films (Xm1) in the present invention, the acrylic resin film obtained by this second method, i.e. the acrylic resin film (Xm1-2) can be used particularly preferably.

Here, examples of hydrophilic monomers (I) having an anionic hydrophilic group and of crosslinking monomers (II) used to obtain the acrylic resin film (Xm1-2) include those which are the same as hydrophilic monomers (I) and crosslinking monomers (II) respectively used in the first method, and the use ratio thereof is also the same as in the first method.

Surfactant (III)

In the present invention, the surfactant (III) is used in the production of the acrylic resin film (Xm1-2) in order to form a film structure with anionic hydrophilic groups made gradient at the surface. As such a "surfactant (III)", a compound represented by the following general formula (300) is preferable.

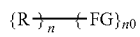
(300)

In the formula (300), R represents an organic residue having 4 to 100 carbon atoms; FG represents a hydrophilic group including at least one group selected from anionic hydrophilic groups, cationic hydrophilic groups, and hydroxyl groups; n is the number of Rs bonded to FG and is 1 or 2; n0 is the number of FGs bonded to R and is an integer of 1 to 5; and when FG is a group including one hydroxyl group, n0 is an integer of 2 to 5.

Examples of the groups FG including an anionic hydrophilic group include hydrophilic groups represented by the general formulae (301) to (308) below.

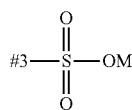
(301)

In the formula (301), M is a hydrogen atom, an alkali metal, an alkaline earth metal having a 1/2 atomic valence, or an ammonium ion; and #3 is a hand bonded to a carbon atom present in R in the formula (300).

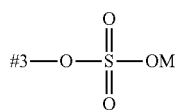
(302)

In the formula (302), M is a hydrogen atom, an alkali metal, an alkaline earth metal having a 1/2 atomic valence, or an ammonium ion; and #3 is a hand bonded to a carbon atom present in R in the formula (300).

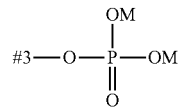
(303)

In the formula (303), M is a hydrogen atom, an alkali metal, an alkaline earth metal having a 1/2 atomic valence or an ammonium ion; and #3 is a hand bonded to a carbon atom present in R in the formula (300).

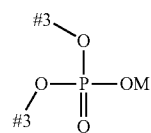
(304)

In the formula (304), M is a hydrogen atom, an alkali metal, an alkaline earth metal having a 1/2 atomic valence, or an ammonium ion; and #3 is a hand bonded to a carbon atom present in R in the formula (300).

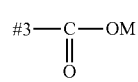
(305)

In the formula (305), M is a hydrogen atom, an alkali metal, an alkaline earth metal having a 1/2 atomic valence, or an ammonium ion; and #3 is a hand bonded to a carbon atom present in R in the formula (300).

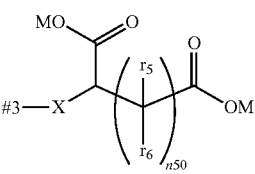
(306)

In the formula (306), $r_5$ and $r_6$ each independently represent a hydrogen atom, a methyl group, an ethyl group, or a hydroxyl group; n50 is an integer of 0 to 5; X is —O—, —S—, —NH— or —NCH$_3$—; M is a hydrogen atom, an alkali metal, an alkaline earth metal having a 1/2 atomic valence, or an ammonium ion; and #3 is a hand bonded to a carbon atom present in R in the formula (300).

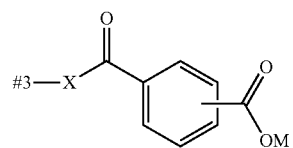
(307)

In the formula (307), X is —O—, —S—, —NH— or —NCH$_3$—; M is a hydrogen atom, an alkali metal, an alkaline earth metal having a 1/2 atomic valence, or an ammonium ion; and #3 is a hand bonded to a carbon atom present in R in the formula (300).

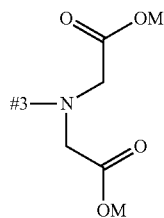

(308)

In the formula (308), M is a hydrogen atom, an alkali metal, an alkaline earth metal having a 1/2 atomic valence, or an ammonium ion; and #3 indicates a hand bonded to a carbon atom present in R in the formula (300).

Examples of the surfactants in which FG is represented by the general formula (301) include alkyl sulfonic acid surfactants, alkenyl sulfonic acid surfactants (in which the alkenyl groups present in the surfactants are not polymerizable), alkyl acetic acid sulfonic acid surfactants, N-acyl sulfonic acid surfactants, hydroxyalkane sulfonic acid surfactants, aryl sulfonic acid surfactants and sulfosuccinic acid ester surfactants.

Examples of the alkyl sulfonic acid surfactants include sodium butyl sulfonate, sodium pentyl sulfonate, sodium hexyl sulfonate, sodium heptyl sulfonate, octyl sulfonic acid, sodium octyl sulfonate, potassium octyl sulfonate, ammonium octyl sulfonate, magnesium octyl sulfonate, calcium octyl sulfonate, nonyl sulfonic acid, sodium nonyl sulfonate, potassium nonyl sulfonate, ammonium nonyl sulfonate, magnesium nonyl sulfonate, calcium nonyl sulfonate, decyl sulfonic acid, sodium decyl sulfonate, potassium decyl sulfonate, ammonium decyl sulfonate, magnesium decyl sulfonate, calcium decyl sulfonate, sodium undecyl sulfonate, dodecyl sulfonic acid, sodium dodecyl sulfonate, potassium dodecyl sulfonate, ammonium dodecyl sulfonate, magnesium dodecyl sulfonate, calcium dodecyl sulfonate, sodium tridecyl sulfonate, tetradecyl sulfonic acid, sodium tetradecyl sulfonate, potassium tetradecyl sulfonate, ammonium tetradecyl sulfonate, magnesium tetradecyl sulfonate, calcium tetradecyl sulfonate, sodium pentadecyl sulfonate, hexadecyl sulfonic acid, sodium hexadecyl sulfonate, potassium hexadecyl sulfonate, ammonium hexadecyl sulfonate, magnesium hexadecyl sulfonate, calcium hexadecyl sulfonate, sodium hexadecyl sulfonate, sodium heptadecyl sulfonate, octadecyl sulfonic acid, sodium octadecyl sulfonate, potassium octadecyl sulfonate, ammonium octadecyl sulfonate, magnesium octadecyl sulfonate, calcium octadecyl sulfonate, sodium nonadecyl sulfonate, sodium icosanyl sulfonate, and the like.

Examples of the alkenyl sulfonic acid surfactants include butynyl sulfonic acid, hexynyl sulfonic acid, octynyl sulfonic acid, decynyl sulfonic acid, dodecynyl sulfonic acid, tetradecynyl sulfonic acid, hexadecynyl sulfonic acid, octadecynyl sulfonic acid, icosanyl sulfonic acid, butynyloxy sulfonic acid, hexynyloxy sulfonic acid, octynyloxy sulfonic acid, decynyloxy sulfonic acid, dodecynyloxy sulfonic acid, tetradecynyloxy sulfonic acid, hexadecynyloxy sulfonic acid, octadecynyloxy sulfonic acid, icosanyloxy sulfonic acid, butynyloxy-3-oxapentyl sulfonic acid, hexynyloxy-3-oxapentyl sulfonic acid, octynyloxy-3-oxapentyl sulfonic acid, decynyloxy-3-oxapentyl sulfonic acid, dodecynyloxy-3-oxapentyl sulfonic acid, tetradecynyloxy-3-oxapentyl sulfonic acid, hexadecynyloxy-3-oxapentyl sulfonic acid, octadecynyloxy-3-oxapentyl sulfonic acid, icosanyloxy-3-oxapentyl sulfonic acid, butynyloxy-3,6-dioxaoctyl sulfonic acid, hexynyloxy-3,6-dioxaoctyl sulfonic acid, octynyloxy-3,6-dioxaoctyl sulfonic acid, decynyloxy-3,6-dioxaoctyl sulfonic acid, dodecynyloxy-3,6-dioxaoctyl sulfonic acid, tetradecynyloxy-3,6-dioxaoctyl sulfonic acid, hexadecynyloxy-3,6-dioxaoctyl sulfonic acid, octadecynyloxy-3,6-dioxaoctyl sulfonic acid, icosanyloxy-3,6-dioxaoctyl sulfonic acid, butynyloxy-3,6,9-trioxaundecyl sulfonic acid, hexynyloxy-3,6,9-trioxaundecyl sulfonic acid, octynyloxy-3,6,9-trioxaundecyl sulfonic acid, decynyloxy-3,6,9-trioxaundecyl sulfonic acid, dodecynyloxy-3,6,9-trioxaundecyl sulfonic acid, tetradecynyloxy-3,6,9-trioxaundecyl sulfonic acid, hexadecynyloxy-3,6,9-trioxaundecyl sulfonic acid, octadecynyloxy-3,6,9-trioxaundecyl sulfonic acid, icosanyloxy-3,6,9-trioxaundecyl sulfonic acid, salts thereof such as sodium salt, potassium salt, ammonium salt, triethanolamine salt, magnesium salt, and calcium salt, and the like.

Examples of the alkyl acetic acid sulfonic acid surfactants include α-sulfoacetic acid ethyl sodium, α-sulfoacetic acid propyl sodium, butyl α-sulfoacetate, α-sulfoacetic acid butyl sodium, α-sulfoacetic acid butyl potassium salt, α-sulfoacetic acid butyl ammonium, α-sulfoacetic acid butyl magnesium, α-sulfoacetic acid butyl calcium, pentyl α-sulfoacetate, α-sulfoacetic acid pentyl sodium, α-sulfoacetic acid pentyl potassium salt, α-sulfoacetic acid pentyl ammonium, α-sulfoacetic acid pentyl magnesium, α-sulfoacetic acid pentyl calcium, hexyl α-sulfoacetate, α-sulfoacetic acid hexyl sodium, α-sulfoacetic acid hexyl potassium salt, α-sulfoacetic acid hexyl ammonium, α-sulfoacetic acid hexyl magnesium, α-sulfoacetic acid hexyl calcium, heptyl α-sulfoacetate, α-sulfoacetic acid heptyl sodium, α-sulfoacetic acid heptyl potassium salt, α-sulfoacetic acid heptyl ammonium, α-sulfoacetic acid heptyl magnesium, α-sulfoacetic acid heptyl calcium, octyl α-sulfoacetate, α-sulfoacetic acid octyl sodium, α-sulfoacetic acid octyl potassium salt, α-sulfoacetic acid octyl ammonium, α-sulfoacetic acid octyl magnesium, α-sulfoacetic acid octyl calcium, nonyl α-sulfoacetate, α-sulfoacetic acid nonyl sodium, α-sulfoacetic acid nonyl potassium salt, α-sulfoacetic acid nonyl ammonium, α-sulfoacetic acid nonyl magnesium, α-sulfoacetic acid nonyl calcium, decyl α-sulfoacetate, α-sulfoacetic acid decyl sodium, α-sulfoacetic acid decyl potassium salt, α-sulfoacetic acid decyl ammonium, α-sulfoacetic acid decyl magnesium, α-sulfoacetic acid decyl calcium, dodecyl α-sulfoacetate, α-sulfoacetic acid dodecyl sodium, α-sulfoacetic acid dodecyl potassium salt, α-sulfoacetic acid dodecyl ammonium, α-sulfoacetic acid dodecyl magnesium, α-sulfoacetic acid dodecyl calcium, tetradecyl α-sulfoacetate, α-sulfoacetic acid tetradecyl sodium, α-sulfoacetic acid tetradecyl potassium salt, α-sulfoacetic acid tetradecyl ammonium, α-sulfoacetic acid tetradecyl magnesium, α-sulfoacetic acid tetradecyl calcium, hexadecyl α-sulfoacetate, α-sulfoacetic acid hexadecyl sodium, α-sulfoacetic acid hexadecyl potassium salt, α-sulfoacetic acid hexadecyl ammonium, α-sulfoacetic acid hexadecyl magnesium, α-sulfoacetic acid hexadecyl calcium, octadecyl α-sulfoacetate, α-sulfoacetic acid octadecyl sodium, α-sulfoacetic acid octadecyl potassium salt, α-sulfoacetic acid octadecyl ammonium, α-sulfoacetic acid octadecyl magnesium, α-sulfoacetic acid octadecyl calcium, icosyl α-sulfoacetate, α-sulfoacetic acid icosyl sodium, α-sulfoacetic acid icosyl potassium salt, α-sulfoacetic acid icosyl ammonium, α-sulfoacetic acid icosyl magnesium, α-sulfoacetic acid icosyl calcium, and the like.

Examples of the N-acyl sulfonic acid surfactants include 2-hexylic acid amido-ethane sulfonic acid, 2-octylic acid amido-ethane sulfonic acid, 2-lauric acid amido-ethane sulfonic acid, 2-myristic acid amido-ethane sulfonic acid, 2-palmitic acid amido-ethane sulfonic acid, 2-stearic acid amido-ethane sulfonic acid, 2-oleic acid amido-ethane sulfonic acid, 2-behenic acid amido-ethane sulfonic acid, N-methyl-2-hexylic acid amido-ethane sulfonic acid, N-methyl-2-octylic acid amido-ethane sulfonic acid, N-methyl-2-lauric acid amido-ethane sulfonic acid, N-methyl-2-myristic acid amido-ethane sulfonic acid, N-methyl-2-palmitic acid amido-ethane sulfonic acid, N-methyl-2-stearic acid amido-ethane sulfonic acid, N-methyl-2-oleic acid amido-ethane sulfonic acid, N-methyl-2-behenic acid amido-ethane sulfonic acid, 3-hexylic acid amido-propane sulfonic acid, 3-octylic acid amido-propane sulfonic acid, 3-lauric acid amido-propane sulfonic acid, 3-myristic acid amido-propane sulfonic acid, 3-palmitic acid amido-propane sulfonic acid, 3-stearic acid amido-propane sulfonic acid, 3-oleic acid amido-propane sulfonic acid, 3-behenic acid amido-propane sulfonic acid, and salts thereof such as sodium salt, potassium salt, ammonium salt, magnesium salt, and calcium salt, and the like.

Examples of the hydroxyalkane sulfonic acid surfactants include sodium 2-hydroxybutyl sulfonate, sodium 2-hydroxypentyl sulfonate, sodium 2-hydroxyhexyl sulfonate, sodium 2-hydroxyheptyl sulfonate, sodium 2-hydroxyoctyl sulfonate, sodium 2-hydroxynonyl sulfonate, sodium 2-hydroxydecyl sulfonate, sodium 2-hydroxyundecyl sulfonate, sodium 2-hydroxydodecyl sulfonate, sodium 2-hydroxytridecyl sulfonate, sodium 2-hydroxytetradecyl sulfonate, sodium 2-hydroxypentadecyl sulfonate, sodium 2-hydroxyhexadecyl sulfonate, sodium 2-hydroxyheptadecylsulfonate, 2-hydroxyoctadecylsulfonic acid, sodium 2-hydroxyoctadecyl sulfonate, potassium 2-hydroxyoctadecyl sulfonate, ammonium 2-hydroxyoctadecyl sulfonate, magnesium 2-hydroxyoctadecyl sulfonate, calcium 2-hydroxyoctadecyl sulfonate, sodium 2-hydroxynonadecyl sulfonate, sodium 2-hydroxyicosanyl sulfonate, sodium 3-hydroxybutyl sulfonate, sodium 3-hydroxypentyl sulfonate, sodium 3-hydroxyhexyl sulfonate, sodium 3-hydroxyheptyl sulfonate, sodium 3-hydroxyoctyl sulfonate, sodium 3-hydroxynonyl sulfonate, sodium 3-hydroxydecyl sulfonate, sodium 3-hydroxyundecyl sulfonate, sodium 3-hydroxydodecyl sulfonate, sodium 3-hydroxytridecyl sulfonate, sodium 3-hydroxytetradecyl sulfonate, sodium 3-hydroxypentadecyl sulfonate, sodium 3-hydroxyhexadecyl sulfonate, sodium 3-hydroxyheptadecylsulfonate, 3-hydroxyoctadecylsulfonic acid, sodium 3-hydroxyoctadecyl sulfonate, potassium 3-hydroxyoctadecyl sulfonate, ammonium 3-hydroxyoctadecyl sulfonate, magnesium 3-hydroxyoctadecyl sulfonate, calcium 3-hydroxyoctadecyl sulfonate, sodium 3-hydroxynonadecyl sulfonate, sodium 3-hydroxyicosanyl sulfonate, sodium 4-hydroxybutyl sulfonate, sodium 4-hydroxypentyl sulfonate, sodium 4-hydroxyhexyl sulfonate, sodium 4-hydroxyheptyl sulfonate, sodium 4-hydroxyoctyl sulfonate, sodium 4-hydroxynonylsulfonate, sodium 4-hydroxydecylsulfonate, sodium 4-hydroxyundecyl sulfonate, sodium 4-hydroxydodecyl sulfonate, sodium 4-hydroxytridecyl sulfonate, sodium 4-hydroxytetradecyl sulfonate, sodium 4-hydroxypentadecyl sulfonate, sodium 4-hydroxyhexadecyl sulfonate, sodium 4-hydroxyheptadecylsulfonate, 4-hydroxyoctadecylsulfonic acid, sodium 4-hydroxyoctadecyl sulfonate, potassium 4-hydroxyoctadecyl sulfonate, ammonium 4-hydroxyoctadecyl sulfonate, magnesium 4-hydroxyoctadecyl sulfonate, calcium 4-hydroxyoctadecyl sulfonate, sodium 4-hydroxynonadecyl sulfonate, sodium 4-hydroxyicosanyl sulfonate, and the like.

Examples of the aryl sulfonic acid surfactants include sodium phenyl sulfonate, sodium methyl benzenesulfonate, sodium ethyl benzenesulfonate, sodium propyl benzenesulfonate, sodium butyl benzenesulfonate, sodium pentyl benzenesulfonate, sodium hexyl benzenesulfonate, sodium heptyl benzenesulfonate, sodium octyl benzenesulfonate, nonyl benzenesulfonic acid, sodium nonyl benzenesulfonate, potassium nonyl benzenesulfonate, ammonium nonyl benzenesulfonate, magnesium nonyl benzenesulfonate, calcium nonyl benzenesulfonate, sodium decyl benzenesulfonate, sodium undecyl benzenesulfonate, dodecyl benzenesulfonic acid, sodium dodecyl benzenesulfonate, potassium dodecyl benzenesulfonate, ammonium dodecyl benzenesulfonate, magnesium dodecyl benzenesulfonate, calcium dodecyl benzenesulfonate, sodium tridecyl benzenesulfonate, sodium tetradecyl benzenesulfonate, sodium pentadecyl benzenesulfonate, sodium hexadecyl benzenesulfonate, sodium heptadecyl benzenesulfonate, sodium octadecyl benzenesulfonate, sodium nonadecyl benzenesulfonate, sodium icosanyl benzenesulfonate, sodium di(methyl)benzenesulfonate, sodium di(ethyl)benzenesulfonate, sodium di(propyl)benzenesulfonate, sodium di(butyl)benzenesulfonate, sodium di(pentyl)benzenesulfonate, sodium di(hexyl)benzenesulfonate, sodium di(heptyl)benzenesulfonate, sodium di(octyl)benzenesulfonate, sodium di(nonyl)benzenesulfonate, sodium di(decyl)benzenesulfonate, sodium di(undecyl)benzenesulfonate, sodium di(dodecyl)benzenesulfonate, sodium di(tridecyl)benzenesulfonate, sodium di(tetradecyl)benzenesulfonate, sodium di(pentadecyl)benzenesulfonate, sodium di(hexadecyl)benzenesulfonate, sodium di(heptadecyl)benzenesulfonate, sodium di(octadecyl)benzenesulfonate, sodium di(nonadecyl)benzenesulfonate, sodium di(icosanyl)benzenesulfonate, sodium tri(methyl)benzenesulfonate, sodium tri(ethyl)benzenesulfonate, sodium tri(propyl)benzenesulfonate, sodium tri(butyl)benzenesulfonate, sodium tri(pentyl)benzenesulfonate, sodium tri(hexyl)benzenesulfonate, sodium tri(heptyl)benzenesulfonate, sodium tri(octyl)benzenesulfonate, sodium tri(nonyl)benzenesulfonate, sodium tri(decyl)benzenesulfonate, sodium tri(undecyl)benzenesulfonate, sodium tri(dodecyl)benzenesulfonate, sodium tri(tridecyl)benzenesulfonate, sodium tri(tetradecyl)benzenesulfonate, sodium tri(pentadecyl)benzenesulfonate, sodium tri(hexadecyl)benzenesulfonate, sodium tri(heptadecyl)benzenesulfonate, sodium tri(octadecyl)benzenesulfonate, sodium tri(nonadecyl)benzenesulfonate, sodium tri(icosanyl)benzenesulfonate, sodium naphthalenesulfonate, sodium methyl naphthalenesulfonate, sodium ethyl naphthalenesulfonate, sodium propyl naphthalenesulfonate, sodium butyl naphthalenesulfonate, sodium pentyl naphthalenesulfonate, sodium hexyl naphthalenesulfonate, sodium heptyl naphthalenesulfonate, sodium octyl naphthalenesulfonate, sodium nonyl naphthalenesulfonate, sodium decyl naphthalenesulfonate, sodium undecyl naphthalenesulfonate, sodium dodecyl naphthalenesulfonate, sodium tridecyl naphthalenesulfonate, sodium tetradecyl naphthalenesulfonate, sodium pentadecyl naphthalenesulfonate, sodium hexadecyl naphthalenesulfonate, sodium heptadecyl naphthalenesulfonate, octadecylnaphthalenesulfonic acid(stearyl naphthalenesulfonic acid), sodium octadecylnaphthalenesulfonate(sodium stearyl naphthalenesulfonate), potassium octadecylnaphthalenesulfonate(potassium stearyl naphthalenesulfonate), ammonium octadecylnaphthalenesulfonate(ammonium stearyl naphthalenesulfonate), magnesium octadecylnaphthalenesulfonate(magnesium stearyl naphthalenesulfonate), calcium octadecylnaphthalenesulfonate(calcium stearyl naphthalenesulfonate), sodium nonadecyl naphthalenesulfonate, sodium icosanyl naphthalenesulfonate, sodium di(methyl)naphthalenesulfonate, sodium di(ethyl)naphthalenesulfonate, sodium di(propyl)naphthalenesulfonate, sodium di(butyl)naphthalenesulfonate, sodium di(pentyl)naphthalenesulfonate, sodium di(hexyl)naphthalenesulfonate, sodium di(heptyl)naphthalenesulfonate, sodium di(octyl)naphthalenesulfonate, sodium di(nonyl)naphthalenesulfonate, sodium di(decyl)naphthalenesulfonate, sodium di(undecyl)naphthalenesulfonate, sodium di(dodecyl)naphthalenesulfonate, sodium di(tridecyl)naphthalenesulfonate, sodium di(tetradecyl)naphthalenesulfonate, sodium di(pentadecyl)naphthalenesulfonate, sodium di(hexadecyl)naphthalenesulfonate, sodium di(heptadecyl)naphthalenesulfonate, sodium di(octadecyl)naphthalenesulfonate, sodium di(nonadecyl)naphthalenesulfonate, sodium di(icosanyl)naphthalenesulfonate, sodium tri(methyl)naphthalenesulfonate, sodium tri(ethyl)naphthalenesulfonate, sodium tri(propyl)naphthalenesulfonate, sodium tri(butyl)naphthalenesulfonate, sodium tri(pentyl)naphthalenesulfonate, sodium tri(hexyl)naphthalenesulfonate, sodium tri(heptyl)naphthalenesulfonate, sodium tri(octyl)naphthalenesulfonate, sodium tri(nonyl)naphthalenesulfonate, sodium tri(decyl)naphthalenesulfonate, sodium tri(undecyl)naphthalenesulfonate, sodium tri(dodecyl)naphthalenesulfonate, sodium tri(tridecyl)naphthalenesulfonate, sodium tri(tetradecyl)naphthalenesulfonate, sodium tri(pentadecyl)naphthalenesulfonate, sodium tri(hexadecyl)naphthalenesulfonate, sodium tri(heptadecyl)naphthalenesulfonate, sodium tri(octadecyl)naphthalenesulfonate, sodium tri(nonadecyl)naphthalenesulfonate, sodium tri(icosanyl)naphthalenesulfonate, sodium naphthalenesulfonate formalin condensate, sodium methyl naphthalenesulfonate formalin condensate, sodium ethyl naphthalenesulfonate formalin condensate, sodium propyl naphthalenesulfonate formalin condensate, sodium butyl naphthalenesulfonate formalin condensate, sodium pentyl naphthalenesulfonate formalin condensate, sodium hexyl naphthalenesulfonate formalin condensate, sodium heptyl naphthalenesulfonate formalin condensate, sodium octyl naphthalenesulfonate formalin condensate, sodium nonyl naphthalenesulfonate formalin condensate, sodium decyl naphthalenesulfonate formalin condensate, sodium undecyl naphthalenesulfonate formalin condensate, sodium dodecyl naphthalenesulfonate formalin condensate, sodium tridecyl naphthalenesulfonate formalin condensate, sodium tetradecyl naphthalenesulfonate formalin condensate, sodium pentadecyl naphthalenesulfonate formalin condensate, sodium hexadecyl naphthalenesulfonate formalin condensate, sodium heptadecyl naphthalenesulfonate formalin condensate, octadecylnaphthalenesulfonic acid(stearyl naphthalenesulfonic acid)formalin condensate, sodium octadecylnaphthalenesulfonate (sodium stearyl naphthalenesulfonate) formalin condensate, potassium octadecylnaphthalenesulfonate(potassium stearyl naphthalenesulfonate) formalin condensate, ammonium octadecylnaphthalenesulfonate(ammonium stearyl naphthalenesulfonate) formalin condensate, magnesium octadecylnaphthalenesulfonate(magnesium stearyl naphthalenesulfonate) formalin condensate, calcium octadecylnaphthalenesulfonate(calcium stearyl naphthalenesulfonate) formalin condensate, sodium nonadecyl naphthalenesulfonate formalin condensate, sodium icosanyl naphthalenesulfonate formalin condensate, sodium di(methyl)naphthalenesulfonate formalin condensate, sodium di(ethyl)naphthalenesulfonate formalin condensate, sodium di(propyl)naphthalenesulfonate formalin condensate, sodium di(butyl)naphthalenesulfonate formalin condensate, sodium di(pentyl)naphthalenesulfonate formalin condensate, sodium di(hexyl)naphthalenesulfonate formalin condensate, sodium di(heptyl)naphthalenesulfonate formalin condensate, sodium di(octyl)naphthalenesulfonate formalin condensate, sodium di(nonyl)naphthalenesulfonate formalin condensate, sodium di(decyl)naphthalenesulfonate formalin condensate, sodium di(undecyl)naphthalenesulfonate formalin condensate, sodium di(dodecyl)naphthalenesulfonate formalin condensate, sodium di(tridecyl)naphthalenesulfonate formalin condensate, sodium di(tetradecyl)naphthalenesulfonate formalin condensate, sodium di(pentadecyl)naphthalenesulfonate formalin condensate, sodium di(hexadecyl)naphthalenesulfonate formalin condensate, sodium di(heptadecyl)naphthalenesulfonate formalin condensate, sodium di(octadecyl)naphthalenesulfonate formalin condensate, sodium di(nonadecyl)naphthalenesulfonate formalin condensate, sodium di(icosanyl)naphthalenesulfonate formalin condensate, sodium tri(methyl)naphthalenesulfonate formalin condensate, sodium tri(ethyl)naphthalenesulfonate formalin condensate, sodium tri(propyl)naphthalenesulfonate formalin condensate, sodium tri(butyl)naphthalenesulfonate formalin condensate, sodium tri(pentyl)naphthalenesulfonate formalin condensate, sodium tri(hexyl)naphthalenesulfonate formalin condensate, sodium tri(heptyl)naphthalenesulfonate formalin condensate, sodium tri(octyl)naphthalenesulfonate formalin condensate, sodium tri(nonyl)naphthalenesulfonate formalin condensate, sodium tri(decyl)naphthalenesulfonate formalin condensate, sodium tri(undecyl)naphthalenesulfonate formalin condensate, sodium tri(dodecyl)naphthalenesulfonate formalin condensate, sodium tri(tridecyl)naphthalenesulfonate formalin condensate, sodium tri(tetradecyl)naphthalenesulfonate formalin condensate, sodium tri(pentadecyl)naphthalenesulfonate formalin condensate, sodium tri(hexadecyl)naphthalenesulfonate formalin condensate, sodium tri(heptadecyl)naphthalenesulfonate formalin condensate, sodium tri(octadecyl)naphthalenesulfonate formalin condensate, sodium tri(nonadecyl)naphthalenesulfonate formalin condensate, sodium tri(icosanyl)naphthalenesulfonate formalin condensate, sodium diphenyl ether sulfonate, sodium methyl diphenyl ether sulfonate, sodium ethyl diphenyl ether sulfonate, sodium propyl diphenyl ether sulfonate, sodium butyl diphenyl ether sulfonate, sodium pentyl diphenyl ether sulfonate, sodium hexyl diphenyl ether sulfonate, sodium heptyl diphenyl ether sulfonate, sodium octyl diphenyl ether sulfonate, nonyl diphenyl ether sulfonic acid, sodium nonyl diphenyl ether sulfonate, potassium nonyl diphenyl ether sulfonate, ammonium nonyl diphenyl ether sulfonate, magnesium nonyl diphenyl ether sulfonate, calcium nonyl diphenyl ether sulfonate, sodium decyl diphenyl ether sulfonate, sodium undecyl diphenyl ether sulfonate, dodecyl diphenyl ether sulfonic acid, sodium dodecyl diphenyl ether sulfonate, potassium dodecyl diphenyl ether sulfonate, ammonium dodecyl diphenyl ether sulfonate, magnesium dodecyl diphenyl ether sulfonate, calcium dodecyl diphenyl ether sulfonate, sodium tridecyl diphenyl ether sulfonate, sodium tetradecyl diphenyl ether sulfonate, sodium pentadecyl diphenyl ether sulfonate, sodium hexadecyl diphenyl ether sulfonate, sodium heptadecyl diphenyl ether sulfonate, sodium octadecyl diphenyl ether sulfonate, sodium nonadecyl diphenyl ether sulfonate, sodium icosanyl diphenyl ether sulfonate, sodium diphenyl ether disulfonate, sodium methyl diphenyl ether disulfonate, sodium ethyl diphenyl ether disulfonate, sodium propyl diphenyl ether disulfonate, sodium butyl diphenyl ether disulfonate, sodium pentyl diphenyl ether disulfonate, sodium hexyl diphenyl ether disulfonate, sodium heptyl diphenyl ether disulfonate, sodium octyl diphenyl ether disulfonate, nonyl diphenyl ether disulfonic acid, sodium nonyl diphenyl ether disulfonate, potassium nonyl diphenyl ether disulfonate, ammonium nonyl diphenyl ether disulfonate, magnesium nonyl diphenyl ether disulfonate, calcium nonyl diphenyl ether disulfonate, sodium decyl diphenyl ether disulfonate, sodium undecyl diphenyl ether disulfonate, dodecyl diphenyl ether disulfonic acid, sodium dodecyl diphenyl ether disulfonate, potassium dodecyl diphenyl ether disulfonate, ammonium dodecyl diphenyl ether disulfonate, magnesium dodecyl diphenyl ether disulfonate, calcium dodecyl diphenyl ether disulfonate, sodium tridecyl diphenyl ether disulfonate, sodium tetradecyl diphenyl ether disulfonate, sodium pentadecyl diphenyl ether disulfonate, sodium hexadecyl diphenyl ether disulfonate, sodium heptadecyl diphenyl ether disulfonate, sodium octadecyl diphenyl ether disulfonate, sodium nonadecyl diphenyl ether disulfonate, sodium icosanyl diphenyl ether disulfonate, and the like.

Examples of the sulfosuccinic acid ester surfactants include mono(methyl)sulfosuccinic acid ester disodium, mono(ethyl)sulfosuccinic acid ester disodium, mono(propyl)sulfosuccinic acid ester disodium, mono(butyl)sulfosuccinic acid ester, mono(butyl)sulfosuccinic acid ester disodium, mono(butyl)sulfosuccinic acid ester dipotassium, mono(butyl)sulfosuccinic acid ester diammonium, mono (butyl)sulfosuccinic acid ester magnesium, mono(butyl)sulfosuccinic acid ester calcium, mono(pentyl)sulfosuccinic acid ester disodium, mono(hexyl)sulfosuccinic acid ester disodium, mono(heptyl)sulfosuccinic acid ester disodium, mono(octyl)sulfosuccinic acid ester, mono(octyl)sulfosuccinic acid ester disodium, mono(octyl)sulfosuccinic acid ester dipotassium, mono(octyl)sulfosuccinic acid ester diammonium, mono(octyl)sulfosuccinic acid ester magnesium, mono(octyl)sulfosuccinic acid ester calcium, (nonyl) sulfosuccinic acid ester, mono(nonyl)sulfosuccinic acid ester disodium, mono(nonyl)sulfosuccinic acid ester dipotassium, mono(nonyl)sulfosuccinic acid ester diammonium, mono(nonyl)sulfosuccinic acid ester magnesium, mono(nonyl)sulfosuccinic acid ester calcium, mono(decyl)sulfosuccinic acid ester disodium, mono(undecyl)sulfosuccinic acid ester disodium, mono(dodecyl)sulfosuccinic acid ester, mono(dodecyl)sulfosuccinic acid ester disodium, mono(dodecyl)sulfosuccinic acid ester dipotassium, mono(dodecyl) sulfosuccinic acid ester diammonium, mono(dodecyl)sulfosuccinic acid ester magnesium, mono(dodecyl)sulfosuccinic acid ester calcium, mono(tridecyl)sulfosuccinic acid ester, mono(tridecyl)sulfosuccinic acid ester disodium, mono(tridecyl)sulfosuccinic acid ester dipotassium, mono(tridecyl) sulfosuccinic acid ester diammonium, mono(tridecyl)sulfosuccinic acid ester magnesium, mono(tridecyl)sulfosuccinic acid ester calcium, mono(tetradecyl)sulfosuccinic acid ester, mono(tetradecyl)sulfosuccinic acid ester disodium, mono (tetradecyl)sulfosuccinic acid ester dipotassium, mono(tetradecyl)sulfosuccinic acid ester diammonium, mono(tetradecyl)sulfosuccinic acid ester magnesium, mono(tetradecyl) sulfosuccinic acid ester calcium, mono(pentadecyl) sulfosuccinic acid ester disodium, mono(hexadecyl) sulfosuccinic acid ester, mono(hexadecyl)sulfosuccinic acid ester disodium, mono(hexadecyl)sulfosuccinic acid ester dipotassium, mono(hexadecyl)sulfosuccinic acid ester diammonium, mono(hexadecyl)sulfosuccinic acid ester magnesium, mono(hexadecyl)sulfosuccinic acid ester calcium, mono(heptadecyl)sulfosuccinic acid ester disodium, mono(octadecyl)sulfosuccinic acid ester, mono(octadecyl) sulfosuccinic acid ester disodium, mono(octadecyl)sulfosuccinic acid ester dipotassium, mono(octadecyl)sulfosuccinic acid ester diammonium, mono(octadecyl)sulfosuccinic acid ester magnesium, mono(octadecyl)sulfosuccinic acid ester calcium, mono(nonadecyl)sulfosuccinic acid ester disodium, mono(icosanyl)sulfosuccinic acid ester disodium, mono(benzyl)sulfosuccinic acid ester disodium, mono(butoxyethyl)sulfosuccinic acid ester disodium, mono(hexyloxyethyl)sulfosuccinic acid ester disodium, mono(octyloxyethyl)sulfosuccinic acid ester disodium, mono (nonyloxyethyl)sulfosuccinic acid ester disodium, mono (decyloxyethyl)sulfosuccinic acid ester disodium, mono (undecyloxyethyl)sulfosuccinic acid ester disodium, mono (dodecyloxyethyl)sulfosuccinic acid ester disodium, mono (tridecyloxyethyl)sulfosuccinic acid ester disodium, mono (tetradecyloxyethyl)sulfosuccinic acid ester disodium, mono (pentadecyloxyethyl)sulfosuccinic acid ester disodium, mono(hexadecyloxyethyl)sulfosuccinic acid ester disodium, mono(heptadecyloxyethyl)sulfosuccinic acid ester disodium, mono(octadecyloxyethyl)sulfosuccinic acid ester sodium, mono(octadecyloxyethyl)sulfosuccinic acid ester disodium, mono(octadecyloxyethyl)sulfosuccinic acid ester potassium, mono(octadecyloxyethyl)sulfosuccinic acid ester dipotassium, mono(octadecyloxyethyl)sulfosuccinic acid ester ammonium, mono(octadecyloxyethyl)sulfosuccinic acid ester diammonium, mono(octadecyloxyethyl)sulfosuccinic acid ester calcium, mono(nonadecyloxyethyl) sulfosuccinic acid ester disodium, mono(icosanyloxyethyl) sulfosuccinic acid ester disodium, di(methyl)sulfosuccinic acid ester sodium, di(ethyl)sulfosuccinic acid ester sodium, di(propyl)sulfosuccinic acid ester sodium, di(butyl)sulfosuccinic acid ester, di(butyl)sulfosuccinic acid ester sodium, di(butyl)sulfosuccinic acid ester potassium, di(butyl)sulfosuccinic acid ester ammonium, di(butyl)sulfosuccinic acid ester magnesium, di(butyl)sulfosuccinic acid ester calcium, di(pentyl)sulfosuccinic acid ester sodium, di(hexyl)sulfosuccinic acid ester sodium, di(heptyl)sulfosuccinic acid ester sodium, di(octyl)sulfosuccinic acid ester, di(octyl)sulfosuccinic acid ester sodium, di(octyl)sulfosuccinic acid ester potassium, di(octyl)sulfosuccinic acid ester ammonium, di(octyl)sulfosuccinic acid ester magnesium, di(octyl) sulfosuccinic acid ester calcium, (nonyl)sulfosuccinic acid ester, di(nonyl)sulfosuccinic acid ester sodium, di(nonyl) sulfosuccinic acid ester potassium, di(nonyl)sulfosuccinic acid ester ammonium, di(nonyl)sulfosuccinic acid ester magnesium, di(nonyl)sulfosuccinic acid ester calcium, di(decyl)sulfosuccinic acid ester sodium, di(undecyl)sulfosuccinic acid ester sodium, di(dodecyl)sulfosuccinic acid ester, di(dodecyl)sulfosuccinic acid ester sodium, di(dodecyl) sulfosuccinic acid ester potassium, di(dodecyl)sulfosuccinic acid ester ammonium, di(dodecyl)sulfosuccinic acid ester magnesium, di(dodecyl)sulfosuccinic acid ester calcium, di(tridecyl)sulfosuccinic acid ester, di(tridecyl)sulfosuccinic acid ester sodium, di(tridecyl)sulfosuccinic acid ester potassium, di(tridecyl)sulfosuccinic acid ester ammonium, di(tridecyl)sulfosuccinic acid ester magnesium, di(tridecyl)sulfosuccinic acid ester calcium, di(tetradecyl)sulfosuccinic acid ester, di(tetradecyl)sulfosuccinic acid ester sodium, di(tetradecyl)sulfosuccinic acid ester potassium, di(tetradecyl)sulfosuccinic acid ester ammonium, di(tetradecyl)sulfosuccinic acid ester magnesium, di(tetradecyl)sulfosuccinic acid ester calcium, di(pentadecyl)sulfosuccinic acid ester sodium, di(hexadecyl)sulfosuccinic acid ester, di(hexadecyl)sulfosuccinic acid ester sodium, di(hexadecyl)

sulfosuccinic acid ester potassium, di(hexadecyl)sulfosuccinic acid ester ammonium, di(hexadecyl)sulfosuccinic acid ester magnesium, di(hexadecyl)sulfosuccinic acid ester calcium, di(heptadecyl)sulfosuccinic acid ester sodium, di(octadecyl)sulfosuccinic acid ester, di(octadecyl)sulfosuccinic acid ester sodium, di(octadecyl)sulfosuccinic acid ester potassium, di(octadecyl)sulfosuccinic acid ester ammonium, di(octadecyl)sulfosuccinic acid ester magnesium, di(octadecyl)sulfosuccinic acid ester calcium, di(nonadecyl)sulfosuccinic acid ester sodium, di(icosanyl)sulfosuccinic acid ester sodium, dibenzylsulfosuccinic acid ester sodium, di(butoxyethyl)sulfosuccinic acid ester sodium, di(hexyloxyethyl)sulfosuccinic acid ester sodium, di(octyloxyethyl)sulfosuccinic acid ester sodium, di(nonyloxyethyl)sulfosuccinic acid ester sodium, di(decyloxyethyl)sulfosuccinic acid ester sodium, di(undecyloxyethyl)sulfosuccinic acid ester sodium, di(dodecyloxyethyl)sulfosuccinic acid ester sodium, di(tridecyloxyethyl)sulfosuccinic acid ester sodium, di(tetradecyloxyethyl)sulfosuccinic acid ester sodium, di(pentadecyloxyethyl)sulfosuccinic acid ester sodium, di(hexadecyloxyethyl)sulfosuccinic acid ester sodium, di(octadecyloxyethyl)sulfosuccinic acid ester sodium, di(octadecyloxyethyl)sulfosuccinic acid ester potassium, di(octadecyloxyethyl)sulfosuccinic acid ester ammonium, di(octadecyloxyethyl)sulfosuccinic acid ester magnesium, di(octadecyloxyethyl)sulfosuccinic acid ester calcium, (nonadecyloxyethyl)sulfosuccinic acid ester sodium, (icosanyloxyethyl) sulfosuccinic acid ester sodium, and the like.

Of the surfactants in which FG is represented by the general formula (301), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable. Of the surfactants described above, sulfosuccinic acid ester surfactants are relatively preferable.

Examples of the surfactants in which FG is represented by the general formula (302) include alcohol sulfuric acid ester salt surfactants, aryl sulfuric acid ester salt surfactants and alkenyl sulfuric acid salt surfactants (in which the alkenyl groups present in the surfactants are not polymerizable).

Examples of the alcohol sulfuric acid ester salt surfactants include butyl sulfuric acid ester sodium, pentyl sulfuric acid ester sodium, hexyl sulfuric acid ester sodium, heptyl sulfuric acid ester sodium, octyl sulfuric acid ester sodium, nonyl sulfuric acid ester sodium, decyl sulfuric acid ester sodium, undecyl sulfuric acid ester sodium, dodecyl sulfuric acid ester triethanolamine salt, dodecyl sulfuric acid ester sodium, dodecyl sulfuric acid ester potassium, dodecyl sulfuric acid ester ammonium, dodecyl sulfuric acid ester magnesium, dodecyl sulfuric acid ester calcium, tridecyl sulfuric acid ester sodium, tetradecyl sulfuric acid ester sodium, pentadecyl sulfuric acid ester sodium, hexadecyl sulfuric acid ester sodium, heptadecyl sulfuric acid ester sodium, octadecyl sulfuric acid ester sodium, nonadecyl sulfuric acid ester sodium, icosanyl sulfuric acid ester sodium, 3-lauric acid-2-hydroxy-propyl sulfuric acid ester sodium, 3-lauric acid-2-hydroxy-propyl sulfuric acid ester potassium, 3-lauric acid-2-hydroxy-propyl sulfuric acid ester ammonium, 3-lauric acid-2-hydroxy-propyl sulfuric acid ester magnesium, 3-lauric acid-2-hydroxy-propyl sulfuric acid ester calcium, 3-myristic acid-2-hydroxy-propyl sulfuric acid ester sodium, 3-myristic acid-2-hydroxy-propyl sulfuric acid ester potassium, 3-myristic acid-2-hydroxy-propyl sulfuric acid ester ammonium, 3-myristic acid-2-hydroxy-propyl sulfuric acid ester magnesium, 3-myristic acid-2-hydroxy-propyl sulfuric acid ester calcium, 3-palmitic acid-2-hydroxy-propyl sulfuric acid ester sodium, 3-palmitic acid-2-hydroxy-propyl sulfuric acid ester potassium, 3-palmitic acid-2-hydroxy-propyl sulfuric acid ester ammonium, 3-palmitic acid-2-hydroxy-propyl sulfuric acid ester magnesium, 3-palmitic acid-2-hydroxy-propyl sulfuric acid ester calcium, 3-stearic acid-2-hydroxy-propyl sulfuric acid ester sodium, 3-stearic acid-2-hydroxy-propyl sulfuric acid ester potassium, 3-stearic acid-2-hydroxy-propyl sulfuric acid ester ammonium, 3-stearic acid-2-hydroxy-propyl sulfuric acid ester magnesium, 3-stearic acid-2-hydroxy-propyl sulfuric acid ester calcium, 3-oleic acid-2-hydroxy-propyl sulfuric acid ester sodium, 3-oleic acid-2-hydroxy-propyl sulfuric acid ester potassium, 3-oleic acid-2-hydroxy-propyl sulfuric acid ester ammonium, 3-oleic acid-2-hydroxy-propyl sulfuric acid ester magnesium, 3-oleic acid-2-hydroxy-propyl sulfuric acid ester calcium, 3-behenic acid-2-hydroxy-propyl sulfuric acid ester sodium, 3-behenic acid-2-hydroxy-propyl sulfuric acid ester potassium, 3-behenic acid-2-hydroxy-propyl sulfuric acid ester ammonium, 3-behenic acid-2-hydroxy-propyl sulfuric acid ester magnesium, 3-behenic acid-2-hydroxy-propyl sulfuric acid ester calcium, ethylene glycol mono(octylphenyl) ether sulfuric acid ester sodium, ethylene glycol mono(octylphenyl) ether sulfuric acid ester potassium, ethylene glycol mono(octylphenyl) ether sulfuric acid ester ammonium, ethylene glycol mono(octylphenyl) ether sulfuric acid ester magnesium, ethylene glycol mono(octylphenyl) ether sulfuric acid ester calcium, diethylene glycol mono(octylphenyl) ether sulfuric acid ester sodium, diethylene glycol mono(octylphenyl) ether sulfuric acid ester potassium, diethylene glycol mono(octylphenyl) ether sulfuric acid ester ammonium, diethylene glycol mono(octylphenyl) ether sulfuric acid ester magnesium, diethylene glycol mono(octylphenyl) ether sulfuric acid ester calcium, triethylene glycol mono(octylphenyl) ether sulfuric acid ester sodium, triethylene glycol mono(octylphenyl) ether sulfuric acid ester potassium, triethylene glycol mono(octylphenyl) ether sulfuric acid ester ammonium, triethylene glycol mono(octylphenyl) ether sulfuric acid ester magnesium, triethylene glycol mono(octylphenyl) ether sulfuric acid ester calcium, tetraethylene glycol mono(octylphenyl) ether sulfuric acid ester sodium, tetraethylene glycol mono(octylphenyl) ether sulfuric acid ester potassium, tetraethylene glycol mono(octylphenyl) ether sulfuric acid ester ammonium, tetraethylene glycol mono(octylphenyl) ether sulfuric acid ester magnesium, tetraethylene glycol mono(octylphenyl) ether sulfuric acid ester calcium, polyethylene glycol mono(octylphenyl) ether sulfuric acid ester sodium, polyethylene glycol mono(octylphenyl) ether sulfuric acid ester potassium, polyethylene glycol mono(octylphenyl) ether sulfuric acid ester ammonium, polyethylene glycol mono(octylphenyl) ether sulfuric acid ester magnesium, polyethylene glycol mono(octylphenyl) ether sulfuric acid ester calcium, ethylene glycol mono(nonylphenyl) ether sulfuric acid ester sodium, ethylene glycol mono(nonylphenyl) ether sulfuric acid ester potassium, ethylene glycol mono(nonylphenyl) ether sulfuric acid ester ammonium, ethylene glycol mono(nonylphenyl) ether sulfuric acid ester magnesium, ethylene glycol mono(nonylphenyl) ether sulfuric acid ester calcium, diethylene glycol mono(nonylphenyl) ether sulfuric acid ester sodium, diethylene glycol mono(nonylphenyl) ether sulfuric acid ester potassium, diethylene glycol mono(nonylphenyl) ether sulfuric acid ester ammonium, diethylene glycol mono(nonylphenyl) ether sulfuric acid ester magnesium, diethylene glycol mono(nonylphenyl) ether sulfuric acid ester calcium, triethylene glycol mono(nonylphenyl) ether sulfuric acid ester sodium, triethylene glycol mono(nonylphenyl) ether sulfuric acid ester potassium, triethylene glycol mono(nonylphenyl) ether sulfuric acid ester ammonium, triethylene glycol mono(nonylphenyl) ether sulfuric acid ester magnesium, triethylene glycol mono(nonylphenyl) ether sulfuric acid ester calcium, tetraethylene glycol mono(nonylphenyl) ether sulfuric acid ester sodium, tetraethylene glycol mono(nonylphenyl) ether sulfuric acid ester potassium, tetraethylene glycol mono(nonylphenyl) ether sulfuric acid ester ammonium, tetraethylene glycol mono(nonylphenyl) ether sulfuric acid ester magnesium, tetraethylene glycol mono(nonylphenyl) ether sulfuric acid ester calcium, polyethylene glycol mono(nonylphenyl) ether sulfuric acid ester sodium, polyethylene glycol mono(nonylphenyl) ether sulfuric acid ester potassium, polyethylene glycol mono(nonylphenyl) ether sulfuric acid ester ammonium, polyethylene glycol mono(nonylphenyl) ether sulfuric acid ester magnesium, polyethylene glycol mono(nonylphenyl) ether sulfuric acid ester calcium, butyloxyethyl sulfuric acid ester sodium, isobutyloxyethyl sulfuric acid ester sodium, t-butyloxyethyl sulfuric acid ester sodium, pentyloxyethyl sulfuric acid ester sodium, hexyloxyethyl sulfuric acid ester sodium, heptyloxyethyl sulfuric acid ester sodium, octyloxyethyl sulfuric acid ester sodium, nonyloxyethyl sulfuric acid ester sodium, decyloxyethyl sulfuric acid ester sodium, undecyloxyethyl sulfuric acid ester sodium, dodecyloxyethyl sulfuric acid ester (lauryloxyethyl sulfuric acid ester) triethanolamine, dodecyloxyethyl sulfuric acid ester (lauryloxyethyl sulfuric acid ester) sodium, dodecyloxyethyl sulfuric acid ester (lauryloxyethyl sulfuric acid ester) potassium, dodecyloxyethyl sulfuric acid ester (lauryloxyethyl sulfuric acid ester) ammonium, dodecyloxyethyl sulfuric acid ester (lauryloxyethyl sulfuric acid ester) magnesium, dodecyloxyethyl sulfuric acid ester (lauryloxyethyl sulfuric acid ester) calcium, tridecyloxyethyl sulfuric acid ester sodium, tetradecyloxyethyl sulfuric acid ester sodium, pentadecyloxyethyl sulfuric acid ester sodium, hexadecyloxyethyl sulfuric acid ester sodium, heptadecyloxyethyl sulfuric acid ester sodium, octadecyloxyethyl sulfuric acid ester sodium, nonadecyloxyethyl sulfuric acid ester sodium, icosanyloxyethyl sulfuric acid ester sodium, butyloxypropyl-2-sulfuric acid ester sodium, isobutyloxypropyl-2-sulfuric acid ester sodium, t-butyloxypropyl-2-sulfuric acid ester sodium, pentyloxypropyl-2-sulfuric acid ester sodium, hexyloxypropyl-2-sulfuric acid ester sodium, heptyloxypropyl-2-sulfuric acid ester sodium, octyloxypropyl-2-sulfuric acid ester sodium, nonyloxypropyl-2-sulfuric acid ester sodium, decyloxypropyl-2-sulfuric acid ester sodium, undecyloxypropyl-2-sulfuric acid ester sodium, dodecyloxypropyl-2-sulfuric acid ester (lauryloxypropyl-2-sulfuric acid ester), dodecyloxypropyl-2-sulfuric acid ester (lauryloxypropyl-2-sulfuric acid ester) sodium, dodecyloxypropyl-2-sulfuric acid ester (lauryloxypropyl-2-sulfuric acid ester) potassium, dodecyloxypropyl-2-sulfuric acid ester (lauryloxypropyl-2-sulfuric acid ester) ammonium, dodecyloxypropyl-2-sulfuric acid ester (lauryloxypropyl-2-sulfuric acid ester) magnesium, dodecyloxypropyl-2-sulfuric acid ester (lauryloxypropyl-2-sulfuric acid ester) calcium, tridecyloxypropyl-2-sulfuric acid ester sodium, tetradecyloxypropyl-2-sulfuric acid ester sodium, pentadecyloxypropyl-2-sulfuric acid ester sodium, hexadecyloxypropyl-2-sulfuric acid ester sodium, heptadecyloxypropyl-2-sulfuric acid ester sodium, octadecyloxypropyl-2-sulfuric acid ester sodium, nonadecyloxypropyl-2-sulfuric acid ester sodium, icosanyloxypropyl-2-sulfuric acid ester sodium, butyloxy-3-oxapentyl sulfuric acid ester sodium, isobutyloxy-3-oxapentyl sulfuric acid ester sodium, t-butyloxy-3-oxapentyl sulfuric acid ester sodium, pentyloxy-3-oxapentyl sulfuric acid ester sodium, hexyloxy-3-oxapentyl sulfuric acid ester sodium, heptyloxy-3-oxapentyl sulfuric acid ester sodium, octyloxy-3-oxapentyl sulfuric acid ester sodium, nonyloxy-3-oxapentyl sulfuric acid ester sodium, decyloxy-3-oxapentyl sulfuric acid ester sodium, undecyloxy-3-oxapentyl sulfuric acid ester sodium, dodecyloxy-3-oxapentyl sulfuric acid ester (lauryloxy-3-oxapentyl sulfuric acid ester) triethanolamine, dodecyloxy-3-oxapentyl sulfuric acid ester (lauryloxy-3-oxapentyl sulfuric acid ester) sodium, dodecyloxy-3-oxapentyl sulfuric acid ester (lauryloxy-3-oxapentyl sulfuric acid ester) potassium, dodecyloxy-3-oxapentyl sulfuric acid ester (lauryloxy-3-oxapentyl sulfuric acid ester) ammonium, dodecyloxy-3-oxapentyl sulfuric acid ester (lauryloxy-3-oxapentyl sulfuric acid ester) magnesium, dodecyloxy-3-oxapentyl sulfuric acid ester (lauryloxy-3-oxapentyl sulfuric acid ester) calcium, tridecyloxy-3-oxapentyl sulfuric acid ester sodium, tetradecyloxy-3-oxapentyl sulfuric acid ester sodium, pentadecyloxy-3-oxapentyl sulfuric acid ester sodium, hexadecyloxy-3-oxapentyl sulfuric acid ester sodium, heptadecyloxy-3-oxapentyl sulfuric acid ester sodium, octadecyloxy-3-oxapentyl sulfuric acid ester sodium, nonadecyloxy-3-oxapentyl sulfuric acid ester sodium, icosanyloxy-3-oxapentyl sulfuric acid ester sodium, butyloxy-3,6-dioxaoctyl sulfuric acid ester sodium, isobutyloxy-3,6-dioxaoctyl sulfuric acid ester sodium, t-butyloxy-3,6-dioxaoctyl sulfuric acid ester sodium, pentyloxy-3,6-dioxaoctyl sulfuric acid ester sodium, hexyloxy-3,6-dioxaoctyl sulfuric acid ester sodium, heptyloxy-3,6-dioxaoctyl sulfuric acid ester sodium, octyloxy-3,6-dioxaoctyl sulfuric acid ester sodium, nonyloxy-3,6-dioxaoctyl sulfuric acid ester sodium, decyloxy-3,6-dioxaoctyl sulfuric acid ester sodium, undecyloxy-3,6-dioxaoctyl sulfuric acid ester sodium, dodecyloxy-3,6-dioxaoctyl sulfuric acid ester (lauryloxy-3,6-dioxaoctyl sulfuric acid ester), dodecyloxy-3,6-dioxaoctyl sulfuric acid ester (lauryloxy-3,6-dioxaoctyl sulfuric acid ester) sodium, dodecyloxy-3,6-dioxaoctyl sulfuric acid ester (lauryloxy-3,6-dioxaoctyl sulfuric acid ester) potassium, dodecyloxy-3,6-dioxaoctyl sulfuric acid ester (lauryloxy-3,6-dioxaoctyl sulfuric acid ester) ammonium, dodecyloxy-3,6-dioxaoctyl sulfuric acid ester (lauryloxy-3,6-dioxaoctyl sulfuric acid ester) magnesium, tridecyloxy-3,6-dioxaoctyl sulfuric acid ester sodium, tetradecyloxy-3,6-dioxaoctyl sulfuric acid ester sodium, pentadecyloxy-3,6-dioxaoctyl sulfuric acid ester sodium, hexadecyloxy-3,6-dioxaoctyl sulfuric acid ester sodium, heptadecyloxy-3,6-dioxaoctyl sulfuric acid ester sodium, octadecyloxy-3,6-dioxaoctyl sulfuric acid ester sodium, nonadecyloxy-3,6-dioxaoctyl sulfuric acid ester sodium, icosanyloxy-3,6-dioxaoctyl sulfuric acid ester sodium, and the like.

Examples of the aryl sulfuric acid ester salt surfactants include phenyl sulfuric acid ester sodium, methyl benzene sulfuric acid ester sodium, ethyl benzene sulfuric acid ester sodium, propyl benzene sulfuric acid ester sodium, butyl benzene sulfuric acid ester sodium, pentyl benzene sulfuric acid ester sodium, hexyl benzene sulfuric acid ester sodium, heptyl benzene sulfuric acid ester sodium, octyl benzene sulfuric acid ester sodium, nonyl benzene sulfuric acid ester sodium, decyl benzene sulfuric acid ester sodium, undecyl benzene sulfuric acid ester sodium, dodecyl benzene sulfuric acid ester sodium, tridecyl benzene sulfuric acid ester sodium, tetradecyl benzene sulfuric acid ester sodium, pentadecyl benzene sulfuric acid ester sodium, hexadecyl benzene sulfuric acid ester sodium, heptadecyl benzene sulfuric acid ester sodium, octadecyl benzene sulfuric acid ester sodium, nonadecyl benzene sulfuric acid ester sodium, icosanyl benzene sulfuric acid ester sodium, 7-ethyl-2-methyl-undecane-4-sulfuric acid ester sodium, di(methyl)benzene sulfuric acid ester sodium, di(ethyl)benzene sulfuric acid ester sodium, di(propyl)benzene sulfuric acid ester sodium, di(butyl)benzene sulfuric acid ester sodium, di(pentyl)benzene sulfuric acid ester sodium, di(hexyl)benzene sulfuric acid ester sodium, di(heptyl)benzene sulfuric acid ester sodium, di(octyl)benzene sulfuric acid ester sodium, di(nonyl)benzene sulfuric acid ester sodium, di(decyl)benzene sulfuric acid ester sodium, di(undecyl)benzene sulfuric acid ester sodium, di(dodecyl)benzene sulfuric acid ester sodium, di(tridecyl)benzene sulfuric acid ester sodium, di(tetradecyl)benzene sulfuric acid ester sodium, di(pentadecyl)benzene sulfuric acid ester sodium, di(hexadecyl)benzene sulfuric acid ester sodium, di(heptadecyl)benzene sulfuric acid ester sodium, di(octadecyl)benzene sulfuric acid ester sodium, di(nonadecyl)benzene sulfuric acid ester sodium, di(icosanyl)benzene sulfuric acid ester sodium, tri(methyl)benzene sulfuric acid ester sodium, tri(ethyl)benzene sulfuric acid ester sodium, tri(propyl)benzene sulfuric acid ester sodium, tri(butyl)benzene sulfuric acid ester sodium, tri(pentyl)benzene sulfuric acid ester sodium, tri(hexyl)benzene)benzene sulfuric acid ester sodium, tri(heptyl)benzene sulfuric acid ester sodium, tri(octyl)benzene sulfuric acid ester sodium, tri(nonyl)benzene sulfuric acid ester sodium, tri(decyl)benzene sulfuric acid ester sodium, tri(undecyl)benzene sulfuric acid ester sodium, tri(dodecyl)benzene sulfuric acid ester sodium, tri(tridecyl)benzene sulfuric acid ester sodium, tri(tetradecyl)benzene sulfuric acid ester sodium, tri(pentadecyl)benzene sulfuric acid ester sodium, tri(hexadecyl)benzene sulfuric acid ester sodium, tri(heptadecyl)benzene sulfuric acid ester sodium, tri(octadecyl)benzene sulfuric acid ester sodium, tri(nonadecyl)benzene sulfuric acid ester sodium, tri(icosanyl)benzene sulfuric acid ester sodium, naphthalene sulfuric acid ester sodium, methyl naphthalene sulfuric acid ester sodium, ethyl naphthalene sulfuric acid ester sodium, propyl naphthalene sulfuric acid ester sodium, butyl naphthalene sulfuric acid ester sodium, pentyl naphthalene sulfuric acid ester sodium, hexyl naphthalene sulfuric acid ester sodium, heptyl naphthalene sulfuric acid ester sodium, octyl naphthalene sulfuric acid ester sodium, nonyl naphthalene sulfuric acid ester sodium, decyl naphthalene sulfuric acid ester sodium, undecyl naphthalene sulfuric acid ester sodium, dodecyl naphthalene sulfuric acid ester sodium, tridecyl naphthalene sulfuric acid ester sodium, tetradecyl naphthalene sulfuric acid ester sodium, pentadecyl naphthalene sulfuric acid ester sodium, hexadecyl naphthalene sulfuric acid ester sodium, heptadecyl naphthalene sulfuric acid ester sodium, octadecylnaphthalene sulfuric acid ester sodium, nonadecyl naphthalene sulfuric acid ester sodium, icosanyl naphthalene sulfuric acid ester sodium, di(methyl)naphthalene sulfuric acid ester sodium, di(ethyl)naphthalene sulfuric acid ester sodium, di(propyl)naphthalene sulfuric acid ester sodium, di(butyl)naphthalene sulfuric acid ester sodium, di(pentyl)naphthalene sulfuric acid ester sodium, di(hexyl)naphthalene sulfuric acid ester sodium, di(heptyl)naphthalene sulfuric acid ester sodium, di(octyl)naphthalene sulfuric acid ester sodium, di(nonyl)naphthalene sulfuric acid ester sodium, di(decyl)naphthalene sulfuric acid ester sodium, di(undecyl)naphthalene sulfuric acid ester sodium, di(dodecyl)naphthalene sulfuric acid ester sodium, di(tridecyl)naphthalene sulfuric acid ester sodium, di(tetradecyl)naphthalene sulfuric acid ester sodium, di(pentadecyl)naphthalene sulfuric acid ester sodium, di(hexadecyl)naphthalene sulfuric acid ester sodium, di(heptadecyl)naphthalene sulfuric acid ester sodium, di(octadecyl)naphthalene sulfuric acid ester sodium, di(nonadecyl)naphthalene sulfuric acid ester sodium, di(icosanyl)naphthalene sulfuric acid ester sodium, tri(methyl)naphthalene sulfuric acid ester sodium, tri(ethyl)naphthalene sulfuric acid ester sodium, tri(propyl)naphthalene sulfuric acid ester sodium, tri(butyl)naphthalene sulfuric acid ester sodium, tri(pentyl)naphthalene sulfuric acid ester sodium, tri(hexyl)naphthalene sulfuric acid ester sodium, tri(heptyl)naphthalene sulfuric acid ester sodium, tri(octyl)naphthalene sulfuric acid ester sodium, tri(nonyl)naphthalene sulfuric acid ester sodium, tri(decyl)naphthalene sulfuric acid ester sodium, tri(undecyl)naphthalene sulfuric acid ester sodium, tri(dodecyl)naphthalene sulfuric acid ester sodium, tri(tridecyl)naphthalene sulfuric acid ester sodium, tri(tetradecyl)naphthalene sulfuric acid ester sodium, tri(pentadecyl)naphthalene sulfuric acid ester sodium, tri(hexadecyl)naphthalene sulfuric acid ester sodium, tri(heptadecyl)naphthalene sulfuric acid ester sodium, tri(octadecyl)naphthalene sulfuric acid ester sodium, tri(nonadecyl)naphthalene sulfuric acid ester sodium, tri(icosanyl)naphthalene sulfuric acid ester sodium, and the like.

Examples of the alkenyl sulfuric acid salt surfactants include butynyl sulfuric acid ester, hexynyl sulfuric acid ester, octynyl sulfuric acid ester, decynyl sulfuric acid ester, dodecynyl sulfuric acid ester, tetradecynyl sulfuric acid ester, hexadecynyl sulfuric acid ester, octadecynyl sulfuric acid ester, icosanyl sulfuric acid ester, butynyloxysulfuric acid ester, hexynyloxysulfuric acid ester, octynyloxysulfuric acid ester, decynyloxysulfuric acid ester, dodecynyloxysulfuric acid ester, tetradecynyloxysulfuric acid ester, hexadecynyloxysulfuric acid ester, octadecynyloxysulfuric acid ester, icosanyloxy sulfuric acid ester, butynyloxy-3-oxapentyl sulfuric acid ester, hexynyloxy-3-oxapentyl sulfuric acid ester, octynyloxy-3-oxapentyl sulfuric acid ester, decynyloxy-3-oxapentyl sulfuric acid ester, dodecynyloxy-3-oxapentyl sulfuric acid ester, tetradecynyloxy-3-oxapentyl sulfuric acid ester, hexadecynyloxy-3-oxapentyl sulfuric acid ester, octadecynyloxy-3-oxapentyl sulfuric acid ester, icosanyloxy-3-oxapentyl sulfuric acid ester, butynyloxy-3,6-dioxaoctyl sulfuric acid ester, hexynyloxy-3,6-dioxaoctyl sulfuric acid ester, octynyloxy-3,6-dioxaoctyl sulfuric acid ester, decynyloxy-3,6-dioxaoctyl sulfuric acid ester, dodecynyloxy-3,6-dioxaoctyl sulfuric acid ester, tetradecynyloxy-3,6-dioxaoctyl sulfuric acid ester, hexadecynyloxy-3,6-dioxaoctyl sulfuric acid ester, octadecynyloxy-3,6-dioxaoctyl sulfuric acid ester, icosanyloxy-3,6-dioxaoctyl sulfuric acid ester, butynyloxy-3,6,9-trioxaundecyl sulfuric acid ester, hexynyloxy-3,6,9-trioxaundecyl sulfuric acid ester, octynyloxy-3,6,9-trioxaundecyl sulfuric acid ester, decynyloxy-3,6,9-trioxaundecyl sulfuric acid ester, dodecynyloxy-3,6,9-trioxaundecyl sulfuric acid ester, tetradecynyloxy-3,6,9-trioxaundecyl sulfuric acid ester, hexadecynyloxy-3,6,9-trioxaundecyl sulfuric acid ester, octadecynyloxy-3,6,9-trioxaundecyl sulfuric acid ester and icosanyloxy-3,6,9-trioxaundecyl sulfuric acid ester, and salts thereof such as sodium salt, potassium salt, ammonium salt, triethanolamine salt, magnesium salt, and calcium salts, and the like.

Of the surfactants in which FG is represented by the general formula (302), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Of the surfactants described above, alcohol sulfuric acid ester salt surfactants are relatively preferable.

Examples of the surfactants in which FG is represented by the general formula (303) include alkyl phosphoric acid surfactants, alkoxyalkyl phosphoric acid ester surfactants, aryl phosphoric acid surfactants and aryloxyalkyl phosphoric acid surfactants.

Examples of the alkyl phosphoric acid ester surfactants include butyl phosphoric acid monoester, pentyl phosphoric acid monoester, hexyl phosphoric acid monoester, heptyl phosphoric acid monoester, octyl phosphoric acid monoester, nonyl phosphoric acid monoester, decyl phosphoric acid monoester, undecyl phosphoric acid monoester, dodecyl phosphoric acid monoester (lauryl phosphoric acid monoester), tridecyl phosphoric acid monoester, tetradecyl phosphoric acid monoester, pentadecyl phosphoric acid monoester, hexadecyl phosphoric acid monoester, heptadecyl phosphoric acid monoester, octadecyl phosphoric acid monoester, nonadecyl phosphoric acid monoester, icosanyl phosphoric acid monoester, and salts thereof such as sodium salt, potassium salt, ammonium salt, magnesium salt, and calcium salt, and the like.

Examples of the alkoxyalkyl phosphoric acid ester surfactants include butyloxyethyl phosphoric acid monoester, pentyloxyethyl phosphoric acid monoester, hexyloxyethyl phosphoric acid monoester, heptyloxyethyl phosphoric acid monoester, octyloxyethyl phosphoric acid monoester, nonyloxyethyl phosphoric acid monoester, decyloxyethyl phosphoric acid monoester, undecyloxyethyl phosphoric acid monoester, dodecyloxyethyl phosphoric acid monoester(lauryloxyethyl phosphoric acid monoester), tridecyloxyethyl phosphoric acid monoester, tetradecyloxyethyl phosphoric acid monoester, pentadecyloxyethyl phosphoric acid monoester, hexadecyloxyethyl phosphoric acid monoester, heptadecyloxyethyl phosphoric acid monoester, octadecyloxyethyl phosphoric acid monoester, nonadecyloxyethyl phosphoric acid monoester, icosanyloxyethyl phosphoric acid monoester, butyloxy-3-oxapentyl phosphoric acid monoester, pentyloxy-3-oxapentyl phosphoric acid monoester, hexyloxy-3-oxapentyl phosphoric acid monoester, heptyloxy-3-oxapentyl phosphoric acid monoester, octyloxy-3-oxapentyl phosphoric acid monoester, nonyloxy-3-oxapentyl phosphoric acid monoester, decyloxy-3-oxapentyl phosphoric acid monoester, undecyloxy-3-oxapentyl phosphoric acid monoester, dodecyloxy-3-oxapentyl phosphoric acid monoester(lauryloxy-3-oxapentyl phosphoric acid monoester), tridecyloxy-3-oxapentyl phosphoric acid monoester, tetradecyloxy-3-oxapentyl phosphoric acid monoester, pentadecyloxy-3-oxapentyl phosphoric acid monoester, hexadecyloxy-3-oxapentyl phosphoric acid monoester, heptadecyloxy-3-oxapentyl phosphoric acid monoester, octadecyloxy-3-oxapentyl phosphoric acid monoester, nonadecyloxy-3-oxapentyl phosphoric acid monoester, icosanyloxy-3-oxapentyl phosphoric acid monoester, butyloxy-3,6-dioxaoctyl phosphoric acid monoester, pentyloxy-3,6-dioxaoctyl phosphoric acid monoester, hexyloxy-3,6-dioxaoctyl phosphoric acid monoester, heptyloxy-3,6-dioxaoctyl phosphoric acid monoester, octyloxy-3,6-dioxaoctyl phosphoric acid monoester, nonyloxy-3,6-dioxaoctyl phosphoric acid monoester, decyloxy-3,6-dioxaoctyl phosphoric acid monoester, undecyloxy-3,6-dioxaoctyl phosphoric acid monoester, dodecyloxy-3,6-dioxaoctyl phosphoric acid monoester(lauryloxy-3,6-dioxaoctyl phosphoric acid monoester), tridecyloxy-3,6-dioxaoctyl phosphoric acid monoester, tetradecyloxy-3,6-dioxaoctyl phosphoric acid monoester, pentadecyloxy-3,6-dioxaoctyl phosphoric acid monoester, hexadecyloxy-3,6-dioxaoctyl phosphoric acid monoester, heptadecyloxy-3,6-dioxaoctyl phosphoric acid monoester, octadecyloxy-3,6-dioxaoctyl phosphoric acid monoester, nonadecyloxy-3,6-dioxaoctyl phosphoric acid monoester, icosanyloxy-3,6-dioxaoctyl phosphoric acid monoester, and salts thereof such as sodium salt, potassium salt, ammonium salt, triethanolamine salt, magnesium salt, and calcium salt, and the like.

Examples of the aryl phosphoric acid ester surfactants include methylphenyl phosphoric acid monoester, ethylphenyl phosphoric acid monoester, propylphenyl phosphoric acid monoester, butylphenyl phosphoric acid monoester, pentylphenyl phosphoric acid monoester, hexylphenyl phosphoric acid monoester, heptylphenyl phosphoric acid monoester, octylphenyl phosphoric acid monoester, nonylphenyl phosphoric acid monoester, decylphenyl phosphoric acid monoester, undecylphenyl phosphoric acid monoester, dodecylphenylphosphoric acid monoester(laurylphenyl phosphoric acid monoester), tridecylphenyl phosphoric acid monoester, tetradecylphenyl phosphoric acid monoester, pentadecylphenyl phosphoric acid monoester, hexadecylphenyl phosphoric acid monoester, heptadecylphenyl phosphoric acid monoester, octadecylphenyl phosphoric acid monoester, nonadecylphenyl phosphoric acid monoester, icosanylphenyl phosphoric acid monoester, butylphenyl phosphoric acid diester, pentylphenyl phosphoric acid diester, hexylphenyl phosphoric acid diester, heptylphenyl phosphoric acid diester, octylphenyl phosphoric acid diester, nonylphenyl phosphoric acid diester, decylphenyl phosphoric acid diester, undecylphenyl phosphoric acid diester, dodecylphenylphosphoric acid diester (laurylphenyl phosphoric acid diester), tridecylphenyl phosphoric acid diester, tetradecylphenyl phosphoric acid diester, pentadecylphenyl phosphoric acid diester, hexadecylphenyl phosphoric acid diester, heptadecylphenyl phosphoric acid diester, octadecylphenyl phosphoric acid diester, nonadecylphenyl phosphoric acid diester, icosanylphenyl phosphoric acid diester, and salts thereof such as sodium salt, potassium salt, ammonium salt, triethanolamine salt, magnesium salt, and calcium salt, and the like.

Examples of the aryloxyalkyl phosphoric acid ester surfactants include methylphenoxyethyl phosphoric acid monoester, ethylphenoxyethyl phosphoric acid monoester, propylphenoxyethyl phosphoric acid monoester, butylphenoxyethyl phosphoric acid monoester, pentylphenoxyethyl phosphoric acid monoester, hexylphenoxyethyl phosphoric acid monoester, heptylphenoxyethyl phosphoric acid monoester, octylphenoxyethyl phosphoric acid monoester, nonylphenoxyethyl phosphoric acid monoester, decylphenoxyethyl phosphoric acid monoester, undecylphenoxyethyl phosphoric acid monoester, dodecylphenoxyethyl phosphoric acid monoester(laurylphenoxyethyl phosphoric acid monoester), tridecylphenoxyethyl phosphoric acid monoester, tetradecylphenoxyethyl phosphoric acid monoester, pentadecylphenoxyethyl phosphoric acid monoester, hexadecylphenoxyethyl phosphoric acid monoester, heptadecylphenoxyethyl phosphoric acid monoester, octadecylphenoxyethyl phosphoric acid monoester, nonadecylphenoxyethyl phosphoric acid monoester, icosanylphenoxyethyl phosphoric acid monoester, butylphenoxy-3-oxapentyl phosphoric acid monoester, pentylphenoxy-3-oxapentyl phosphoric acid monoester, hexylphenoxy-3-oxapentyl phosphoric acid monoester, heptylphenoxy-3-oxapentyl phosphoric acid monoester, octylphenoxy-3-oxapentyl phosphoric acid monoester, nonylphenoxy-3-oxapentyl phosphoric acid monoester, decylphenoxy-3-oxapentyl phosphoric acid monoester, undecylphenoxy-3-oxapentyl phosphoric acid monoester, dodecylphenoxy-3-oxapentyl phosphoric acid monoester(laurylphenoxy-3-oxapentyl phosphoric acid monoester), tridecylphenoxy-3-oxapentyl phosphoric acid monoester, tetradecylphenoxy-3-oxapentyl phosphoric acid monoester, pentadecylphenoxy-3-oxapentyl phosphoric acid monoester, hexadecylphenoxy-3-oxapentyl phosphoric acid monoester, heptadecylphenoxy-3-oxapentyl phosphoric acid monoester, octadecylphenoxy-3-oxapentyl phosphoric acid monoester, nonadecylphenoxy-3-oxapentyl phosphoric acid monoester, icosanylphenoxy-3-oxapentyl phosphoric acid monoester, butylphenoxy-3,6-dioxaoctyl phosphoric acid monoester, pentylphenoxy-3,6-dioxaoctyl phosphoric acid monoester, hexylphenoxy-3,6-dioxaoctyl phosphoric acid monoester, heptylphenoxy-3,6-dioxaoctyl phosphoric acid monoester, octylphenoxy-3,6-dioxaoctyl phosphoric acid monoester, nonylphenoxy-3,6-dioxaoctyl phosphoric acid monoester, decylphenoxy-3,6-dioxaoctyl phosphoric acid monoester, undecylphenoxy-3,6-dioxaoctyl phosphoric acid monoester, dodecylphenoxy-3,6-dioxaoctyl phosphoric acid monoester(laurylphenoxy-3,6-dioxaoctyl phosphoric acid monoester), tridecylphenoxy-3,6-dioxaoctyl phosphoric acid monoester, tetradecylphenoxy-3,6-dioxaoctyl phosphoric acid monoester, pentadecylphenoxy-3,6-dioxaoctyl phosphoric acid monoester, hexadecylphenoxy-3,6-dioxaoctyl phosphoric acid monoester, heptadecylphenoxy-3,6-dioxaoctyl phosphoric acid monoester, octadecylphenoxy-3,6-dioxaoctyl phosphoric acid monoester, nonadecylphenoxy-3,6-dioxaoctyl phosphoric acid monoester, icosanylphenoxy-3,6-dioxaoctyl phosphoric acid monoester, butylphenoxy-3,6,9-trioxaundecyl phosphoric acid monoester, pentylphenoxy-3,6,9-trioxaundecyl phosphoric acid monoester, hexylphenoxy-3,6,9-trioxaundecyl phosphoric acid monoester, heptylphenoxy-3,6,9-trioxaundecyl phosphoric acid monoester, octylphenoxy-3,6,9-trioxaundecyl phosphoric acid monoester, nonylphenoxy-3,6,9-trioxaundecyl phosphoric acid monoester, decylphenoxy-3,6,9-trioxaundecyl phosphoric acid monoester, undecylphenoxy-3,6,9-trioxaundecyl phosphoric acid monoester, dodecylphenoxy-3,6,9-trioxaundecyl phosphoric acid monoester(laurylphenoxy-3,6,9-trioxaundecyl phosphoric acid monoester), tridecylphenoxy-3,6,9-trioxaundecyl phosphoric acid monoester, tetradecylphenoxy-3,6,9-trioxaundecyl phosphoric acid monoester, pentadecylphenoxy-3,6,9-trioxaundecyl phosphoric acid monoester, hexadecylphenoxy-3,6,9-trioxaundecyl phosphoric acid monoester, heptadecylphenoxy-3,6,9-trioxaundecyl phosphoric acid monoester, octadecylphenoxy-3,6,9-trioxaundecyl phosphoric acid monoester, nonadecylphenoxy-3,6,9-trioxaundecyl phosphoric acid monoester, icosanylphenoxy-3,6,9-trioxaundecyl phosphoric acid monoester, methyl naphthalenoxyethyl phosphoric acid monoester, ethyl naphthalenoxyethyl phosphoric acid monoester, propyl naphthalenoxyethyl phosphoric acid monoester, butyl naphthalenoxyethyl phosphoric acid monoester, pentyl naphthalenoxyethyl phosphoric acid monoester, hexyl naphthalenoxyethyl phosphoric acid monoester, heptyl naphthalenoxyethyl phosphoric acid monoester, octyl naphthalenoxyethyl phosphoric acid monoester, nonyl naphthalenoxyethyl phosphoric acid monoester, decyl naphthalenoxyethyl phosphoric acid monoester, undecyl naphthalenoxyethyl phosphoric acid monoester, dodecyl naphthalenoxyethyl phosphoric acid monoester(lauryl naphthalenoxyethyl phosphoric acid monoester), tridecyl naphthalenoxyethyl phosphoric acid monoester, tetradecyl naphthalenoxyethyl phosphoric acid monoester, pentadecyl naphthalenoxyethyl phosphoric acid monoester, hexadecyl naphthalenoxyethyl phosphoric acid monoester, heptadecyl naphthalenoxyethyl phosphoric acid monoester, octadecyl naphthalenoxyethyl phosphoric acid monoester, nonadecyl naphthalenoxyethyl phosphoric acid monoester, icosanyl naphthalenoxyethyl phosphoric acid monoester, butyl naphthalenoxy 3-oxapentyl phosphoric acid monoester, pentyl naphthalenoxy 3-oxapentyl phosphoric acid monoester, hexyl naphthalenoxy 3-oxapentyl phosphoric acid monoester, heptyl naphthalenoxy 3-oxapentyl phosphoric acid monoester, octyl naphthalenoxy 3-oxapentyl phosphoric acid monoester, nonyl naphthalenoxy 3-oxapentyl phosphoric acid monoester, decyl naphthalenoxy 3-oxapentyl phosphoric acid monoester, undecyl naphthalenoxy 3-oxapentyl phosphoric acid monoester, dodecyl naphthalenoxy 3-oxapentyl phosphoric acid monoester(lauryl naphthalenoxy 3-oxapentyl phosphoric acid monoester), tridecyl naphthalenoxy 3-oxapentyl phosphoric acid monoester, tetradecyl naphthalenoxy 3-oxapentyl phosphoric acid monoester, pentadecyl naphthalenoxy 3-oxapentyl phosphoric acid monoester, hexadecyl naphthalenoxy 3-oxapentyl phosphoric acid monoester, heptadecyl naphthalenoxy 3-oxapentyl phosphoric acid monoester, octadecyl naphthalenoxy 3-oxapentyl phosphoric acid monoester, nonadecyl naphthalenoxy 3-oxapentyl phosphoric acid monoester, icosanyl naphthalenoxy 3-oxapentyl phosphoric acid monoester, butyl naphthalenoxy 3,6-dioxaoctyl phosphoric acid monoester, pentyl naphthalenoxy 3,6-dioxaoctyl phosphoric acid monoester, hexyl naphthalenoxy 3,6-dioxaoctyl phosphoric acid monoester, heptyl naphthalenoxy 3,6-dioxaoctyl phosphoric acid monoester, octyl naphthalenoxy 3,6-dioxaoctyl phosphoric acid monoester, nonyl naphthalenoxy 3,6-dioxaoctyl phosphoric acid monoester, decyl naphthalenoxy 3,6-dioxaoctyl phosphoric acid monoester, undecyl naphthalenoxy 3,6-dioxaoctyl phosphoric acid monoester, dodecyl naphthalenoxy 3,6-dioxaoctyl phosphoric acid monoester(lauryl naphthalenoxy 3,6-dioxaoctyl phosphoric acid monoester), tridecyl naphthalenoxy 3,6-dioxaoctyl phosphoric acid monoester, tetradecyl naphthalenoxy 3,6-dioxaoctyl phosphoric acid monoester, pentadecyl naphthalenoxy 3,6-dioxaoctyl phosphoric acid monoester, hexadecyl naphthalenoxy 3,6-dioxaoctyl phosphoric acid monoester, heptadecyl naphthalenoxy 3,6-dioxaoctyl phosphoric acid monoester, octadecyl naphthalenoxy 3,6-dioxaoctyl phosphoric acid monoester, nonadecyl naphthalenoxy 3,6-dioxaoctyl phosphoric acid monoester, icosanyl naphthalenoxy 3,6-dioxaoctyl phosphoric acid monoester, butyl naphthalenoxy 3,6,9-trioxaundecyl phosphoric acid monoester, pentyl naphthalenoxy 3,6,9-trioxaundecyl phosphoric acid monoester, hexyl naphthalenoxy 3,6,9-trioxaundecyl phosphoric acid monoester, heptyl naphthalenoxy 3,6,9-trioxaundecyl phosphoric acid monoester, octyl naphthalenoxy 3,6,9-trioxaundecyl phosphoric acid monoester, nonyl naphthalenoxy 3,6,9-trioxaundecyl phosphoric acid monoester, decyl naphthalenoxy 3,6,9-trioxaundecyl phosphoric acid monoester, undecyl naphthalenoxy 3,6,9-trioxaundecyl phosphoric acid monoester, dodecyl naphthalenoxy 3,6,9-trioxaundecyl phosphoric acid monoester(lauryl naphthalenoxy 3,6,9-trioxaundecyl phosphoric acid monoester), tridecyl naphthalenoxy 3,6,9-trioxaundecyl phosphoric acid monoester, tetradecyl naphthalenoxy 3,6,9-trioxaundecyl phosphoric acid monoester, pentadecyl naphthalenoxy 3,6,9-trioxaundecyl phosphoric acid monoester, hexadecyl naphthalenoxy 3,6,9-trioxaundecyl phosphoric acid monoester, heptadecyl naphthalenoxy 3,6,9-trioxaundecyl phosphoric acid monoester, octadecyl naphthalenoxy 3,6,9-trioxaundecyl phosphoric acid monoester, nonadecyl naphthalenoxy 3,6,9-trioxaundecyl phosphoric acid monoester, icosanyl naphthalenoxy 3,6,9-trioxaundecyl phosphoric acid monoester, and salts thereof such as sodium salt, potassium salt, ammonium salt, triethanolamine salt, magnesium salt, and calcium salt, and the like.

Of the surfactants in which FG is represented by the general formula (303), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable. Of the surfactants described above, alkoxyalkylphosphoric acid ester surfactants and aryloxyalkylphosphoric acid ester surfactants are relatively preferable.

Examples of the surfactants in which FG is represented by the general formula (304) include alkyl phosphoric acid ester surfactants, alkoxyalkyl phosphoric acid ester surfactants and aryloxyalkyl phosphoric acid ester surfactants.

Examples of the alkyl phosphoric acid ester surfactants include butyl phosphoric acid diester, pentyl phosphoric acid diester, hexyl phosphoric acid diester, heptyl phosphoric acid diester, octyl phosphoric acid diester, nonyl phosphoric acid diester, decyl phosphoric acid diester, undecyl phosphoric acid diester, dodecyl phosphoric acid diester(lauryl phosphoric acid diester), tridecyl phosphoric acid diester, tetradecyl phosphoric acid diester, pentadecyl phosphoric acid diester, hexadecyl phosphoric acid diester, heptadecyl phosphoric acid diester, octadecyl phosphoric acid diester, nonadecyl phosphoric acid diester, icosanyl phosphoric acid diester, and salts thereof such as sodium salt, potassium salt, ammonium salt, triethanolamine salt, magnesium salt, and calcium salt, and the like.

Examples of the alkoxyalkyl phosphoric acid ester surfactants include butyloxyethyl phosphoric acid diester, pentyloxyethyl phosphoric acid diester, hexyloxyethyl phosphoric acid diester, heptyloxyethyl phosphoric acid diester, octyloxyethyl phosphoric acid diester, nonyloxyethyl phosphoric acid diester, decyloxyethyl phosphoric acid diester, undecyloxyethyl phosphoric acid diester, dodecyloxyethyl phosphoric acid diester, tridecyloxyethyl phosphoric acid diester, tetradecyloxyethyl phosphoric acid diester, pentadecyloxyethyl phosphoric acid diester, hexadecyloxyethyl phosphoric acid diester, heptadecyloxyethyl phosphoric acid diester, octadecyloxyethyl phosphoric acid diester, nonadecyloxyethyl phosphoric acid diester, icosanyloxyethyl phosphoric acid diester,
butyloxy-3-oxapentyl phosphoric acid diester, pentyloxy-3-oxapentyl phosphoric acid diester, hexyloxy-3-oxapentyl phosphoric acid diester, heptyloxy-3-oxapentyl phosphoric acid diester, octyloxy-3-oxapentyl phosphoric acid diester, nonyloxy-3-oxapentyl phosphoric acid diester, decyloxy-3-oxapentyl phosphoric acid diester, undecyloxy-3-oxapentyl phosphoric acid diester, dodecyloxy-3-oxapentyl phosphoric acid diester, tridecyloxy-3-oxapentyl phosphoric acid diester, tetradecyloxy-3-oxapentyl phosphoric acid diester, pentadecyloxy-3-oxapentyl phosphoric acid diester, hexadecyloxy-3-oxapentyl phosphoric acid diester, heptadecyloxy-3-oxapentyl phosphoric acid diester, octadecyloxy-3-oxapentyl phosphoric acid diester, nonadecyloxy-3-oxapentyl phosphoric acid diester, icosanyloxy-3-oxapentyl phosphoric acid diester,
butyloxy-3,6-dioxaoctyl phosphoric acid diester, pentyloxy-3,6-dioxaoctyl phosphoric acid diester, hexyloxy-3,6-dioxaoctyl phosphoric acid diester, heptyloxy-3,6-dioxaoctyl phosphoric acid diester, octyloxy-3,6-dioxaoctyl phosphoric acid diester, nonyloxy-3,6-dioxaoctyl phosphoric acid diester, decyloxy-3,6-dioxaoctyl phosphoric acid diester, undecyloxy-3,6-dioxaoctyl phosphoric acid diester, dodecyloxy-3,6-dioxaoctyl phosphoric acid diester(lauryloxy-3,6-dioxaoctyl phosphoric acid diester), tridecyloxy-3,6-dioxaoctyl phosphoric acid diester, tetradecyloxy-3,6-dioxaoctyl phosphoric acid diester, pentadecyloxy-3,6-dioxaoctyl phosphoric acid diester, hexadecyloxy-3,6-dioxaoctyl phosphoric acid diester, heptadecyloxy-3,6-dioxaoctyl phosphoric acid diester, octadecyloxy-3,6-dioxaoctyl phosphoric acid diester, nonadecyloxy-3,6-dioxaoctyl phosphoric acid diester, icosanyloxy-3,6-dioxaoctyl phosphoric acid diester, butyloxy-3,6,9-trioxaundecyl phosphoric acid diester, pentyloxy-3,6,9-trioxaundecyl phosphoric acid diester, hexyloxy-3,6,9-trioxaundecyl phosphoric acid diester, heptyloxy-3,6,9-trioxaundecyl phosphoric acid diester, octyloxy-3,6,9-trioxaundecyl phosphoric acid diester, nonyloxy-3,6,9-trioxaundecyl phosphoric acid diester, decyloxy-3,6,9-trioxaundecyl phosphoric acid diester, undecyloxy-3,6,9-trioxaundecyl phosphoric acid diester, dodecyloxy-3,6,9-trioxaundecyl phosphoric acid diester (lauryloxy-3,6,9-trioxaundecyl phosphoric acid diester), tridecyloxy-3,6,9-trioxaundecyl phosphoric acid diester, tetradecyloxy-3,6,9-trioxaundecyl phosphoric acid diester, pentadecyloxy-3,6,9-trioxaundecyl phosphoric acid diester, hexadecyloxy-3,6,9-trioxaundecyl phosphoric acid diester, heptadecyloxy-3,6,9-trioxaundecyl phosphoric acid diester, octadecyloxy-3,6,9-trioxaundecyl phosphoric acid diester, nonadecyloxy-3,6,9-trioxaundecyl phosphoric acid diester, icosanyloxy-3,6,9-trioxaundecyl phosphoric acid diester, and salts thereof such as sodium salt, potassium salt, ammonium salt, triethanolamine salt, magnesium salt, and calcium salt, and the like.

Examples of the aryloxyalkyl phosphoric acid ester surfactants include butylphenoxyethyl phosphoric acid diester, pentylphenoxyethyl phosphoric acid diester, hexylphenoxyethyl phosphoric acid diester, heptylphenoxyethyl phosphoric acid diester, octylphenoxyethyl phosphoric acid diester, nonylphenoxyethyl phosphoric acid diester, decylphenoxyethyl phosphoric acid diester, undecylphenoxyethyl phosphoric acid diester, dodecylphenoxyethyl phosphoric acid diester(laurylphenoxyethyl phosphoric acid diester), tridecylphenoxyethyl phosphoric acid diester, tetradecylphenoxyethyl phosphoric acid diester, pentadecylphenoxyethyl phosphoric acid diester, hexadecylphenoxyethyl phosphoric acid diester, heptadecylphenoxyethyl phosphoric acid diester, octadecylphenoxyethyl phosphoric acid diester, nonadecylphenoxyethyl phosphoric acid diester, icosanylphenoxyethyl phosphoric acid diester, butylphenoxy-3-oxapentyl phosphoric acid diester, pentylphenoxy-3-oxapentyl phosphoric acid diester, hexylphenoxy-3-oxapentyl phosphoric acid diester, heptylphenoxy-3-oxapentyl phosphoric acid diester, octylphenoxy-3-oxapentyl phosphoric acid diester, nonylphenoxy-3-oxapentyl phosphoric acid diester, decylphenoxy-3-oxapentyl phosphoric acid diester, undecylphenoxy-3-oxapentyl phosphoric acid diester, dodecylphenoxy-3-oxapentyl phosphoric acid diester(laurylphenoxy-3-oxapentyl phosphoric acid diester), tridecylphenoxy-3-oxapentyl phosphoric acid diester, tetradecylphenoxy-3-oxapentyl phosphoric acid diester, pentadecylphenoxy-3- oxapentyl phosphoric acid diester, hexadecylphenoxy-3-oxapentyl phosphoric acid diester, heptadecylphenoxy-3-oxapentyl phosphoric acid diester, octadecylphenoxy-3-oxapentyl phosphoric acid diester, nonadecylphenoxy-3-oxapentyl phosphoric acid diester, icosanylphenoxy-3-oxapentyl phosphoric acid diester, butylphenoxy-3,6-dioxaoctyl phosphoric acid diester, pentylphenoxy-3,6-dioxaoctyl phosphoric acid diester, hexylphenoxy-3,6-dioxaoctyl phosphoric acid diester, heptylphenoxy-3,6-dioxaoctyl phosphoric acid diester, octylphenoxy-3,6-dioxaoctyl phosphoric acid diester, nonylphenoxy-3,6-dioxaoctyl phosphoric acid diester, decylphenoxy-3,6-dioxaoctyl phosphoric acid diester, undecylphenoxy-3,6-dioxaoctyl phosphoric acid diester, dodecylphenoxy-3,6-dioxaoctyl phosphoric acid diester(laurylphenoxy-3,6-dioxaoctyl phosphoric acid diester), tridecylphenoxy-3,6-dioxaoctyl phosphoric acid diester, tetradecylphenoxy-3,6-dioxaoctyl phosphoric acid diester, pentadecylphenoxy-3,6-dioxaoctyl phosphoric acid diester, hexadecylphenoxy-3,6-dioxaoctyl phosphoric acid diester, heptadecylphenoxy-3,6-dioxaoctyl phosphoric acid diester, octadecylphenoxy-3,6-dioxaoctyl phosphoric acid diester, nonadecylphenoxy-3,6-dioxaoctyl phosphoric acid diester, icosanylphenoxy-3,6-dioxaoctyl phosphoric acid diester, butylphenoxy-3,6,9-trioxaundecyl phosphoric acid diester, pentylphenoxy-3,6,9-trioxaundecyl phosphoric acid diester, hexylphenoxy-3,6,9-trioxaundecyl phosphoric acid diester, heptylphenoxy-3,6,9-trioxaundecyl phosphoric acid diester, octylphenoxy-3,6,9-trioxaundecyl phosphoric acid diester, nonylphenoxy-3,6,9-trioxaundecyl phosphoric acid diester, decylphenoxy-3,6,9-trioxaundecyl phosphoric acid diester, undecylphenoxy-3,6,9-trioxaundecyl phosphoric acid diester, dodecylphenoxy-3,6,9-trioxaundecyl phosphoric acid diester(laurylphenoxy-3,6,9-trioxaundecyl phosphoric acid diester), tridecylphenoxy-3,6,9-trioxaundecyl phosphoric acid diester, tetradecylphenoxy-3,6,9-trioxaundecyl phosphoric acid diester, pentadecylphenoxy-3,6,9-trioxaundecyl phosphoric acid diester, hexadecylphenoxy-3,6,9-trioxaundecyl phosphoric acid diester, heptadecylphenoxy-3,6,9-trioxaundecyl phosphoric acid diester, octadecylphenoxy-3,6,9-trioxaundecyl phosphoric acid diester, nonadecylphenoxy-3,6,9-trioxaundecyl phosphoric acid diester, icosanylphenoxy-3,6,9-trioxaundecyl phosphoric acid diester, butyl naphthalenoxyethyl phosphoric acid diester, pentyl naphthalenoxyethyl phosphoric acid diester, hexyl naphthalenoxyethyl phosphoric acid diester, heptyl naphthalenoxyethyl phosphoric acid diester, octyl naphthalenoxyethyl phosphoric acid diester, nonyl naphthalenoxyethyl phosphoric acid diester, decyl naphthalenoxyethyl phosphoric acid diester, undecyl naphthalenoxyethyl phosphoric acid diester, dodecyl naphthalenoxyethyl phosphoric acid diester (lauryl naphthalenoxyethyl phosphoric acid diester), tridecyl naphthalenoxyethyl phosphoric acid diester, tetradecyl naphthalenoxyethyl phosphoric acid diester, pentadecyl naphthalenoxyethyl phosphoric acid diester, hexadecyl naphthalenoxyethyl phosphoric acid diester, heptadecyl naphthalenoxyethyl phosphoric acid diester, octadecyl naphthalenoxyethyl phosphoric acid diester, nonadecyl naphthalenoxyethyl phosphoric acid diester, icosanyl naphthalenoxyethyl phosphoric acid diester, butyl naphthalenoxy 3-oxapentyl phosphoric acid diester, pentyl naphthalenoxy 3-oxapentyl phosphoric acid diester, hexyl naphthalenoxy 3-oxapentyl phosphoric acid diester, heptyl naphthalenoxy 3-oxapentyl phosphoric acid diester, octyl naphthalenoxy 3-oxapentyl phosphoric acid diester, nonyl naphthalenoxy 3-oxapentyl phosphoric acid diester, decyl naphthalenoxy 3-oxapentyl phosphoric acid diester, undecyl naphthalenoxy 3-oxapentyl phosphoric acid diester, dodecyl naphthalenoxy 3-oxapentyl phosphoric acid diester (lauryl naphthalenoxy 3-oxapentyl phosphoric acid diester), tridecyl naphthalenoxy 3-oxapentyl phosphoric acid diester, tetradecyl naphthalenoxy 3-oxapentyl phosphoric acid diester, pentadecyl naphthalenoxy 3-oxapentyl phosphoric acid diester, hexadecyl naphthalenoxy 3-oxapentyl phosphoric acid diester, heptadecyl naphthalenoxy 3-oxapentyl phosphoric acid diester, octadecyl naphthalenoxy 3-oxapentyl phosphoric acid diester, nonadecyl naphthalenoxy 3-oxapentyl phosphoric acid diester, icosanyl naphthalenoxy 3-oxapentyl phosphoric acid diester, butyl naphthalenoxy 3,6,9-trioxaundecyl phosphoric acid diester, pentyl naphthalenoxy 3,6,9-trioxaundecyl phosphoric acid diester, hexyl naphthalenoxy 3,6,9-trioxaundecyl phosphoric acid diester, heptyl naphthalenoxy 3,6,9-trioxaundecyl phosphoric acid diester, octyl naphthalenoxy 3,6,9-trioxaundecyl phosphoric acid diester, nonyl naphthalenoxy 3,6,9-trioxaundecyl phosphoric acid diester, decyl naphthalenoxy 3,6,9-trioxaundecyl phosphoric acid diester, undecyl naphthalenoxy 3,6,9-trioxaundecyl phosphoric acid diester, dodecyl naphthalenoxy 3,6,9-trioxaundecyl phosphoric acid diester(lauryl naphthalenoxy 3,6,9-trioxaundecyl phosphoric acid diester), tridecyl naphthalenoxy 3,6,9-trioxaundecyl phosphoric acid diester, tetradecyl naphthalenoxy 3,6,9-trioxaundecyl phosphoric acid diester, pentadecyl naphthalenoxy 3,6,9-trioxaundecyl phosphoric acid diester, hexadecyl naphthalenoxy 3,6,9-trioxaundecyl phosphoric acid diester, heptadecyl naphthalenoxy 3,6,9-trioxaundecyl phosphoric acid diester, octadecyl naphthalenoxy 3,6,9-trioxaundecyl phosphoric acid diester, nonadecyl naphthalenoxy 3,6,9-trioxaundecyl phosphoric acid diester, icosanyl naphthalenoxy 3,6,9-trioxaundecyl phosphoric acid diester, and salts thereof such as sodium salt, potassium salt, ammonium salt, triethanolamine salt, magnesium salt, and calcium salt, and the like.

Of the surfactants in which FG is represented by the general formula (304), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Of the surfactants described above, alkoxyalkylphosphoric acid ester surfactants and aryloxyalkylphosphoric acid ester surfactants are relatively preferable.

Examples of the surfactants in which FG is represented by the general formula (305) include aliphatic carboxylic acid surfactants, alkyloxy aliphatic carboxylic acid surfactants, aryloxy aliphatic carboxylic acid surfactants, aromatic carboxylic acid surfactants and N-acylamino acid surfactants.

Examples of the aliphatic carboxylic acid surfactants include butyric acid, valeric acid, caproic acid, caprylic acid, capric acid, lauric acid, myristic acid, palmitic acid, stearic acid, isostearic acid, oleic acid, behenic acid, cyclohexanecarboxylic acid, phenyl acetic acid, soybean oil, coconut oil, palm oil, flaxseed oil, cotton oil, canola oil, tung oil, castor oil, polyacrylic acid, copolymer of acrylic acid and methyl methacrylate, and salts thereof such as sodium salt, potassium salt, ammonium salt, triethanolamine salt, magnesium salt, and calcium salt, and the like.

Examples of the alkyloxy aliphatic carboxylic acid surfactants include butoxyethyloxyacetic acid, pentyloxyethyloxyacetic acid, hexyloxyethyloxyacetic acid, heptyloxyethyloxyacetic acid, octyloxyethyloxyacetic acid, nonyloxyethyloxyacetic acid, decyloxyethyloxyacetic acid, undecyloxyethyloxyacetic acid, dodecyloxyethyloxyacetic acid, tridecyloxyethyloxyacetic acid, tetradecyloxyethyloxyacetic acid, pentadecyloxyethyloxyacetic acid, hexadecyloxyethyloxyacetic acid, heptadecyloxyethyloxyacetic acid, octadecyloxyethyloxyacetic acid, nonadecyloxyethyloxyacetic acid, icosanyloxyethyloxyacetic acid,
butoxy-3-oxapentyloxyacetic acid, pentyloxy-3-oxapentyloxyacetic acid, hexyloxy-3-oxapentyloxyacetic acid, heptyloxy-3-oxapentyloxyacetic acid, octyloxy-3-oxapentyloxyacetic acid, nonyloxy-3-oxapentyloxyacetic acid, decyloxy-3-oxapentyloxyacetic acid, undecyloxy-3-oxapentyloxyacetic acid, dodecyloxy-3-oxapentyloxyacetic acid, tridecyloxy-3-oxapentyloxyacetic acid, tetradecyloxy-3-oxapentyloxyacetic acid, pentadecyloxy-3-oxapentyloxyacetic acid, hexadecyloxy-3-oxapentyloxyacetic acid, heptadecyloxy-3-oxapentyloxyacetic acid, octadecyloxy-3-oxapentyloxyacetic acid, nonadecyloxy-3-oxapentyloxyacetic acid, icosanyloxy-3-oxapentyloxyacetic acid, butoxy-3,6-dioxaoctyloxyacetic acid, pentyloxy-3,6-dioxaoctyloxyacetic acid, hexyloxy-3,6-dioxaoctyloxyacetic acid, heptyloxy-3,6-dioxaoctyloxyacetic acid, octyloxy-3,6-dioxaoctyloxyacetic acid, nonyloxy-3,6-dioxaoctyloxyacetic acid, decyloxy-3,6-dioxaoctyloxyacetic acid, undecyloxy-3,6-dioxaoctyloxyacetic acid, dodecyloxy-3,6-dioxaoctyloxyacetic acid, tridecyloxy-3,6-dioxaoctyloxyacetic acid, tetradecyloxy-3,6-dioxaoctyloxyacetic acid, pentadecyloxy-3,6-dioxaoctyloxyacetic acid, hexadecyloxy-3,6-dioxaoctyloxyacetic acid, heptadecyloxy-3,6-dioxaoctyloxyacetic acid, octadecyloxy-3,6-dioxaoctyloxyacetic acid, nonadecyloxy-3,6-dioxaoctyloxyacetic acid, icosanyloxy-3,6-dioxaoctyloxyacetic acid, butoxy-3,6,9-trioxaundecyloxyacetic acid, pentyloxy-3,6,9-trioxaundecyloxyacetic acid, hexyloxy-3,6,9-trioxaundecyloxyacetic acid, heptyloxy-3,6,9-trioxaundecyloxyacetic acid, octyloxy-3,6,9-trioxaundecyloxyacetic acid, nonyloxy-3,6,9-trioxaundecyloxyacetic acid, decyloxy-3,6,9-trioxaundecyloxyacetic acid, undecyloxy-3,6,9-trioxaundecyloxyacetic acid, dodecyloxy-3,6,9-trioxaundecyloxyacetic acid, tridecyloxy-3,6,9-trioxaundecyloxyacetic acid, tetradecyloxy-3,6,9-trioxaundecyloxyacetic acid, pentadecyloxy-3,6,9-trioxaundecyloxyacetic acid, hexadecyloxy-3,6,9-trioxaundecyloxyacetic acid, heptadecyloxy-3,6,9-trioxaundecyloxyacetic acid, octadecyloxy-3,6,9-trioxaundecyloxyacetic acid, nonadecyloxy-3,6,9-trioxaundecyloxyacetic acid, icosanyloxy-3,6,9-trioxaundecyloxyacetic acid, and salts thereof such as sodium salt, potassium salt, ammonium salt, triethanolamine salt, magnesium salt, and calcium salt, and the like.

Examples of the aryloxy aliphatic carboxylic acid surfactants include butylphenoxyethyloxyacetic acid, pentylphenoxyethyloxyacetic acid, hexylphenoxyethyloxyacetic acid, heptylphenoxyethyloxyacetic acid, octylphenoxyethyloxyacetic acid, nonylphenoxyethyloxyacetic acid, decylphenoxyethyloxyacetic acid, undecylphenoxyethyloxyacetic acid, dodecylphenoxyethyloxyacetic acid, tridecylphenoxyethyloxyacetic acid, tetradecylphenoxyethyloxyacetic acid, pentadecylphenoxyethyloxyacetic acid, hexadecylphenoxyethyloxyacetic acid, heptadecylphenoxyethyloxyacetic acid, octadecylphenoxyethyloxyacetic acid, nonadecylphenoxyethyloxyacetic acid, icosanylphenoxyethyloxyacetic acid, butylphenoxy-3-oxapentyloxyacetic acid, pentylphenoxy-3-oxapentyloxyacetic acid, hexylphenoxy-3-oxapentyloxyacetic acid, heptylphenoxy-3-oxapentyloxyacetic acid, octylphenoxy-3-oxapentyloxyacetic acid, nonylphenoxy-3-oxapentyloxyacetic acid, decylphenoxy-3-oxapentyloxyacetic acid, dodecylphenoxy-3-oxapentyloxyacetic acid, tridecylphenoxy-3-oxapentyloxyacetic acid, tetradecylphenoxy-3-oxapentyloxyacetic acid, pentadecylphenoxy-3-oxapentyloxyacetic acid, hexadecylphenoxy-3-oxapentyloxyacetic acid, heptadecylphenoxy-3-oxapentyloxyacetic acid, octadecylphenoxy-3-oxapentyloxyacetic acid, nonadecylphenoxy-3-oxapentyloxyacetic acid, icosanylphenoxy-3-oxapentyloxyacetic acid, butylphenoxy-3,6-dioxaoctyloxyacetic acid, pentylphenoxy-3,6-dioxaoctyloxyacetic acid, hexylphenoxy-3,6-dioxaoctyloxyacetic acid, heptylphenoxy-3,6-dioxaoctyloxyacetic acid, octylphenoxy-3,6-dioxaoctyloxyacetic acid, nonylphenoxy-3,6-dioxaoctyloxyacetic acid, decylphenoxy-3,6-dioxaoctyloxyacetic acid, undecylphenoxy-3,6-dioxaoctyloxyacetic acid, dodecylphenoxy-3,6-dioxaoctyloxyacetic acid(laurylphenoxy-3,6-dioxaoctyloxyacetic acid), tridecylphenoxy-3,6-dioxaoctyloxyacetic acid, tetradecylphenoxy-3,6-dioxaoctyloxyacetic acid, pentadecylphenoxy-3,6-dioxaoctyloxyacetic acid, hexadecylphenoxy-3,6-dioxaoctyloxyacetic acid, heptadecylphenoxy-3,6-dioxaoctyloxyacetic acid, octadecylphenoxy-3,6-dioxaoctyloxyacetic acid, nonadecylphenoxy-3,6-dioxaoctyloxyacetic acid, icosanylphenoxy-3,6-dioxaoctyloxyacetic acid, butylphenoxy-3,6,9-trioxaundecyloxyacetic acid, pentylphenoxy-3,6,9-trioxaundecyloxyacetic acid, hexylphenoxy-3,6,9-trioxaundecyloxyacetic acid, heptylphenoxy-3,6,9-trioxaundecyloxyacetic acid, octylphenoxy-3,6,9-trioxaundecyloxyacetic acid, nonylphenoxy-3,6,9-trioxaundecyloxyacetic acid, decylphenoxy-3,6,9-trioxaundecyloxyacetic acid, undecylphenoxy-3,6,9-trioxaundecyloxyacetic acid, dodecylphenoxy-3,6,9-trioxaundecyloxyacetic acid(laurylphenoxy-3,6,9-trioxaundecyloxyacetic acid), tridecylphenoxy-3,6,9-trioxaundecyloxyacetic acid, tetradecylphenoxy-3,6,9-trioxaundecyloxyacetic acid, pentadecylphenoxy-3,6,9-trioxaundecyloxyacetic acid, hexadecylphenoxy-3,6,9-trioxaundecyloxyacetic acid, heptadecylphenoxy-3,6,9-trioxaundecyloxyacetic acid, octadecylphenoxy-3,6,9-trioxaundecyloxyacetic acid, nonadecylphenoxy-3,6,9-trioxaundecyloxyacetic acid, icosanylphenoxy-3,6,9-trioxaundecyloxyacetic acid, and salts thereof such as sodium salt, potassium salt, ammonium salt, triethanolamine salt, magnesium salt, and calcium salt, and the like.

Examples of the aromatic carboxylic acid surfactants include benzoic acid, toluic acid, chlorobenzoic acid, nitrobenzoic acid, hydroxybenzoic acid, methoxybenzoic acid, butoxybenzoic acid, pentyloxybenzoic acid, hexyloxybenzoic acid, heptyloxybenzoic acid, octyloxybenzoic acid, nonyloxybenzoic acid, decyloxybenzoic acid, undecyloxybenzoic acid, dodecyloxybenzoic acid, tridecyloxybenzoic acid, tetradecyloxybenzoic acid, pentadecyloxybenzoic acid, hexadecyloxybenzoic acid, heptadecyloxybenzoic acid, octadecyloxybenzoic acid, nonadecyloxybenzoic acid, icosanyloxybenzoic acid, and salts thereof such as sodium salt, potassium salt, ammonium salt, triethanolamine salt, magnesium salt, and calcium salt, and the like.

Examples of the N-acylamino acid surfactants include —N-acyl ester of butyric acid with glycine, —N-acyl ester of valeric acid with glycine, —N-acyl ester of caproic acid with glycine, —N-acyl ester of caprylic acid with glycine, —N-acyl ester of capric acid with glycine, —N-acyl ester of lauric acid with glycine, —N-acyl ester of myristic acid with glycine, —N-acyl ester of palmitic acid with glycine, —N-acyl ester of stearic acid with glycine, —N-acyl ester of isostearic acid with glycine, —N-acyl ester of oleic acid with glycine, —N-acyl ester of behenic acid with glycine, —N-acyl ester of cyclohexanecarboxylic acid with glycine, —N-acyl ester of phenyl acetic acid with glycine, —N-acyl ester of butyric acid with N-methyl glycine, —N-acyl ester of valeric acid with N-methyl glycine, —N-acyl ester of caproic acid with N-methyl glycine, —N-acyl ester of caprylic acid with N-methyl glycine, —N-acyl ester of capric acid with N-methyl glycine, —N-acyl ester of lauric acid with N-methyl glycine, —N-acyl ester of myristic acid with N-methyl glycine, —N-acyl ester of palmitic acid with N-methyl glycine, —N-acyl ester of stearic acid with N-methyl glycine, —N-acyl ester of isostearic acid with N-methyl glycine, —N-acyl ester of oleic acid with N-methyl glycine, —N-acyl ester of behenic acid with N-methyl glycine, —N-acyl ester of cyclohexanecarboxylic acid with N-methyl glycine, —N-acyl ester of phenyl acetic acid with N-methyl glycine, —N-acyl ester of butyric acid with alanine, —N-acyl ester of valeric acid with alanine, —N-acyl ester of caproic acid with alanine, —N-acyl ester of caprylic acid with alanine, —N-acyl ester of capric acid with alanine, —N-acyl ester of lauric acid with alanine, —N-acyl ester of myristic acid with alanine, —N-acyl ester of palmitic acid with alanine, —N-acyl ester of stearic acid with alanine, —N-acyl ester of isostearic acid with alanine, —N-acyl ester of oleic acid with alanine, —N-acyl ester of behenic acid with alanine, —N-acyl ester of cyclohexanecarboxylic acid with alanine, —N-acyl ester of phenyl acetic acid with alanine, —N-acyl ester of butyric acid with N-methyl alanine, —N-acyl ester of valeric acid with N-methyl alanine, —N-acyl ester of caproic acid with N-methyl alanine, —N-acyl ester of caprylic acid with N-methyl alanine, —N-acyl ester of capric acid with N-methyl alanine, —N-acyl ester of lauric acid with N-methyl alanine, —N-acyl ester of myristic acid with N-methyl alanine, —N-acyl ester of palmitic acid with N-methyl alanine, —N-acyl ester of stearic acid with N-methyl alanine, —N-acyl ester of isostearic acid with N-methyl alanine, —N-acyl ester of oleic acid with N-methyl alanine, —N-acyl ester of behenic acid with N-methyl alanine, —N-acyl ester of cyclohexanecarboxylic acid with N-methyl alanine, —N-acyl ester of phenyl acetic acid with N-methyl alanine, —N-acyl ester of butyric acid with collagen peptide, —N-acyl ester of valeric acid with collagen peptide, —N-acyl ester of caproic acid with collagen peptide, —N-acyl ester of caprylic acid with collagen peptide, —N-acyl ester of capric acid with collagen peptide, —N-acyl ester of lauric acid with collagen peptide, —N-acyl ester of myristic acid with collagen peptide, —N-acyl ester of palmitic acid with collagen peptide, —N-acyl ester of stearic acid with collagen peptide, —N-acyl ester of isostearic acid with collagen peptide, —N-acyl ester of oleic acid with collagen peptide, —N-acyl ester of behenic acid with collagen peptide, —N-acyl ester of cyclohexanecarboxylic acid with collagen peptide, —N-acyl ester of phenyl acetic acid with collagen peptide, and salts thereof such as sodium salt, potassium salt, ammonium salt, triethanolamine salt, magnesium salt, and calcium salt, and the like.

Of the surfactants in which FG is represented by the general formula (305), those compounds in which the organic residue has 8 to 60 carbon atoms are more preferable. Compounds in which the organic residue has 10 to 40 carbon atoms are still more preferable. Of the surfactants, relatively preferable are —N-acyl esters of glycine and an aliphatic carboxylic acid such as butyric acid, valeric acid, caproic acid, caprylic acid, capric acid, lauric acid, myristic acid, palmitic acid, stearic acid, isostearic acid, oleic acid, cyclohexanecarboxylic acid, and the like.

Examples of the surfactants in which FG is represented by the general formula (306) include alkylsuccinic acid surfactants, alkyl ether succinic acid surfactants, alkyl ester succinic acid surfactants, succinic acid thioester surfactants, N-acylaminosuccinic acid ester surfactants and N-acylglutamic acid ester surfactants.

Examples of the alkylsuccinic acid surfactants include butyl succinic acid, pentyl succinic acid, hexyl succinic acid, heptyl succinic acid, octyl succinic acid, nonyl succinic acid, decyl succinic acid, undecyl succinic acid, dodecyl succinic acid, tridecyl succinic acid, tetradecyl succinic acid, pentadecyl succinic acid, hexadecyl succinic acid, heptadecyl succinic acid, octadecyl succinic acid, nonadecyl succinic acid, icosanyl succinic acid, and salts thereof such as sodium salt, potassium salt, ammonium salt, triethanolamine salt, magnesium salt, and calcium salt, and the like.

Examples of the alkyl ether succinic acid surfactants include butyloxysuccinic acid, pentyloxysuccinic acid, hexyloxysuccinic acid, heptyloxysuccinic acid, octyloxysuccinic acid, nonyloxysuccinic acid, decyloxysuccinic acid, undecyloxysuccinic acid, dodecyloxysuccinic acid, tridecyloxysuccinic acid, tetradecyloxysuccinic acid, pentadecyloxysuccinic acid, hexadecyloxysuccinic acid, heptadecyloxysuccinic acid, octadecyloxysuccinic acid, nonadecyloxysuccinic acid, icosanyloxysuccinic acid, and salts thereof such as sodium salt, potassium salt, ammonium salt, triethanolamine salt, magnesium salt, and calcium salt, and the like.

Examples of the alkyl ester succinic acid surfactants include ester of butyric acid with hydroxysuccinic acid, ester of valeric acid with hydroxysuccinic acid, ester of caproic acid with hydroxysuccinic acid, ester of caprylic acid with hydroxysuccinic acid, ester of capric acid with hydroxysuccinic acid, ester of lauric acid with hydroxysuccinic acid, ester of myristic acid with hydroxysuccinic acid, ester of palmitic acid with hydroxysuccinic acid, ester of stearic acid with hydroxysuccinic acid, ester of isostearic acid with hydroxysuccinic acid, ester of oleic acid with hydroxysuccinic acid, ester of behenic acid with hydroxysuccinic acid, ester of cyclohexanecarboxylic acid with hydroxysuccinic acid, ester of phenyl acetic acid with hydroxysuccinic acid and salts thereof such as sodium salt, potassium salt, ammonium salt, triethanolamine salt, magnesium salt, and calcium salt, and the like.

Examples of the succinic acid thioester surfactants include thioester of butyric acid with mercaptosuccinic acid, thioester of valeric acid with mercaptosuccinic acid, thioester of caproic acid with mercaptosuccinic acid, thioester of caprylic acid with mercaptosuccinic acid, thioester of capric acid with mercaptosuccinic acid, thioester of lauric acid with mercaptosuccinic acid, thioester of myristic acid with mercaptosuccinic acid, thioester of palmitic acid with mercaptosuccinic acid, thioester of stearic acid with mercaptosuccinic acid, thioester of isostearic acid with mercaptosuccinic acid, thioester of oleic acid with mercaptosuccinic acid, thioester of behenic acid with mercaptosuccinic acid, thioester of cyclohexanecarboxylic acid with mercaptosuccinic acid, thioester of phenyl acetic acid with mercaptosuccinic acid and salts thereof such as sodium salt, potassium salt, ammonium salt, triethanolamine salt, magnesium salt, and calcium salt, and the like.

Examples of the N-acylaminosuccinic acid ester surfactants include N-acyl ester of butyric acid with aminosuccinic acid, N-acyl ester of valeric acid with aminosuccinic acid, N-acyl ester of caproic acid with aminosuccinic acid, N-acyl ester of caprylic acid with aminosuccinic acid, N-acyl ester of capric acid with aminosuccinic acid, N-acyl ester of lauric acid with aminosuccinic acid, N-acyl ester of myristic acid with aminosuccinic acid, N-acyl ester of palmitic acid with aminosuccinic acid, N-acyl ester of stearic acid with aminosuccinic acid, N-acyl ester of isostearic acid with aminosuccinic acid, N-acyl ester of oleic acid with aminosuccinic acid, N-acyl ester of behenic acid with aminosuccinic acid, N-acyl ester of cyclohexanecarboxylic acid with aminosuccinic acid, N-acyl ester of phenyl acetic acid with aminosuccinic acid, and salts thereof such as sodium salt, potassium salt, ammonium salt, triethanolamine salt, magnesium salt, and calcium salt, and the like.

Examples of the N-acylglutamic acid ester surfactants include N-acyl ester of butyric acid with glutamic acid, N-acyl ester of valeric acid with glutamic acid, N-acyl ester of caproic acid with glutamic acid, N-acyl ester of caprylic acid with glutamic acid, N-acyl ester of capric acid with glutamic acid, N-acyl ester of lauric acid with glutamic acid, N-acyl ester of myristic acid with glutamic acid, N-acyl ester of palmitic acid with glutamic acid, N-acyl ester of stearic acid with glutamic acid, N-acyl ester of isostearic acid with glutamic acid, N-acyl ester of oleic acid with glutamic acid, N-acyl ester of behenic acid with glutamic acid, N-acyl ester of cyclohexanecarboxylic acid with glutamic acid, N-acyl ester of phenyl acetic acid with glutamic acid, and salts thereof such as sodium salt, potassium salt, ammonium salt, triethanolamine salt, magnesium salt, and calcium salt, and the like.

Of the surfactants in which FG is represented by the general formula (306), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants in which FG is represented by the general formula (307) include phthalic acid ester surfactants.

Examples of the phthalic acid ester surfactants include butyl phthalate, pentyl phthalate, hexyl phthalate, heptyl phthalate, octyl phthalate, nonyl phthalate, decyl phthalate, undecyl phthalate, dodecyl(lauryl) phthalate, tridecyl phthalate, tetradecyl phthalate, pentadecyl phthalate, hexadecyl phthalate, heptadecyl phthalate, octadecyl phthalate, nonadecyl phthalate, icosanyl phthalate,
phthalic acid butyloxy, phthalic acid hexyloxy, phthalic acid octyloxy, phthalic acid decyloxy, phthalic acid dodecyloxy, phthalic acid tetradecyloxy, phthalic acid hexadecyloxy, phthalic acid octadecyloxy, phthalic acid icosanyloxy,
phthalic acid butyloxy-3-oxapentyl, phthalic acid hexyloxy-3-oxapentyl, phthalic acid octyloxy-3-oxapentyl, phthalic acid decyloxy-3-oxapentyl, phthalic acid dodecyloxy-3-oxapentyl, phthalic acid tetradecyloxy-3-oxapentyl, phthalic acid hexadecyloxy-3-oxapentyl, phthalic acid octadecyloxy-3-oxapentyl, phthalic acid icosanyloxy-3-oxapentyl,
phthalic acid butyloxy-3,6-dioxaoctyl, phthalic acid hexyloxy-3,6-dioxaoctyl, phthalic acid octyloxy-3,6-dioxaoctyl, phthalic acid decyloxy-3,6-dioxaoctyl, phthalic acid dodecyloxy-3,6-dioxaoctyl, phthalic acid tetradecyloxy-3,6-dioxaoctyl, phthalic acid hexadecyloxy-3,6-dioxaoctyl, phthalic acid octadecyloxy-3,6-dioxaoctyl, phthalic acid icosanyloxy-3,6-dioxaoctyl,
phthalic acid butyloxy-3,6,9-trioxaundecyl, phthalic acid hexyloxy-3,6,9-trioxaundecyl, phthalic acid octyloxy-3,6,9-trioxaundecyl, phthalic acid decyloxy-3,6,9-trioxaundecyl, phthalic acid dodecyloxy-3,6,9-trioxaundecyl, phthalic acid tetradecyloxy-3,6,9-trioxaundecyl, phthalic acid hexadecyloxy-3,6,9-trioxaundecyl, phthalic acid octadecyloxy-3,6,9-trioxaundecyl, phthalic acid icosanyloxy-3,6,9-trioxaundecyl, and salts thereof such as sodium salt, potassium salt, ammonium salt, triethanolamine salt, magnesium salt, and calcium salt, and the like.

Of the surfactants in which FG is represented by the general formula (307), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants in which FG is represented by the general formula (308) include iminodiacetic acid-N-acyl ester surfactants. Examples of the iminodiacetic acid-N-acyl ester surfactants include —N-acyl ester of butyric acid with iminodiacetic acid, —N-acyl ester of valeric acid with iminodiacetic acid, —N-acyl ester of caproic acid with iminodiacetic acid, —N-acyl ester of caprylic acid with iminodiacetic acid, —N-acyl ester of capric acid with iminodiacetic acid, —N-acyl ester of lauric acid with iminodiacetic acid, —N-acyl ester of myristic acid with iminodiacetic acid, —N-acyl ester of palmitic acid with iminodiacetic acid, —N-acyl ester of stearic acid with iminodiacetic acid, —N-acyl ester of isostearic acid with iminodiacetic acid, —N-acyl ester of oleic acid with iminodiacetic acid, —N-acyl ester of behenic acid with iminodiacetic acid, —N-acyl ester of cyclohexanecarboxylic acid with iminodiacetic acid, —N-acyl ester of phenyl acetic acid with iminodiacetic acid, and salts thereof such as sodium salt, potassium salt, ammonium salt, triethanolamine salt, magnesium salt, and calcium salt, and the like.

Of the surfactants in which FG is represented by the general formula (308), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the groups FG including a hydroxyl group include those hydrophilic groups represented by the general formulae (309), (310), (312) and (313) below.

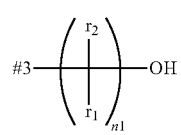

(309)

In the formula (309), $r_1$ and $r_2$ each independently represent a hydrogen atom, a methyl group, an ethyl group, or a hydroxyl group; n1 is an integer of 0 to 100; and #3 indicates a hand bonded to a carbon atom present in R in the formula (300). When the group represented by the formula (309) contains one hydroxyl group, n0 in the formula (300) is an integer of 2 to 5.

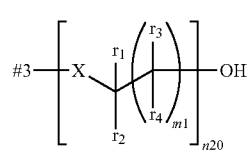

(310)

In the formula (310), X is —O—, —S—, —NH—, or —NCH₃—; Xs may be the same as or different from one another; m1 is an integer of 0 to 10; n20 is an integer of 2 to 100; r₁ to r₄ each independently represent a hydrogen atom, a methyl group, an ethyl group or a hydroxyl group; Xs, r₁s, r₂s, r₃s and r₄s each may be the same as or different from one another; and #3 indicates a hand bonded to a carbon atom present in R in the formula (300)). When the group represented by the formula (310) contains one hydroxyl group, n0 in the formula (300) is an integer of 2 to 5.

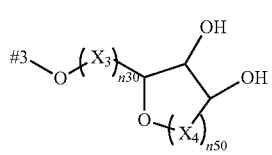

(312)

In the formula (312), X₃ and X₄ are each independently —CH₂—, —CH(OH)— or —CO—; n30 is an integer of 0 to 3; n50 is an integer of 0 to 5; when n30 is 2 or greater, X₃s may be the same as or different from one another; when n50 is 2 or greater, X₄s may be the same as or different from one another; and #3 is a hand bonded to a carbon atom present in R in the formula (300).

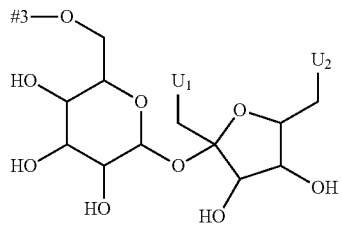

(313)

In the formula (313), #3 indicates a hand bonded to a carbon atom present in R in the formula (300); and U₁ to U₂ each independently represent a hydroxyl group or an oxygen atom bonded to a carbon atom present in R (0-#3).

Examples of the surfactants wherein FG is represented by the general formula (309) include butyric acid trimethylolpropane monoester, valeric acid trimethylolpropane monoester, caproic acid trimethylolpropane monoester, caprylic acid trimethylolpropane monoester, capric acid trimethylolpropane monoester, lauric acid trimethylolpropane monoester, myristic acid trimethylolpropane monoester, palmitic acid trimethylolpropane monoester, stearic acid trimethylolpropane monoester, isostearic acid trimethylolpropane monoester, oleic acid trimethylolpropane monoester, behenic acid trimethylolpropane monoester, cyclohexanecarboxylic acid trimethylolpropane monoester, phenyl acetic acid trimethylolpropane monoester, butyric acid pentaerythritol monoester, valeric acid pentaerythritol monoester, caproic acid pentaerythritol monoester, caprylic acid pentaerythritol monoester, capric acid pentaerythritol monoester, lauric acid pentaerythritol monoester, myristic acid pentaerythritol monoester, palmitic acid pentaerythritol monoester, stearic acid pentaerythritol monoester, isostearic acid pentaerythritol monoester, oleic acid pentaerythritol monoester, behenic acid pentaerythritol monoester, cyclohexanecarboxylic acid pentaerythritol monoester, phenyl acetic acid pentaerythritol monoester, butyric acid pentaerythritol diester, valeric acid pentaerythritol diester, caproic acid pentaerythritol diester, caprylic acid pentaerythritol diester, capric acid pentaerythritol diester, lauric acid pentaerythritol diester, myristic acid pentaerythritol diester, palmitic acid pentaerythritol diester, stearic acid pentaerythritol diester, isostearic acid pentaerythritol diester, oleic acid pentaerythritol diester, behenic acid pentaerythritol diester, cyclohexanecarboxylic acid pentaerythritol diester, phenyl acetic acid pentaerythritol diester, butyric acid dipentaerythritol diester, valeric acid dipentaerythritol diester, caproic acid dipentaerythritol diester, caprylic acid dipentaerythritol diester, capric acid dipentaerythritol diester, lauric acid dipentaerythritol diester, myristic acid dipentaerythritol diester, palmitic acid dipentaerythritol diester, stearic acid dipentaerythritol diester, isostearic acid dipentaerythritol diester, oleic acid dipentaerythritol diester, behenic acid dipentaerythritol diester, cyclohexanecarboxylic acid dipentaerythritol diester, phenyl acetic acid dipentaerythritol diester, butyric acid dipentaerythritol triester, valeric acid dipentaerythritol triester, caproic acid dipentaerythritol triester, caprylic acid dipentaerythritol triester, capric acid dipentaerythritol triester, lauric acid dipentaerythritol triester, myristic acid dipentaerythritol triester, palmitic acid dipentaerythritol triester, stearic acid dipentaerythritol triester, isostearic acid dipentaerythritol triester, oleic acid dipentaerythritol triester, behenic acid dipentaerythritol triester, cyclohexanecarboxylic acid dipentaerythritol triester, phenyl acetic acid dipentaerythritol triester, butyric acid dipentaerythritol tetraester, valeric acid dipentaerythritol tetraester, caproic acid dipentaerythritol tetraester, caprylic acid dipentaerythritol tetraester, capric acid dipentaerythritol tetraester, lauric acid dipentaerythritol tetraester, myristic acid dipentaerythritol tetraester, palmitic acid dipentaerythritol tetraester, stearic acid dipentaerythritol tetraester, isostearic acid dipentaerythritol tetraester, oleic acid dipentaerythritol tetraester, behenic acid dipentaerythritol tetraester, cyclohexanecarboxylic acid dipentaerythritol tetraester, phenyl acetic acid dipentaerythritol tetraester, and adducts thereof such as ethylene oxide adduct, propylene oxide adduct, and butyrolactone adduct, and the like.

Of the surfactants wherein FG is represented by the general formula (309), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (310) include butyric acid glycerol monoester, valeric acid glycerol monoester, caproic acid glycerol monoester, caprylic acid glycerol monoester, capric acid glycerol monoester, lauric acid glycerol monoester, myristic acid glycerol monoester, palmitic acid glycerol monoester, stearic acid glycerol monoester, isostearic acid glycerol monoester, oleic acid glycerol monoester, behenic acid glycerol monoester, cyclohexanecarboxylic acid glycerol monoester, phenyl acetic acid glycerol monoester, glycerol butyl ether, glycerol pentyl ether, glycerol hexyl ether, glycerol heptyl ether, glycerol octyl ether, glycerol nonyl ether, glycerol decyl ether, glycerol undecyl ether, glycerol dodecyl ether, glycerol tridecyl ether, glycerol tetradecyl ether, glycerol pentadecyl ether, glycerol hexadecyl ether, glycerol heptadecyl ether, glycerol octadecyl ether, glycerol nonadecyl ether, glycerol icosanyl ether, glycerol-butyloxyethyl ether, glycerol-pentyloxyethyl ether, glycerol-hexyloxyethyl ether, glycerol-heptyloxyethyl ether, glycerol-octyloxyethyl ether, glycerol-nonyloxyethyl ether, glycerol-decyloxyethyl ether, glycerol-undecyloxyethyl ether, glycerol-dodecyloxyethyl ether, glycerol-tridecyloxyethyl ether, glycerol-tetradecyloxyethyl ether, glycerol-pentadecyloxyethyl ether, glycerol-hexadecyloxyethyl ether, glycerol-heptadecyloxyethyl ether, glycerol-octadecyloxyethyl ether, glycerol-nonadecyloxyethyl ether, glycerol-icosanyloxyethyl ether, butyric acid diglycerol monoester, valeric acid diglycerol monoester, caproic acid diglycerol monoester, caprylic acid diglycerol monoester, capric acid diglycerol monoester, lauric acid diglycerol monoester, myristic acid diglycerol monoester, palmitic acid diglycerol monoester, stearic acid diglycerol monoester, isostearic acid diglycerol monoester, oleic acid diglycerol monoester, behenic acid diglycerol monoester, cyclohexanecarboxylic acid diglycerol monoester, phenyl acetic acid diglycerol monoester, butyric acid thioglycerol monothioester, valeric acid thioglycerol monothioester, caproic acid thioglycerol monothioester, caprylic acid thioglycerol monothioester, capric acid thioglycerol monothioester, lauric acid thioglycerol monothioester, myristic acid thioglycerol monothioester, palmitic acid thioglycerol monothioester, stearic acid thioglycerol monothioester, isostearic acid thioglycerol monothioester, oleic acid thioglycerol monothioester, behenic acid thioglycerol monothioester, cyclohexanecarboxylic acid thioglycerol monothioester, phenyl acetic acid thioglycerol monothioester, 1-butyric acid amido-2,3-propanediol, 1-valeric acid amido-2,3-propanediol, 1-caproic acid amido-2,3-propanediol, 1-caprylic acid amido-2,3-propanediol, 1-capric acid amido-2,3-propanediol, 1-lauric acid amido-2,3-propanediol, 1-myristic acid amido-2,3-propanediol, 1-palmitic acid amido-2,3-propanediol, 1-stearic acid amido-2,3-propanediol, 1-isostearic acid amido-2,3-propanediol, 1-oleic acid amido-2,3-propanediol, 1-behenic acid amido-2,3-propanediol, 1-cyclohexanecarboxylic acid amido-2,3-propanediol, 1-phenyl acetic acid amido-2,3-propanediol, butyric acid sorbitol monoester, valeric acid sorbitol monoester, caproic acid sorbitol monoester, caprylic acid sorbitol monoester, capric acid sorbitol monoester, lauric acid sorbitol monoester, myristic acid sorbitol monoester, palmitic acid sorbitol monoester, stearic acid sorbitol monoester, isostearic acid sorbitol monoester, oleic acid sorbitol monoester, behenic acid sorbitol monoester, cyclohexanecarboxylic acid sorbitol monoester, phenyl acetic acid sorbitol monoester, butyric acid sorbitol diester, valeric acid sorbitol diester, caproic acid sorbitol diester, caprylic acid sorbitol diester, capric acid sorbitol diester, lauric acid sorbitol diester, myristic acid sorbitol diester, palmitic acid sorbitol diester, stearic acid sorbitol diester, isostearic acid sorbitol diester, oleic acid sorbitol diester, behenic acid sorbitol diester, cyclohexanecarboxylic acid sorbitol diester, phenyl acetic acid sorbitol diester, butyric acid mannitol monoester, valeric acid mannitol monoester, caproic acid mannitol monoester, caprylic acid mannitol monoester, capric acid mannitol monoester, lauric acid mannitol monoester, myristic acid mannitol monoester, palmitic acid mannitol monoester, stearic acid mannitol monoester, isostearic acid mannitol monoester, oleic acid mannitol monoester, behenic acid mannitol monoester, cyclohexanecarboxylic acid mannitol monoester, phenyl acetic acid mannitol monoester, butyric acid mannitol diester, valeric acid mannitol diester, caproic acid mannitol diester, caprylic acid mannitol diester, capric acid mannitol diester, lauric acid mannitol diester, myristic acid mannitol diester, palmitic acid mannitol diester, stearic acid mannitol diester, isostearic acid mannitol diester, oleic acid mannitol diester, behenic acid mannitol diester, cyclohexanecarboxylic acid mannitol diester, phenyl acetic acid mannitol diester, butyric acid mannitol triester, valeric acid mannitol triester, caproic acid mannitol triester, caprylic acid mannitol triester, capric acid mannitol triester, lauric acid mannitol triester, myristic acid mannitol triester, palmitic acid mannitol triester, stearic acid mannitol triester, isostearic acid mannitol triester, oleic acid mannitol triester, behenic acid mannitol triester, cyclohexanecarboxylic acid mannitol triester, phenyl acetic acid mannitol triester, butyric acid mannitol tetraester, valeric acid mannitol tetraester, caproic acid mannitol tetraester, caprylic acid mannitol tetraester, capric acid mannitol tetraester, lauric acid mannitol tetraester, myristic acid mannitol tetraester, palmitic acid mannitol tetraester, stearic acid mannitol tetraester, isostearic acid mannitol tetraester, oleic acid mannitol tetraester, behenic acid mannitol tetraester, cyclohexanecarboxylic acid mannitol tetraester, phenyl acetic acid mannitol tetraester, and adducts thereof such as ethylene oxide adduct, propylene oxide adduct, and butyrolactone adduct, and the like.

Of the surfactants wherein FG is represented by the general formula (310), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (312) include butyric acid ribose, valeric acid ribose, caproic acid ribose, caprylic acid ribose, capric acid ribose, lauric acid ribose, myristic acid ribose, palmitic acid ribose, stearic acid ribose, isostearic acid ribose, oleic acid ribose, behenic acid ribose, cyclohexanecarboxylic acid ribose, phenyl acetic acid ribose, butyric acid ascorbic acid, valeric acid ascorbic acid, caproic acid ascorbic acid, caprylic acid ascorbic acid, capric acid ascorbic acid, lauric acid ascorbic acid, myristic acid ascorbic acid, palmitic acid ascorbic acid, stearic acid ascorbic acid, isostearic acid ascorbic acid, oleic acid ascorbic acid, behenic acid ascorbic acid, cyclohexanecarboxylic acid ascorbic acid, phenyl acetic acid ascorbic acid, butyric acid xylol, valeric acid xylol, caproic acid xylol, caprylic acid xylol, capric acid xylol, lauric acid xylol, myristic acid xylol, palmitic acid xylol, stearic acid xylol, isostearic acid xylol, oleic acid xylol, behenic acid xylol, cyclohexanecarboxylic acid xylol, phenyl acetic acid xylol, butyric acid sorbitan, valeric acid sorbitan, caproic acid sorbitan, caprylic acid sorbitan, capric acid sorbitan, lauric acid sorbitan, myristic acid sorbitan, palmitic acid sorbitan, stearic acid sorbitan, isostearic acid sorbitan, oleic acid sorbitan, behenic acid sorbitan, cyclohexanecarboxylic acid sorbitan, phenyl acetic acid sorbitan, butyric acid glucose, valeric acid glucose, caproic acid glucose, caprylic acid glucose, capric acid glucose, lauric acid glucose, myristic acid glucose, palmitic acid glucose, stearic acid glucose, isostearic acid glucose, oleic acid glucose, behenic acid glucose, cyclohexanecarboxylic acid glucose, phenyl acetic acid glucose, butyric acid glucono- 1,5-lactone, valeric acid glucono-1,5-lactone, caproic acid glucono-1,5-lactone, caprylic acid glucono-1,5-lactone, capric acid glucono-1,5-lactone, lauric acid glucono-1,5-lactone, myristic acid glucono-1,5-lactone, palmitic acid glucono-1,5-lactone, stearic acid glucono-1,5-lactone, isostearic acid glucono-1,5-lactone, oleic acid glucono-1,5-lactone, behenic acid glucono-1,5-lactone, cyclohexanecarboxylic acid glucono-1,5-lactone, phenyl acetic acid glucono-1,5-lactone, and adducts thereof such as ethylene oxide adduct, propylene oxide adduct, and butyrolactone adduct, and the dehydration-condensed multimer thereof, and the like.

Of the surfactants wherein FG is represented by the general formula (312), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (313) include butyric acid sucrose, valeric acid sucrose, caproic acid sucrose, caprylic acid sucrose, capric acid sucrose, lauric acid sucrose, myristic acid sucrose, palmitic acid sucrose, stearic acid sucrose, isostearic acid sucrose, oleic acid sucrose, behenic acid sucrose, cyclohexanecarboxylic acid sucrose, phenyl acetic acid sucrose, and adducts thereof such as ethylene oxide adduct, propylene oxide adduct, and butyrolactone adduct, and the dehydration-condensed multimer thereof, and the like.

Of the surfactants in which FG is represented by the general formula (313), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Of the surfactants in which FG is represented by any of the general formulae (309) to (313) and has two or more hydroxyl groups, those surfactants in which FG is represented by the general formula (310) or (312) are relatively preferable.

Examples of the groups FG including a cationic hydrophilic group include those hydrophilic groups represented by the general formulae (314) to (319) below.

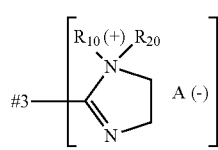

(314)

In the formula (314), A(−) is a halogen ion, a formate ion, an acetate ion, a sulfate ion, a hydrogen sulfate ion, a phosphate ion or a hydrogen phosphate ion; $R_{10}$ and $R_{20}$ each independently represent a hydrogen atom, a $C_{1-4}$ alkyl group, a hydroxyl group or a $C_{1-4}$ hydroxyalkyl group; and #3 indicates a hand bonded to a carbon atom present in R in the formula (300).

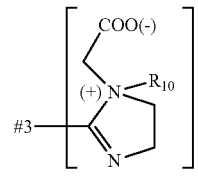

(315)

In the formula (315), $R_{10}$ represents a hydrogen atom, a $C_{1-4}$ alkyl group, a hydroxyl group or a $C_{1-4}$ hydroxyalkyl group; and #3 indicates a hand bonded to a carbon atom present in R in the formula (300).

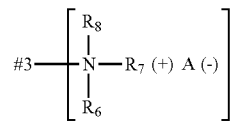

(316)

In the formula (316), A(−) is a halogen ion, a formate ion, an acetate ion, a sulfate ion, a hydrogen sulfate ion, a phosphate ion or a hydrogen phosphate ion; $R_6$ to $R_8$ each independently represent a hydrogen atom, a $C_{1-20}$ alkyl, alkylaryl, alkylbenzyl, alkylcycloalkyl, alkylcycloalkylmethyl, or cycloalkyl group, a phenyl group, or a benzyl group; and #3 indicates a hand bonded to a carbon atom present in R in the formula (300).

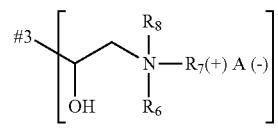

(317)

In the formula (317), A(−) is a halogen ion, a formate ion, an acetate ion, a sulfate ion, a hydrogen sulfate ion, a phosphate ion or a hydrogen phosphate ion; $R_6$ to $R_8$ each independently represent a hydrogen atom, a $C_{1-20}$ alkyl, alkylaryl, alkylbenzyl, alkylcycloalkyl, alkylcycloalkylmethyl, or cycloalkyl group, a phenyl group, or a benzyl group; and #3 indicates a hand bonded to a carbon atom present in R in the formula (300).

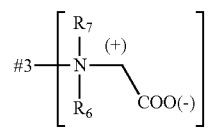

(318)

In the formula (318), $R_6$ and $R_7$ each independently represent a hydrogen atom, a $C_{1-20}$ alkyl, alkylaryl, alkylbenzyl, alkylcycloalkyl, alkylcycloalkylmethyl, or cycloalkyl group, a phenyl group, or a benzyl group; and #3 indicates a hand bonded to R (or a carbon atom present in R) in the formula (300).

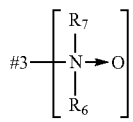 (319)

In the formula (319), $R_6$ and $R_7$ each independently represent a hydrogen atom, a $C_{1-20}$ alkyl, alkylaryl, alkylbenzyl, alkylcycloalkyl, alkylcycloalkylmethyl, or cycloalkyl group, a phenyl group, or a benzyl group; and #3 indicates a hand bonded to a carbon atom present in R in the formula (300). In the formula (319), N→O indicates a group expressed as $N^+$—$O^-$ or N=O.

Examples of the surfactants wherein FG is represented by the general formula (314) include 2-octyl-N-hydroxyethyl-N-methyl-imidazoline chloride, 2-octyl-N-hydroxyethyl imidazoline chloride, 2-octyl-N-hydroxyethyl-N-ethyl-imidazoline chloride, 2-octyl-N-hydroxyethyl-N-propyl-imidazoline chloride, 2-octyl-N-hydroxyethyl-N-butyl-imidazoline chloride, 2-decyl-N-hydroxyethyl-N-methyl-imidazoline chloride, 2-decyl-N-hydroxyethyl imidazoline chloride, 2-decyl-N-hydroxyethyl-N-ethyl-imidazoline chloride, 2-decyl-N-hydroxyethyl-N-propyl-imidazoline chloride, 2-decyl-N-hydroxyethyl-N-butyl-imidazoline chloride, 2-dodecyl-N-hydroxyethyl-N-methyl-imidazoline chloride, 2-dodecyl-N-hydroxyethyl imidazoline chloride, 2-dodecyl-N-hydroxyethyl-N-ethyl-imidazoline chloride, 2-dodecyl-N-hydroxyethyl-N-propyl-imidazoline chloride, 2-dodecyl-N-hydroxyethyl-N-butyl-imidazoline chloride, 2-tetradecyl N-hydroxyethyl-N-methyl-imidazoline chloride, 2-tetradecyl N-hydroxyethyl imidazoline chloride, 2-tetradecyl N-hydroxyethyl-N-ethyl-imidazoline chloride, 2-tetradecyl N-hydroxyethyl-N-propyl-imidazoline chloride, 2-tetradecyl N-hydroxyethyl-N-butyl-imidazoline chloride, 2-octadecyl N-hydroxyethyl-N-methyl-imidazoline chloride, 2-octadecyl N-hydroxyethyl imidazoline chloride, 2-octadecyl N-hydroxyethyl-N-ethyl-imidazoline chloride, 2-octadecyl N-hydroxyethyl-N-propyl-imidazoline chloride, 2-octadecyl N-hydroxyethyl-N-butyl-imidazoline chloride, 2-icosanyl N-hydroxyethyl-N-methyl-imidazoline chloride, 2-icosanyl N-hydroxyethyl imidazoline chloride, 2-icosanyl N-hydroxyethyl-N-ethyl-imidazoline chloride, 2-icosanyl N-hydroxyethyl-N-propyl-imidazoline chloride, 2-icosanyl N-hydroxyethyl-N-butyl-imidazoline chloride, 2-octyl-N-hydroxyethyl-N-methyl-imidazoline bromide, 2-octyl-N-hydroxyethyl imidazoline bromide, 2-octyl-N-hydroxyethyl-N-ethyl-imidazoline bromide, 2-octyl-N-hydroxyethyl-N-propyl-imidazoline bromide, 2-octyl-N-hydroxyethyl-N-butyl-imidazoline bromide, 2-decyl-N-hydroxyethyl-N-methyl-imidazoline bromide, 2-decyl-N-hydroxyethyl imidazoline bromide, 2-decyl-N-hydroxyethyl-N-ethyl-imidazoline bromide, 2-decyl-N-hydroxyethyl-N-propyl-imidazoline bromide, 2-decyl-N-hydroxyethyl-N-butyl-imidazoline bromide, 2-dodecyl-N-hydroxyethyl-N-methyl-imidazoline bromide, 2-dodecyl-N-hydroxyethyl imidazoline bromide, 2-dodecyl-N-hydroxyethyl-N-ethyl-imidazoline bromide, 2-dodecyl-N-hydroxyethyl-N-propyl-imidazoline bromide, 2-dodecyl-N-hydroxyethyl-N-butyl-imidazoline bromide, 2-tetradecyl-N-hydroxyethyl-N-methyl-imidazoline bromide, 2-tetradecyl N-hydroxyethyl imidazoline bromide, 2-tetradecyl N-hydroxyethyl-N-ethyl-imidazoline bromide, 2-tetradecyl N-hydroxyethyl-N-propyl-imidazoline bromide, 2-tetradecyl N-hydroxyethyl-N-butyl-imidazoline bromide, 2-octadecyl N-hydroxyethyl-N-methyl-imidazoline bromide, 2-octadecyl N-hydroxyethyl imidazoline bromide, 2-octadecyl N-hydroxyethyl-N-ethyl-imidazoline bromide, 2-octadecyl N-hydroxyethyl-N-propyl-imidazoline bromide, 2-octadecyl N-hydroxyethyl-N-butyl-imidazoline bromide, 2-icosanyl N-hydroxyethyl-N-methyl-imidazoline bromide, 2-icosanyl N-hydroxyethyl imidazoline bromide, 2-icosanyl N-hydroxyethyl-N-ethyl-imidazoline bromide, 2-icosanyl N-hydroxyethyl-N-propyl-imidazoline bromide, 2-icosanyl N-hydroxyethyl-N-butyl-imidazoline bromide, and adducts thereof such as ethylene oxide adduct, propylene oxide adduct, and caprolactone adduct, and the like.

Of the surfactants in which FG is represented by the general formula (314), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (315) include 2-octyl-N-carboxymethyl-N-methyl-imidazolinium betaine, 2-octyl N-carboxymethyl-imidazolinium betaine, 2-octyl-N-carboxymethyl-N-ethyl-imidazolinium betaine, 2-octyl-N-carboxymethyl-N-propyl-imidazolinium betaine, 2-octyl-N-carboxymethyl-N-butyl-imidazolinium betaine, 2-octyl-N-carboxymethyl-N-hydroxy-imidazolinium betaine, 2-octyl-N-carboxymethyl-N-hydroxymethyl-imidazolinium betaine, 2-octyl-N-carboxymethyl-N-hydroxyethyl-imidazolinium betaine, 2-octyl-N-carboxymethyl-N-hydroxypropyl-imidazolinium betaine, 2-octyl-N-carboxymethyl-N-hydroxybutyl-imidazolinium betaine, 2-nonyl-N-carboxymethyl-N-methyl-imidazolinium betaine, 2-nonyl-N-carboxymethyl-imidazolinium betaine, 2-nonyl-N-carboxymethyl-N-ethyl-imidazolinium betaine, 2-nonyl-N-carboxymethyl-N-propyl-imidazolinium betaine, 2-nonyl-N-carboxymethyl-N-butyl-imidazolinium betaine, 2-nonyl-N-carboxymethyl-N-hydroxy-imidazolinium betaine, 2-nonyl-N-carboxymethyl-N-hydroxymethyl-imidazolinium betaine, 2-nonyl-N-carboxymethyl-N-hydroxyethyl-imidazolinium betaine, 2-nonyl-N-carboxymethyl-N-hydroxypropyl-imidazolinium betaine, 2-nonyl-N-carboxymethyl-N-hydroxybutyl-imidazolinium betaine, 2-decyl-N-carboxymethyl-N-methyl-imidazolinium betaine, 2-decyl-N-carboxymethyl-imidazolinium betaine, 2-decyl-N-carboxymethyl-N-ethyl-imidazolinium betaine, 2-decyl-N-carboxymethyl-N-propyl-imidazolinium betaine, 2-decyl-N-carboxymethyl-N-butyl-imidazolinium betaine, 2-decyl-N-carboxymethyl-N-hydroxy-imidazolinium betaine, 2-decyl-N-carboxymethyl-N-hydroxymethyl-imidazolinium betaine, 2-decyl-N-carboxymethyl-N-hydroxyethyl-imidazolinium betaine, 2-decyl-N-carboxymethyl-N-hydroxypropyl-imidazolinium betaine, 2-decyl-N-carboxymethyl-N-hydroxybutyl-imidazolinium betaine, 2-dodecyl-N-carboxymethyl-N-methyl-imidazolinium betaine, 2-dodecyl-N-carboxymethyl-imidazolinium betaine, 2-dodecyl-N-carboxymethyl-N-ethyl-imidazolinium betaine, 2-dodecyl-N-carboxymethyl-N-propyl-imidazolinium betaine, 2-dodecyl-N-carboxymethyl-N-butyl-imidazolinium betaine, 2-dodecyl-N-carboxymethyl-N-hydroxy-imidazolinium betaine, 2-dodecyl-N-carboxymethyl-N-hydroxymethyl-imidazolinium betaine, 2-dodecyl-N-carboxymethyl-N-hydroxyethyl-imidazolinium betaine, 2-dodecyl-N-carboxymethyl-N-hydroxypropyl-imidazolinium betaine, 2-dodecyl-N-carboxymethyl-N-hydroxybutyl-imidazolinium betaine, 2-tetradecyl-N-carboxymethyl-N-methyl-imidazolinium betaine, 2-tetradecyl-N-carboxymethyl-imidazolinium betaine, 2-tetradecyl-N-carboxymethyl-N-ethylimidazolinium betaine, 2-tetradecyl-N-carboxymethyl-N-propyl-imidazolinium betaine, 2-tetradecyl-N-carboxymethyl-N-butyl-imidazolinium betaine, 2-tetradecyl-N-carboxymethyl-N-hydroxy-imidazolinium betaine, 2-tetradecyl-N-carboxymethyl-N-hydroxymethyl-imidazolinium betaine, 2-tetradecyl-N-carboxymethyl-N-hydroxyethyl-imidazolinium betaine, 2-tetradecyl-N-carboxymethyl-N-hydroxypropyl-imidazolinium betaine, 2-tetradecyl-N-carboxymethyl-N-hydroxybutyl-imidazolinium betaine, 2-hexadecyl-N-carboxymethyl-N-methyl-imidazolinium betaine, 2-hexadecyl-N-carboxymethyl-imidazolinium betaine, 2-hexadecyl-N-carboxymethyl-N-ethyl-imidazolinium betaine, 2-hexadecyl-N-carboxymethyl-N-propyl-imidazolinium betaine, 2-hexadecyl-N-carboxymethyl-N-butyl-imidazolinium betaine, 2-hexadecyl-N-carboxymethyl-N-hydroxy-imidazolinium betaine, 2-hexadecyl-N-carboxymethyl-N-hydroxymethyl-imidazolinium betaine, 2-hexadecyl-N-carboxymethyl-N-hydroxyethyl-imidazolinium betaine, 2-hexadecyl-N-carboxymethyl-N-hydroxypropyl-imidazolinium betaine, 2-hexadecyl-N-carboxymethyl-N-hydroxybutyl-imidazolinium betaine, 2-octadecyl-N-carboxymethyl-N-methyl-imidazolinium betaine, 2-octadecyl-N-carboxymethyl-imidazolinium betaine, 2-octadecyl-N-carboxymethyl-N-ethyl-imidazolinium betaine, 2-octadecyl-N-carboxymethyl-N-propyl-imidazolinium betaine, 2-octadecyl-N-carboxymethyl-N-butyl-imidazolinium betaine, 2-octadecyl-N-carboxymethyl-N-hydroxy-imidazolinium betaine, 2-octadecyl-N-carboxymethyl-N-hydroxymethyl-imidazolinium betaine, 2-octadecyl-N-carboxymethyl-N-hydroxyethyl-imidazolinium betaine, 2-octadecyl-N-carboxymethyl-N-hydroxypropyl-imidazolinium betaine, 2-octadecyl-N-carboxymethyl-N-hydroxybutyl-imidazolinium betaine, and adducts thereof such as ethylene oxide adduct, propylene oxide adduct, caprolactone adduct, hydrogen halide adduct, carboxylic acid adduct, ammonia adduct, amine adduct, alkali metal hydroxide adduct, and alkaline-earth metal hydroxide adduct, and the like.

Of the surfactants in which FG is represented by the general formula (315), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (316) include octyl-trimethylammonium chloride, nonyl-trimethylammonium chloride, decyl-trimethylammonium chloride, dodecyl-trimethylammonium chloride, tetradecyl-trimethylammonium chloride, hexadecyl-trimethylammonium chloride, octadecyl-trimethylammonium chloride, icosanyl-trimethylammonium chloride, octyl-benzyldimethylammonium chloride, nonyl-benzyldimethylammonium chloride, decyl-benzyldimethylammonium chloride, dodecyl-benzyldimethylammonium chloride, tetradecyl-benzyldimethylammonium chloride, hexadecyl-benzyldimethylammonium chloride, octadecyl-benzyldimethylammonium chloride, icosanyl-benzyldimethylammonium chloride, octyl-dodecyl dimethylammonium chloride, nonyl-dodecyl dimethylammonium chloride, decyl-dodecyl dimethylammonium chloride, dodecyl-dodecyl dimethylammonium chloride, tetradecyl-dodecyl dimethylammonium chloride, hexadecyl-dodecyl dimethylammonium chloride, octadecyl-dodecyl dimethylammonium chloride, icosanyl-dodecyl dimethylammonium chloride, octyl-octadecyl dimethylammonium chloride, nonyl-octadecyl dimethylammonium chloride, decyl-octadecyl dimethylammonium chloride, dodecyl-octadecyl dimethylammonium chloride, tetradecyl-octadecyl dimethylammonium chloride, hexadecyl-octadecyl dimethylammonium chloride, octadecyl-octadecyl dimethylammonium chloride, icosanyl-octadecyl dimethylammonium chloride, octyl-trimethylammonium bromide, nonyl-trimethylammonium bromide, decyl-trimethylammonium bromide, dodecyl-trimethylammonium bromide, tetradecyl-trimethylammonium bromide, hexadecyl-trimethylammonium bromide, octadecyl-trimethylammonium bromide, icosanyl-trimethylammonium bromide, octyl-benzyldimethylammonium bromide, nonyl-benzyldimethylammonium bromide, decyl-benzyldimethylammonium bromide, dodecyl-benzyldimethylammonium bromide, tetradecyl-benzyldimethylammonium bromide, hexadecyl-benzyldimethylammonium bromide, octadecyl-benzyldimethylammonium bromide, icosanyl-benzyldimethylammonium bromide, octyl-dodecyl dimethylammonium bromide, nonyl-dodecyl dimethylammonium bromide, decyl-dodecyl dimethylammonium bromide, dodecyl-dodecyl dimethylammonium bromide, tetradecyl-dodecyl dimethylammonium bromide, hexadecyl-dodecyl dimethylammonium bromide, octadecyl-dodecyl dimethylammonium bromide, icosanyl-dodecyl dimethylammonium bromide, octyl-octadecyl dimethylammonium bromide, nonyl-octadecyl dimethylammonium bromide, decyl-octadecyl dimethylammonium bromide, dodecyl-octadecyl dimethylammonium bromide, tetradecyl-octadecyl dimethylammonium bromide, hexadecyl-octadecyl dimethylammonium bromide, octadecyl-octadecyl dimethylammonium bromide, icosanyl-octadecyl dimethylammonium bromide, dibutyl-dimethyl-ammonium chloride, dipentyl-dimethyl-ammonium chloride, dihexyl-dimethyl-ammonium chloride, dipentyl-dimethyl-ammonium chloride, dioctyl-dimethyl-ammonium chloride, dinonyl-dimethyl-ammonium chloride, didecyl-dimethyl-ammonium chloride, diundecyl-dimethyl-ammonium chloride, ditridecyl-dimethyl-ammonium chloride, ditetradecyl-dimethyl-ammonium chloride, dipentadecyl-dimethyl-ammonium chloride, dihexadecyl-dimethyl-ammonium chloride, diheptadecyl-dimethyl-ammonium chloride, dioctadecyl-dimethyl-ammonium chloride, dinonadecyl-dimethyl-ammonium chloride, diicosanyl-dimethyl-ammonium chloride, dibutyl-dimethyl-ammonium bromide, dipentyl-dimethyl-ammonium bromide, dihexyl-dimethyl-ammonium bromide, dipentyl-dimethyl-ammonium bromide, dioctyl-dimethyl-ammonium bromide, dinonyl-dimethyl-ammonium bromide, didecyl-dimethyl-ammonium bromide, diundecyl-dimethyl-ammonium bromide, ditridecyl-dimethyl-ammonium bromide, ditetradecyl-dimethyl-ammonium bromide, dipentadecyl-dimethyl-ammonium bromide, dihexadecyl-dimethyl-ammonium bromide, diheptadecyl-dimethyl-ammonium bromide, dioctadecyl-dimethyl-ammonium bromide, dinonadecyl-dimethyl-ammonium bromide, diicosanyl-dimethyl-ammonium bromide, and the like.

Of the surfactants in which FG is represented by the general formula (316), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (317) include octyl-2-hydroxyethyl-trimethylammonium chloride, nonyl-2-hydroxyethyl-trimethylammonium chloride, decyl-2-hydroxyethyl-trimethylammonium chloride, dodecyl-2-hydroxyethyl-trimethylammonium chloride, tetradecyl-2-hydroxyethyl-trimethylammonium chloride, hexadecyl-2-hydroxyethyl-trimethylammonium chloride, octadecyl-2-hydroxyethyl-trimethylammonium chloride, icosanyl-2-hydroxyethyl-trimethylammonium chloride, octyl-2-hydroxyethyl-benzyldimethylammonium chloride, nonyl-2-hydroxyethyl-benzyldimethylammonium chloride, decyl-2-hydroxyethyl-benzyldimethylammonium chloride, dodecyl-2-hydroxyethyl-benzyldimethylammonium chloride, tetradecyl-2-hydroxyethyl-benzyldimethylammonium chloride, hexadecyl-2-hydroxyethyl-benzyldimethylammonium chloride, octadecyl-2-hydroxyethyl-benzyldimethylammonium chloride, icosanyl-2-hydroxyethyl-benzyldimethylammonium chloride, octyl-2-hydroxyethyl-cyclohexyl dimethylammonium chloride, nonyl-2-hydroxyethyl-cyclohexyl dimethylammonium chloride, decyl-2-hydroxyethyl-cyclohexyl dimethylammonium chloride, dodecyl-2-hydroxyethyl-cyclohexyl dimethylammonium chloride, tetradecyl-2-hydroxyethyl-cyclohexyl dimethylammonium chloride, hexadecyl-2-hydroxyethyl-cyclohexyl dimethylammonium chloride, octadecyl-2-hydroxyethyl-cyclohexyl dimethylammonium chloride, icosanyl-2-hydroxyethyl-cyclohexyl dimethylammonium chloride, octyl-2-hydroxyethyl-trimethylammonium bromide, nonyl-2-hydroxyethyl-trimethylammonium bromide, decyl-2-hydroxyethyl-trimethylammonium bromide, dodecyl-2-hydroxyethyl-trimethylammonium bromide, tetradecyl-2-hydroxyethyl-trimethylammonium bromide, hexadecyl-2-hydroxyethyl-trimethylammonium bromide, octadecyl-2-hydroxyethyl-trimethylammonium bromide, icosanyl-2-hydroxyethyl-trimethylammonium bromide, octyl-2-hydroxyethyl-benzyldimethylammonium bromide, nonyl-2-hydroxyethyl-benzyldimethylammonium bromide, decyl-2-hydroxyethyl-benzyldimethylammonium bromide, dodecyl-2-hydroxyethyl-benzyldimethylammonium bromide, tetradecyl-2-hydroxyethyl-benzyldimethylammonium bromide, hexadecyl-2-hydroxyethyl-benzyldimethylammonium bromide, octadecyl-2-hydroxyethyl-benzyldimethylammonium bromide, icosanyl-2-hydroxyethyl-benzyldimethylammonium bromide, octyl-2-hydroxyethyl-cyclohexyl dimethylammonium bromide, nonyl-2-hydroxyethyl-cyclohexyl dimethylammonium bromide, decyl-2-hydroxyethyl-cyclohexyl dimethylammonium bromide, dodecyl-2-hydroxyethyl-cyclohexyl dimethylammonium bromide, tetradecyl-2-hydroxyethyl-cyclohexyl dimethylammonium bromide, hexadecyl-2-hydroxyethyl-cyclohexyl dimethylammonium bromide, octadecyl-2-hydroxyethyl-cyclohexyl dimethylammonium bromide, icosanyl-2-hydroxyethyl-cyclohexyl dimethylammonium bromide, and the like.

Of the surfactants in which FG is represented by the general formula (317), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (318) include butyl-dimethyl betaine, pentyl-dimethyl betaine, hexyl-dimethyl betaine, heptyl-dimethyl betaine, octyl-dimethyl betaine, nonyl-dimethyl betaine, decyl-dimethyl betaine, undecyl-dimethyl betaine, dodecyl-dimethyl betaine, tetradecyl-dimethyl betaine, tridecyl-dimethyl betaine, pentadecyl-dimethyl betaine, hexadecyl-dimethyl betaine, heptadecyl-dimethyl betaine, octadecyl-dimethyl betaine, nonadecyl-dimethyl betaine, icosanyl-dimethyl betaine, butyl-benzylmethyl betaine, pentyl-benzylmethyl betaine, hexyl-benzylmethyl betaine, heptyl-benzylmethyl betaine, octyl-benzylmethyl betaine, nonyl-benzylmethyl betaine, decyl-benzylmethyl betaine, undecyl-benzylmethyl betaine, dodecyl-benzylmethyl betaine, tridecyl benzylmethyl betaine, tetradecyl benzylmethyl betaine, pentadecyl-benzylmethyl betaine, hexadecyl-benzylmethyl betaine, heptadecyl-benzylmethyl betaine, octadecyl-benzylmethyl betaine, nonadecyl-benzylmethyl betaine, icosanyl-benzylmethyl betaine, butyl-cyclohexyl methyl betaine, pentyl-cyclohexyl methyl betaine, hexyl-cyclohexyl methyl betaine, heptyl-cyclohexyl methyl betaine, octyl-cyclohexyl methyl betaine, nonyl-cyclohexyl methyl betaine, decyl-cyclohexyl methyl betaine, undecyl-cyclohexyl methyl betaine, dodecyl-cyclohexyl methyl betaine, tridecyl cyclohexyl methyl betaine, tetradecyl cyclohexyl methyl betaine, pentadecyl-cyclohexyl methyl betaine, hexadecyl-cyclohexyl methyl betaine, heptadecyl-cyclohexyl methyl betaine, octadecyl-cyclohexyl methyl betaine, nonadecyl-cyclohexyl methyl betaine, icosanyl-cyclohexyl methyl betaine, butyl-dodecyl methyl betaine, pentyl-dodecyl methyl betaine, hexyl-dodecyl methyl betaine, heptyl-dodecyl methyl betaine, octyl-dodecyl methyl betaine, nonyl-dodecyl methyl betaine, decyl-dodecyl methyl betaine, undecyl-dodecyl methyl betaine, dodecyl-dodecyl methyl betaine, tridecyl dodecyl methyl betaine, tetradecyl dodecyl methyl betaine, pentadecyl-dodecyl methyl betaine, hexadecyl-dodecyl methyl betaine, heptadecyl-dodecyl methyl betaine, octadecyl-dodecyl methyl betaine, nonadecyl-dodecyl methyl betaine, icosanyl-dodecyl methyl betaine, and adducts thereof such as hydrogen halide adduct, carboxylic acid adduct, ammonia adduct, amine adduct, alkali metal hydroxide adduct, and alkaline-earth metal hydroxide adduct, and the like.

Of the surfactants in which FG is represented by the general formula (318), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Examples of the surfactants wherein FG is represented by the general formula (319) include butyl-dimethylamine oxide, pentyl-dimethylamine oxide, hexyl-dimethylamine oxide, heptyl-dimethylamine oxide, octyl-dimethylamine oxide, nonyl-dimethylamine oxide, decyl-dimethylamine oxide, undecyl-dimethylamine oxide, dodecyl-dimethylamine oxide, tetradecyl-dimethylamine oxide, tridecyl-dimethylamine oxide, pentadecyl-dimethylamine oxide, hexadecyl-dimethylamine oxide, heptadecyl-dimethylamine oxide, octadecyl-dimethylamine oxide, nonadecyl-dimethylamine oxide, icosanyl-dimethylamine oxide, butyl-benzylmethylamine oxide, pentyl-benzylmethylamine oxide, hexyl-benzylmethylamine oxide, heptyl-benzylmethylamine oxide, octyl-benzylmethylamine oxide, nonyl-benzylmethylamine oxide, decyl-benzylmethylamine oxide, undecyl-benzylmethylamine oxide, dodecyl-benzylmethylamine oxide, tridecyl benzylmethylamine oxide, tetradecyl benzylmethylamine oxide, pentadecyl-benzylmethylamine oxide, hexadecyl-benzylmethylamine oxide, heptadecyl-benzylmethylamine oxide, octadecyl-benzylmethylamine oxide, nonadecyl-benzylmethylamine oxide, icosanyl-benzylmethylamine oxide, butyl-cyclohexyl methylamine oxide, pentyl-cyclohexyl methylamine oxide, hexyl-cyclohexyl methylamine oxide, heptyl-cyclohexyl methylamine oxide, octyl-cyclohexyl methylamine oxide, nonyl-cyclohexyl methylamine oxide, decyl-cyclohexyl methylamine oxide, undecyl-cyclohexyl methylamine oxide, dodecyl-cyclohexyl methylamine oxide, tridecyl cyclohexyl methylamine oxide, tetradecyl cyclohexyl methylamine oxide, pentadecyl-cyclohexyl methylamine oxide, hexadecyl-cyclohexyl methylamine oxide, heptadecyl-cyclohexyl methylamine oxide, octadecyl-cyclohexyl methylamine oxide, nonadecyl-cyclohexyl methylamine oxide, icosanyl-cyclohexyl methylamine oxide,
butyl-dodecyl methylamine oxide, pentyl-dodecyl methylamine oxide, hexyl-dodecyl methylamine oxide, heptyl-dodecyl methylamine oxide, octyl-dodecyl methylamine oxide, nonyl-dodecyl methylamine oxide, decyl-dodecyl methylamine oxide, undecyl-dodecyl methylamine oxide, dodecyl-dodecyl methylamine oxide, tridecyl dodecyl methylamine oxide, tetradecyl dodecyl methylamine oxide, pentadecyl-dodecyl methylamine oxide, hexadecyl-dodecyl methylamine oxide, heptadecyl-dodecyl methylamine oxide, octadecyl-dodecyl methylamine oxide, nonadecyl-dodecyl methylamine oxide, icosanyl-dodecyl methylamine oxide, and the like.

Of the surfactants in which FG is represented by the general formula (319), those compounds in which the organic residue has 6 to 100 carbon atoms are preferable. Those compounds in which the organic residue has 8 to 60 carbon atoms are more preferable, and those compounds in which the organic residue has 10 to 40 carbon atoms are still more preferable.

Of the cationic surfactants in which FG is represented by any of the general formulae (314) to (319), those surfactants in which FG is represented by the general formula (316) or (318) are relatively preferable.

The composition of the present invention contains the compound (III) usually in the range of 0.0001 to 50 wt %, preferably in the range of 0.001 to 20 wt %, and more preferably in the range of 0.01 to 10 wt %, with respect to the total weight of the compound (I) and the compound (II). The polymerization of the composition containing the compound (III) in the above mentioned range tends to result in an increased concentration of the hydrophilic groups derived from the compound (I) at the surface of the resulting cured product. When the cured product is a monolayer film, for example, the enrichment of the hydrophilic groups at the surface is facilitated.

Other Components

For the mixture used in the second method, a compound (IV) that has a siloxane bond and further has a molecular weight of 200 to 1,000,000 (however, the compound does not have a polymerizable carbon-carbon double bond and is different from the compounds (I) and (II)) may be used, if necessary, in addition to the hydrophilic monomer (I) having an anionic hydrophilic group, the crosslinking monomer (II), and the surfactant (III). When the composition contains such a compound (IV), the surface of the composition in contact with the air comes to have a decreased surface energy. Consequently, the leveling properties (the surface smoothness) of a cured product, for example, a monolayer film, obtained from the composition can be enhanced.

Of the compounds (IV), those compounds represented by the general formula (200) below are preferable.

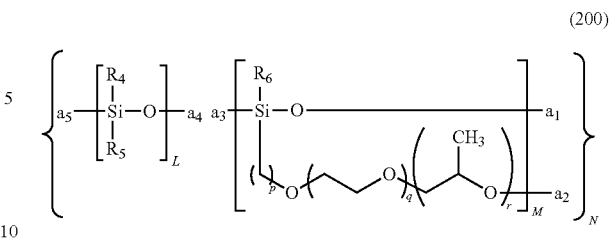

In the formula (200), L and M indicate a ratio (a molar ratio) of the units; L is 0 to 0.99; M is 0.01 to 1.00; L+M=1.00; N indicates the total number of the two types of groups that are enclosed in the square brackets with the letters L and M, and is an integer of 1 to 10000; p is an integer of 1 to 30; q and r are each independently an integer of 0 to 10000; and $R_4$ to $R_6$ each independently represent a hydrogen atom, a $C_{1-10}$ alkyl group, or a phenyl group.

In the formula (200), $a_1$, $a_2$ and $a_4$ each independently represent a hydrogen atom, a $C_{1-10}$ alkyl group, a phenyl group, a hand bonded to $a_5$ or a hand bonded to $a_3$; and when $a_1$, $a_2$ or $a_4$ is a terminal of the compound (IV), it is each independently a hydrogen atom, a $C_{1-10}$ alkyl group or a phenyl group.

In the formula (200), $a_3$ and $a_5$ each independently represent a hydrogen atom, a hydroxyl group, a $C_{1-10}$ alkyl group, a phenyl group, a $C_{1-10}$ alkoxy group, a phenyloxy group, a hand bonded to $a_1$, a hand bonded to $a_2$ or a hand bonded to $a_4$; and when $a_3$ and $a_5$ are terminals of the compound (IV), they are each independently a hydrogen atom, a hydroxyl group, a $C_{1-10}$ alkyl group, a phenyl group, a $C_{1-10}$ alkoxy group, or a phenyloxy group.

Examples of the compounds represented by the general formula (200) include polycondensation product of dimethyldimethoxysilane and poly(ethyleneoxy)propyl-methyl-dimethoxysilane,
polycondensation product of dimethyldimethoxysilane and poly(propyleneoxy)propyl-methyl-dimethoxysilane,
polycondensation product of dimethyldimethoxysilane and poly(butyleneoxy)propyl-methyl-dimethoxysilane,
polycondensation product of dimethyldimethoxysilane and poly(hexyleneoxy)propyl-methyl-dimethoxysilane,
polycondensation product of dimethyldimethoxysilane and poly(propyleneoxy)poly(ethyleneoxy)propyl-methyl-dimethoxysilane, polycondensation product of diethyldiethoxysilane and poly(ethyleneoxy)propyl-methyl-dimethoxysilane,
polycondensation product of diethyldiethoxysilane and poly(propyleneoxy)propyl-methyl-dimethoxysilane,
polycondensation product of diethyldiethoxysilane and poly(butyleneoxy)propyl-methyl-dimethoxysilane,
polycondensation product of diethyldiethoxysilane and poly(hexyleneoxy)propyl-methyl-dimethoxysilane,
polycondensation product of diethyldiethoxysilane and poly(propyleneoxy)poly(ethyleneoxy)propyl-methyl-dimethoxysilane, polycondensation product of diethyldiethoxysilane and poly(ethyleneoxy)propyl-methyl-diethoxysilane,
polycondensation product of diethyldiethoxysilane and poly(propyleneoxy)propyl-methyl-diethoxysilane,
polycondensation product of diethyldiethoxysilane and poly(butyleneoxy)propyl-methyl-diethoxysilane,
polycondensation product of diethyldiethoxysilane and poly(hexyleneoxy)propyl-methyl-diethoxysilane, polycondensation product of diethyldiethoxysilane and poly(propyleneoxy)poly(ethyleneoxy)propyl-methyl-diethoxysilane;
polycondensation product of phenylmethyldimethoxysilane and poly(ethyleneoxy)propyl-methyl-dimethoxysilane,
polycondensation product of phenylmethyldimethoxysilane and poly(propyleneoxy)propyl-methyl-dimethoxysilane,
polycondensation product of phenylmethyldimethoxysilane and poly(butyleneoxy)propyl-methyl-dimethoxysilane,
polycondensation product of phenylmethyldimethoxysilane and poly(hexyleneoxy)propyl-methyl-dimethoxysilane,
polycondensation product of phenylmethyldimethoxysilane and poly(propyleneoxy)poly(ethyleneoxy)propyl-methyl-dimethoxysilane;
polycondensation product of dimethyldimethoxysilane and poly(ethyleneoxy)propyl-phenyldimethoxysilane,
polycondensation product of dimethyldimethoxysilane and poly(propyleneoxy)propyl-phenyldimethoxysilane,
polycondensation product of dimethyldimethoxysilane and poly(butyleneoxy)propyl-phenyldimethoxysilane,
polycondensation product of dimethyldimethoxysilane and poly(hexyleneoxy)propyl-phenyldimethoxysilane,
polycondensation product of dimethyldimethoxysilane and poly(propyleneoxy)poly(ethyleneoxy)propyl-phenyldimethoxysilane;
polycondensation product of dimethyldimethoxysilane and poly(ethyleneoxy)ethyl-methyldimethoxysilane,
polycondensation product of dimethyldimethoxysilane and poly(propyleneoxy)ethyl-methyldimethoxysilane,
polycondensation product of dimethyldimethoxysilane and poly(butyleneoxy)ethyl-methyldimethoxysilane,
polycondensation product of dimethyldimethoxysilane and poly(hexyleneoxy)ethyl-methyldimethoxysilane,
polycondensation product of dimethyldimethoxysilane and poly(propyleneoxy)poly(ethyleneoxy)ethyl-methyldimethoxysilane;
polycondensation product of dimethyldimethoxysilane and poly(ethyleneoxy)propyl-butyldimethoxysilane,
polycondensation product of dimethyldimethoxysilane and poly(propyleneoxy)propyl-butyldimethoxysilane,
polycondensation product of dimethyldimethoxysilane and poly(butyleneoxy)propyl-butyldimethoxysilane,
polycondensation product of dimethyldimethoxysilane and poly(hexyleneoxy)propyl-butyldimethoxysilane,
polycondensation product of dimethyldimethoxysilane and poly(propyleneoxy)poly(ethyleneoxy)propyl-butyldimethoxysilane, and the like.

The compounds (IV) may be used singly or in mixture of two or more kinds thereof.

The composition of the present invention contains at least one compound selected from the compounds (III) and the compounds (IV) usually in the range of 0.0001 to 50 wt % relative to the total of the compound (I) and the compound (II). This amount of the compound (III) or the compound (IV) ensures that cured products obtained from the composition will exhibit higher hydrophilicity and enhanced leveling properties (surface smoothness).

The leveling properties tend to be enhanced more efficiently with increasing amounts of the compounds (III) and the compounds (IV). However, adding these compounds in an excessively large amount often results in a decrease in the transparency of the obtainable cured products. To achieve an enhancement in leveling properties while maintaining high transparency, the at least one compound selected from the compounds (III) and the compounds (IV) is preferably added in an amount in the range of 0.001 to 20 wt %, and more preferably in the range of 0.01 to 10 wt % relative to the total of the compound (I) and the compound (II).

In a preferred aspect of the composition of the present invention, the compound (III) and the compound (IV) are used in combination in order to enhance leveling properties while maintaining hydrophilicity and transparency.

When the composition of the present invention contains both the compound (III) and the compound (IV), the amount of the compound (III) is preferably in the range of 0.001 to 20 wt %, and more preferably in the range of 0.01 to 10 wt % relative to the total of the compound (I) and the compound (II).

When the composition of the present invention contains both the compound (III) and the compound (IV), the amount of the compound (IV) is preferably in the range of 0.001 to 10 wt %, and more preferably in the range of 0.005 to 5 wt % relative to the total of the compound (I) and the compound (II).

The mixture used in the second method may further contain the same various additives as used in the first method, if necessary, in addition to the hydrophilic monomer (I) having an anionic hydrophilic group, the crosslinking monomer (II), the surfactant (III), and the compound (IV) as an optional component.

Because the mixture used in the second method contains the compound (III) in addition to the compound (I) and the compound (II), it is possible to obtain an acrylic resin film (Xm1) in the form of a cured product enriched with hydrophilic groups at the surface, even in the absence of a solvent in the mixture. However, the mixture used in the second method may include a solvent, in view of aspects such as the workability in the production of the cured product, for example, a monolayer film, from the mixture.

Here, a solvent usable in the second method is not limited to a particular one as long as it can yield a cured product whose surface is hydrophilic, and it may be the same high polarity solvent as used in the first method, or may be a mixture of such a high polarity solvent and a low polarity solvent, and a suitable solvent can be used taking into account the solubility of the compound (I), compound (II), and compound (III), and the like.

It is not preferable, however, to use solvents which have excessively strong interactions with the constituents present in the monomer composition in the present invention, for example, solvents which can react or form salts with the constituents, or to use solvents having an excessively high boiling point, for example, solvents having a boiling point of above 200° C. For example, ethanolamine compounds having a hydroxyethylamino structure [$NRaRb(CH_2CH_2OH)$: Ra and Rb are each independently hydrogen, a $C_{1-15}$ alkyl group or a $CH_2CH_2OH$ group] are prone to interact with the hydrophilic groups present in the compound (I), for example, the anionic hydrophilic groups such as the sulfonate groups to form a salt or a pseudo salt, and are difficult to evaporate. When an attempt is made to remove such a solvent from the mixture applied, the solvent barely moves to the surface in contact with the air and tends to remain in the inside. Consequently, the hydrophilic groups present in the compound (I) tend to be prevented from being enriched (concentrated) at the surface of the coating in contact with the air. Thus, such ethanolamine compounds are not suited for use as the solvents. Examples of such compounds include ethanolamine, diethanolamine, triethanolamine, N-ethyl-ethanolamine, N-(2-ethylhexyl)ethanolamine, N-butyl-diethanolamine, N-hexyl-diethanolamine, N-lauryl-diethanolamine and N-cetyl-diethanolamine.

In the second method, the step of applying, to a substrate, a mixture containing the hydrophilic monomer (I) having an anionic hydrophilic group, the crosslinking monomer (II), the surfactant (III), and the like is carried out.

Examples of substrates serving for this application include the same substrates as can be used in the first method, i.e., those which are the same as described in the section "Substrate" as undermentioned.

Conventionally known methods and conditions for application can be applied, as appropriate, as in the first method.

In addition, when the mixture including the solvent is applied to a substrate, the application to the substrate may be followed by carrying out the evaporation of the solvent, and also for carrying out this evaporation, conventionally known conditions can be applied as appropriate.

In the production of the acrylic resin film (Xm1-2) according to the second method, the polymerization may be performed by, for example, heating, the irradiation of a radiation ray such as light, and the like, as in the first method. As specific conditions for polymerization, conventionally known conditions can be applied as appropriate.

<<Acrylic Resin Film (Xm0)>>

In the present invention, an "acrylic resin film (Xm1)" that is a film having gradient anionic hydrophilic groups, such as the acrylic resin films (Xm1-1) and (Xm1-2), is preferably used as a cured product (X) composed of an acrylic resin, as described above, but is not particularly limited thereto. For example, in another aspect of the present invention, the cured product (X) composed of an acrylic resin is an acrylic resin film other than the "acrylic resin film (Xm1)" (hereinafter referred to as "acrylic resin film (Xm0)"). Typical examples of acrylic resin films (Xm0) include, but are not limited to, an acrylic resin film in which the concentration of the anionic hydrophilic groups is uniform independent of their depth from the surface (hereinafter may also be referred to as "uniform acrylic resin film"), and the like. As shown in the undermentioned Examples 3-1 to 3-3, even if such an acrylic resin film (Xm0) is used as the cured product (X) composed of an acrylic resin, a modified acrylic resin cured product (C), actually a modified acrylic resin film, obtained by the surface treatment with the compound (A) can have an excellent slipperiness.

Here, the acrylic resin film (Xm0) may be any such on so long as it does not fall under the "acrylic resin film (Xm1)", and it may be, for example: an acrylic resin film (Xm0-1) obtained by applying, to a substrate, a mixture containing either the hydrophilic monomer (I) having an anionic hydrophilic group or the crosslinking monomer (II) and a high polarity solvent, evaporating at least part of the high-boiling solvent, and then polymerizing the resulting mixture; or an acrylic resin film (Xm0-2) obtained by applying, to a substrate, a mixture containing either the hydrophilic monomer (I) having an anionic hydrophilic group or the crosslinking monomer (II) and a surfactant and then polymerizing the resulting mixture.

Such an acrylic resin film (Xm0) may be referred to herein as "non-gradient acrylic resin film", also comprehensively encompassing those which do not fall under the "uniform acrylic resin film", in order to distinguish it from the "acrylic resin film (Xm1)". Here, needless to say, typical examples of "non-gradient acrylic resin films" include the "uniform acrylic resin film".

<Compound (A)>

A compound (A) used in the present invention is a compound having, in the molecule, one or more of anionic hydrophilic groups forming an ion pair with an onium ion of an amino silicone, one or more of groups selected from the group consisting of groups containing a polymerizable carbon-carbon double bond, amino groups, mercapto groups, and hydroxyl groups.

In other words, the compound (A) can also be regarded as a compound that is an onium compound formed of an amino silicone and of a compound (A0) having, in the molecule, one or more of anionic hydrophilic groups and one or more of groups selected from the group consisting of groups containing a polymerizable carbon-carbon double bond, amino groups, mercapto groups, and hydroxyl groups, in which one or more of the anionic hydrophilic groups derived from the compound (A0) forms an ion pair with the onium ion of the amino silicone. As used herein, an "onium ion of an amino silicone" refers to a corresponding onium ion of an amino silicone, specifically an onium ion which results from protonating part or the whole of an amino group(s) constituting an amino silicone.

The surface treatment of the "cured product (X) composed of an acrylic resin" such as the "acrylic resin film (Xm1)" is carried out using such a compound (A) that has an anionic hydrophilic group forming an ion pair with an onium ion of an amino silicone, whereby the resulting modified acrylic resin cured product (C) has an excellent slipperiness. In other words, the "compound (A)" in the present invention functions as a surface treatment agent for imparting characteristics such as slipperiness to the "cured product (X) composed of an acrylic resin".

When the compound (A) has a plurality of anionic hydrophilic groups in the molecule, at least part, preferably the whole, of the anionic hydrophilic groups form an ion pair with an onium ion of an amino silicone.

Here, examples of anionic hydrophilic groups that the compound (A) has include hydrophilic functional groups selected from sulfonic groups, carboxyl groups, or phosphoric groups, and out of these, sulfonic groups are particularly preferable because higher hydrophilicity may be imparted to the surface.

In addition, examples of polymerizable carbon-carbon double bonds that the compounds (A) can have include radically polymerizable functional groups selected from (meth)acryloyloxy groups, (meth)acryloylthio groups, (meth)acrylamido groups, allyl groups, vinyl groups, and isopropenyl groups.

Amino Silicone

In the present invention, an amino silicone constituting the compound (A) is one out of silicones which has an amino group, and is present in the compound (A) in the state in which it forms an onium ion salt with an anionic hydrophilic group.

Here, in the present invention, the amino silicone preferably has a molecular weight in the range of 100 to 1,000,000, more preferably a molecular weight in the range of 200 to 100,000. Further, out of amino silicones having a molecular weight of 100 to 1,000,000, compounds represented by the following general formulae (α1) to (a3) are still more preferable:

General Formula (a1):

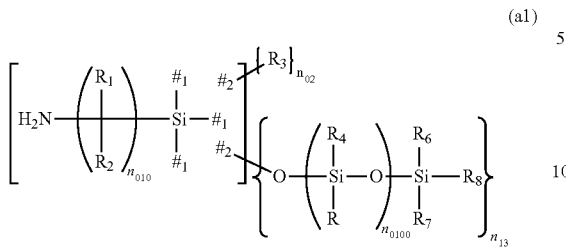

(wherein in the formula (a1), $R_1$ to $R_8$ are independently a hydrogen atom, a $C_{1-6}$ alkyl group or a $C_{1-6}$ alkoxy group; $n_{010}$ is an integer of 0 to 10; $n_{0100}$ is an integer of 0 to 100; $n_{02}$ is an integer of 0 to 2; $n_{13}$ is an integer of 1 to 3; $n_{02}+n_{13}=3$; $\#_1$ and $\#_2$ represent bonding hands; and $\#_1$ and $\#_2$ are bonded together);

General Formula (a2):

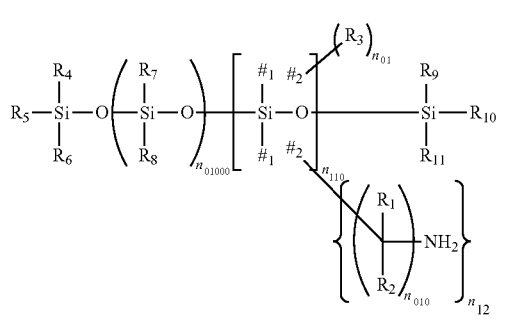

(wherein in the formula (a2), $R_1$ to $R_{11}$ are independently a hydrogen atom, a $C_{1-6}$ alkyl group or a $C_{1-6}$ alkoxy group; $n_{01000}$ is an integer of 0 to 1000; $n_{110}$ is an integer of 1 to 10; $n_{010}$ is an integer of 0 to 10; $n_{12}$ is an integer of 1 to 2; $n_{01}$ is an integer of 0 to 1; $n_{01}+n_{12}=2$; $\#_1$ and $\#_2$ represent bonding hands; and #1 and $\#_2$ are bonded together; and the compounds represented by the formula (a2) do not include the compounds represented by the formula (a1));

General Formula (a3):

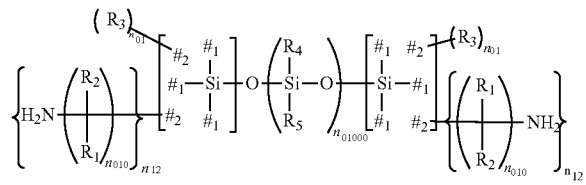

(wherein in the formula (a3), $R_1$ to $R_5$ are independently a hydrogen atom, a $C_{1-6}$ alkyl group or a $C_{1-6}$ alkoxy group; $n_{01000}$ is an integer of 0 to 1000; $n_{010}$ is an integer of 0 to 10; $n_{01}$ is an integer of 0 to 2; $n_{12}$ is an integer of 1 to 3; $n_{01}+n_{12}=3$; $n_{01}s$ and $n_{12}s$ each may be the same as or different from one another; $\#_1$ and $\#_2$ represent bonding hands; and $\#_1$ and $\#_2$ are bonded together).

These compounds may be used singly, or in combination of two or more kinds thereof.

Examples of Preferred Compound (A)

Examples of relatively preferred compounds out of the compounds (A) include compounds represented by the following general formulae (A1) to (A6):

General Formula (A1):

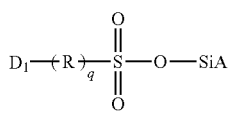

(wherein in the formula (A1), $D_1$ is a (meth)acryloyloxy group (only when q is 1), a (meth)acryloylthio group (only when q is 1), a (meth)acrylamido group (only when q is 1), a vinyl group, an isopropenyl group, a (meth)allyl group, a styryl group, a mercapto group, an amino group, a methylamino group or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups and ester groups; and q is 0 or 1);

General Formula (A2):

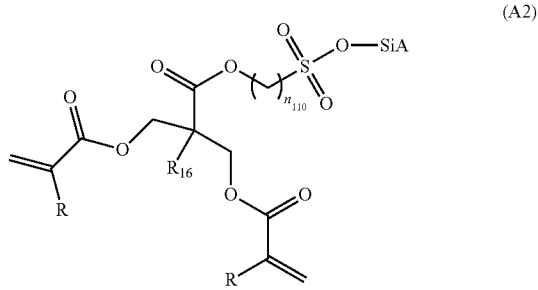

(wherein in the formula (A2), R represents a hydrogen atom or a methyl group; Rs may be the same as or different from one another; $R_{16}$ is a hydrogen atom or a $C_{1-6}$ alkyl group; SiA is an onium ion of an amino silicone having a molecular weight of 100 to 1,000,000; and $n_{110}$ is an integer of 1 to 10);

General Formula (A3):

(wherein in the formula (A3), $D_1$ is a (meth)acryloyloxy group (only when q is 1), a (meth)acryloylthio group (only when q is 1), a (meth)acrylamido group (only when q is 1), a vinyl group, an isopropenyl group, a (meth)allyl group, a styryl group, a mercapto group, an amino group, a methylamino group or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups and ester groups; and q is 0 or 1);

General Formula (A4):

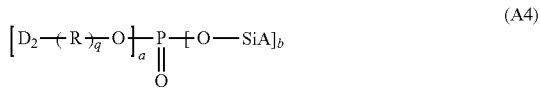

(A4)

(wherein in the formula (AA), $D_2$ is a (meth)acryloyloxy group, a (meth)acryloylthio group, a (meth)acrylamido group, a vinyl group, an isopropenyl group, a (meth)allyl group, a styryl group, a mercapto group, an amino group, a methylamino group or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups and ester groups; a and b are independently an integer of 1 or 2; a+b=3; when a is 2, $D_2$s and Rs each may be the same as or different from one another; when b is 2, OSiAs may be the same as or different from one another; and q is 0 or 1);

General Formula (A5):

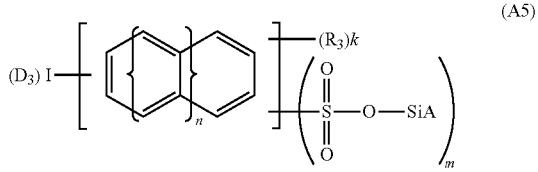

(A5)

(wherein in the formula (A5), $D_3$, $R_3$, and $SO_3SiA$ are groups bonded to carbons on rings included in the formula; $D_3$ is independently a vinyl group, an isopropenyl group, a (meth)allyl group, a styryl group, a mercapto group, an amino group, a methylamino group, an ethylamino group, or a hydroxyl group; SiA is an onium ion of an amino silicone having a molecular weight of 100 to 1,000,000; $R_3$ is independently a hydrogen atom, a methyl group, an ethyl group, a methoxy group, an ethoxy group, a fluorine atom, a chlorine atom, a bromine atom, or an iodine atom; k is an integer of 0 to 10; l and m are independently an integer of 1 to 11; k+l+m=6+2n; n is an integer of 0 to 3; when l is 2 or greater, $D_3$s may be the same as or different from one another; when k is 2 or greater, $R_3$s may be the same as or different from one another; and when m is 2 or greater, SiAs may be the same as or different from one another);

General Formula (A6):

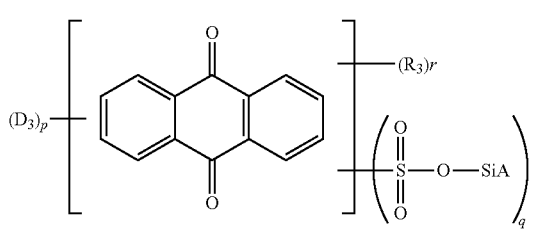

(A6)

(wherein in the formula (A6), $D_3$, $R_3$, and $SO_3SiA$ are groups bonded to carbons on rings included in the formula; $D_3$ is independently a vinyl group, an allyl group, an isopropenyl group, a styryl group, a mercapto group, an amino group, a methylamino group, an ethylamino group, or a hydroxyl group; SiA is an onium ion of an amino silicone having a molecular weight of 100 to 1,000,000; $R_3$ is independently a hydrogen atom, a methyl group, an ethyl group, a methoxy group, an ethoxy group, a fluorine atom, a chlorine atom, a bromine atom, or an iodine atom; r is an integer of 0 to 6; q and p are independently an integer of 1 to 7; p+q+r=8; when p is 2 or greater, $D_3$s may be the same as or different from one another; when r is 2 or greater, $R_3$s may be the same as or different from one another; and when q is 2 or greater, SiAs may be the same as or different from one another).

Examples of compounds (A1) preferably include compounds represented by the following general formula (A7):

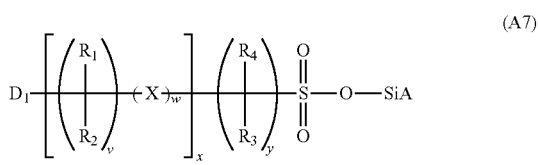

(A7)

(wherein in the formula (A7), $D_1$ is a (meth)acryloyloxy group (when any of x and y is 1 or greater), a (meth)acryloylthio group (when any of x and y is 1 or greater), a (meth)acrylamido group (when any of x and y is 1 or greater), a vinyl group, an isopropenyl group, a (meth)allyl group, a styryl group, a mercapto group, an amino group, a methylamino group or an ethylamino group; X is an oxygen atom, a sulfur atom, —NH—, or —NCH$_3$—; SiA is an onium ion of an amino silicone having a molecular weight of 100 to 1,000,000; $R_1$ to $R_4$ are independently a hydrogen atom, a $C_{1-6}$ alkyl group or a $C_{1-6}$ alkoxy group; v and y are independently an integer of 0 to 10; w is 0 or 1 (when any of v and y is 0, w is 0); x is an integer of 0 to 10; when v is 2 or greater, $R_1$s and $R_2$s each may be the same as or different from one another; when y is 2 or greater, $R_3$s and $R_4$s each may be the same as or different from one another; when x is 2 or greater, $R_1$s and $R_2$s each may be the same as or different from one another).

These compounds may be used singly, or in combination of two or more kinds thereof.

<Compound (A')>

In the present invention, the compound (A) may be surface-treated
in the copresence of a compound (A') having, in the molecule,
one or more of anionic hydrophilic groups forming an ion pair with one or more selected from the group consisting of hydrogen ions, alkali metal ions, alkaline earth metal ions, ammonium ions, and amine ions other than an onium ion of the amino silicone, and
one or more of groups selected from the group consisting of groups containing a polymerizable carbon-carbon double bond, amino groups, mercapto groups, and hydroxyl groups.

Here, the modified acrylic resin cured product (C) obtained by the surface treatment with the compound (A) in the copresence of the compound (A') may have excellent antifouling properties and antifogging properties.

This compound (A') can also be regarded as a compound in which an ion pair is formed by a corresponding anion of a compound (A0') having, in the molecule, one or more of anionic hydrophilic groups and one or more of groups selected from the group consisting of groups containing a polymerizable carbon-carbon double bond, amino groups, mercapto groups, and hydroxyl groups, and one or more cations selected from the group consisting of hydrogen ions, alkali metal ions, alkaline earth metal ions, ammonium ions, and amine ions other than an onium ion of the amino silicone;

wherein one or more of the anionic hydrophilic groups form an ion pair with the cation.

From further another point of view, the compound (A') can also be considered to be a compound corresponding to the compound (A) except that the compound (A') has an ion pair with one or more cations selected from the group consisting of hydrogen ions, alkali metal ions, alkaline earth metal ions, ammonium ions, and amine ions other than an onium ion of the amino silicone, in place of the onium ion of the amino silicone in the compound (A). Specific examples of such compounds (A') include corresponding compounds that have one or more cations selected from the group consisting of hydrogen ions, alkali metal ions, alkaline earth metal ions, ammonium ions, and amine ions other than an onium ion of an amino silicone, in place of the onium ion of the amino silicone having a molecular weight of 100 to 1,000,000 represented by SiA in the formulae (A1) to (A6).

As used herein, an "amine ion" refers to a monovalent positive ion derived from a primary amine, secondary amine, or tertiary amine.

In addition, an "amine ion other than an onium ion of the amino silicone" refers to one of such "amine ions" which does not fall under the "onium ion of an amino silicone" described above in the aforementioned section "Compound (A)".

In the present invention, the compound (A0') constituting the compound (A') and the compound (A0) constituting the compound (A) may be the same as or different from one another.

When the surface treatment is carried out with the compound (A) in the copresence of the compound (A'), the ratio of the compound (A') to the compound (A) is not limited to a particular value as long as the compound (A) is contained and the effects of the present invention can be exerted sufficiently, and the amount of the compound (A') is, for example, 100 times or less, preferably 10 times or less, more preferably 4 times or less, relative to the weight of the compound (A). In a typical aspect of the present invention, the compounding ratio by weight of the compound (A) to the compound (A') is approximately in the range of 99:1 to 1:99, preferably in the range of 80:20 to 10:90, more preferably in the range of 60:40 to 20:80, most preferably in the range of 50:50 to 20:80.

<Form of Modified Acrylic Resin Cured Product (C)>

In that the modified acrylic resin cured product (C) according to the present invention is obtained by treating the surface of the cured product (X) with the compound (A), the product (C) results in having a shape corresponding to the shape of the basic cured product (X). In other words, as with the cured product (X), the modified acrylic resin cured product (C) is also not particularly limited to a specific shape as long as it has at least one surface, and may be film-like, plate-like, or block-like. Alternatively, it may be in a certain shape which it should have as a final molded product. In a typical aspect of the present invention, however, the shape preferably adopted as that of the modified acrylic resin cured product (C) is a film-like form. In other words, in a preferred aspect of the present invention, the modified acrylic resin cured product (C) is a modified acrylic resin film, or specifically a modified acrylic resin film (Cm), obtained by treating the surface of the acrylic resin film (Xm) with the compound (A) (herein, also referred to as "modified acrylic resin film (Cm)"). Out of these, a modified acrylic resin film (hereinafter, "modified acrylic resin film (Cm1)") obtained by adopting the acrylic resin film (Xm1) as the cured product (X) composed of an acrylic resin for a raw material is particularly preferred. Thus, in a most preferred aspect of the present invention, the modified acrylic resin cured product (C) according to the present invention has the form as a modified acrylic resin film.

The modified acrylic resin cured product (C) according to the present invention has an excellent surface slipperiness and the like because of the surface treatment with the compound (A) as described above. Such a modified acrylic resin cured product (C) according to the present invention can be used singly in itself or may be combined with a suitable substrate into a laminate.

In other words, the laminate according to the present invention includes a substrate and the aforementioned modified acrylic resin cured product (C).

Substrate

Examples of substrates usable in the present invention include: substrates made of inorganic materials such as glasses, silicas, metals, and metal oxides; substrates made of organic materials such as polymethyl methacrylates, polycarbonates, polyethylene terephthalates, polyethylenes, polypropylenes, polystyrenes, polyurethane resins, epoxy resins, vinyl chloride resins, silicone resins, paper, and pulps; and substrates having a coating cured material layer which are substrates made of these inorganic or organic materials and have a coating on the surface thereof.

In order to activate the substrate surface, the surface of these substrates may be optionally subjected to physical or chemical treatments such as corona treatment, ozone treatment, low-temperature plasma treatment using a gas such as oxygen gas or nitrogen gas, glow discharge treatment, oxidation treatment with agents such as chemicals, and flame treatment. Instead of or in addition to such treatments, the substrate surface may be subjected to primer treatment, undercoating treatment or anchor coating treatment.

Examples of the coating agents used in the primer treatment, the undercoating treatment and the anchor coating treatment include coating agents containing, as the main components of vehicles, resins such as polyester resins, polyamide resins, polyurethane resins, epoxy resins, phenolic resins, (meth)acrylic resins, polyvinyl acetate resins, polyolefin resins including polyethylenes and polypropylenes as well as copolymers thereof and modified resins thereof, and cellulose resins.

The coating agents may be any of solvent-based coating agents and aqueous coating agents.

Of the coating agents, preferred coating agents are: modified polyolefin coating agents, ethyl vinyl alcohol coating agents, polyethyleneimine coating agents, polybutadiene coating agents, polyurethane coating agents;

polyester polyurethane emulsion coating agents, polyvinyl chloride emulsion coating agents, urethane acrylic emulsion coating agents, silicone acrylic emulsion coating agents, vinyl acetate acrylic emulsion coating agents, acrylic emulsion coating agents;

styrene-butadiene copolymer latex coating agents, acrylonitrile-butadiene copolymer latex coating agents, methyl methacrylate-butadiene copolymer latex coating agents, chloroprene latex coating agents, rubber latex coating agents containing polybutadiene latex, polyacrylate ester latex coating agents, polyvinylidene chloride latex coating agents, polybutadiene latex coating agents, and coating agents which include latexes or dispersions resulting from the carboxylic acid modification of the resins contained in the above latex coating agents.

For example, these coating agents can be coated by methods such as a gravure coating method, a reverse roll coating method, a knife coating method and a kiss-roll coating method, and the amount to be coated on the substrate is usually 0.05 g/m$^2$ to 5 g/m$^2$, as measured in the dry state.

Of the coating agents, polyurethane coating agents are more preferable. The polyurethane coating agents have urethane bonds in the main chains or side chains of the resins present in the coating agents. For example, the polyurethane coating agents contain a polyurethane obtained by reacting a polyol such as a polyester polyol, a polyether polyol or an acrylic polyol, with an isocyanate compound.

Of the polyurethane coating agents, those polyurethane coating agents which are obtained by mixing a polyester polyol such as a condensed polyester polyol or a lactone-based polyester polyol with an isocyanate compound such as tolylene diisocyanate, hexamethylene diisocyanate or xylene diisocyanate are preferable because of their excellent adhesion.

The polyol compounds and the isocyanate compounds may be mixed with each other by any methods without limitation. The mixing ratio is not particularly limited. When, however, the amount of the isocyanate compound is excessively small, curing failures may be caused. Thus, the equivalent ratio of the OH groups of the polyol compound to the NCO groups of the isocyanate compound is preferably in the range of 2/1 to 1/40.

The substrates in the present invention may have a surface that has been treated by the aforementioned surface activation.

[Producing Method]

The aforementioned modified acrylic resin cured product (C) according to the present invention can be obtained by treating the surface of the cured product composed (X) of an acrylic resin with the compound (A). Examples of such cured products (X) composed of an acrylic resin include those aforementioned in the section "Cured Product (X) Composed of Acrylic Resin".

Here, when the modified acrylic resin cured product (C) according to the present invention has the form of a modified acrylic resin film, i.e., it is the modified acrylic resin film (Cm), such a modified acrylic resin film can be obtained by treating the surface of the acrylic resin film (Xm) (i.e., a film-like one out of the cured products (X) composed of an acrylic resin) with the compound (A).

Here, when the acrylic resin film (Xm) is adopted as the cured product (X) composed of an acrylic resin, the modified acrylic resin film (Cm) can be obtained by, for example, a producing method including the following step (S1):

(S1): the step of treating the surface of an acrylic resin film (Xm) with the compound (A).

This applies to either case in which the acrylic resin film (Xm1) or the acrylic resin film (Xm0) is adopted as the acrylic resin film (Xm).

In the present invention, however, the method for producing the modified acrylic resin film (Cm) preferably further includes the following steps (S0) and (S2).

(S0): the step of forming the acrylic resin film (Xm) on a substrate;

(S2): the step of exfoliating, from the substrate, the modified acrylic resin film (Cm) obtained by the step (S1)

In other words, in a preferred aspect of the present invention, the method for producing the modified acrylic resin film (Cm) includes the steps (S0), (S1), and (S2). Thus, including the steps (S0), (S1), and (S2), especially when the acrylic resin film (Xm1) is used as the acrylic resin film (Xm), can more reliably make the acrylic resin film (Xm1) such that the concentration of the anionic hydrophilic groups on the side of the surface opposite to the side adjacent to the substrate is higher than the concentration of the anionic hydrophilic groups at the depth of half the film thickness from the surface. Here, the step (S2) can be carried out by a conventionally known method, as appropriate.

Now, a laminate containing a substrate and the modified acrylic resin film (Cm) can be obtained by a producing method including the steps (S0) and (S1). In this case, the laminate may be obtained by a producing method including the steps (S0) and (S1) but not carrying out the step (S2), or the laminate may be obtained by carrying out the steps (S0), (S1), and (S2) and sticking or layering the modified acrylic resin film (Cm) onto another substrate. In other words, if the substrate constituting the laminate is called substrate (Sb1), and the substrate used to form the acrylic resin film (Xm) in the step (S0) is called substrate (Sb0), the substrate (Sb1) may be the substrate (Sb0) itself or may be different from the substrate (Sb0).

Below, the steps (S0) and (S1) will be described in further detail.

Step (S0)

In the present invention, the step (S0) is the step of forming an acrylic resin film (Xm) on a substrate. Here, in the method for producing a modified acrylic resin film according to the present invention, the step (S0) is not an essential step, but the step (S0) is preferably included.

Here, in the present invention, examples of particularly preferable acrylic resin films (Xm) include the aforementioned acrylic resin film (Xm1). Such an acrylic resin film (Xm1) can be formed by the method described above in the aforementioned section "Acrylic Resin Film (Xm1)".

In this aspect, the step (S0) is carried out specifically as

Step (S0-1): the step of forming, on a substrate, the acrylic resin film (Xm1)

which has an anionic hydrophilic group and in which the concentration of the anionic hydrophilic groups at the surface is higher than the concentration of the anionic hydrophilic groups at the depth of half the film thickness from the surface.

In other words, the resulting acrylic resin film (Xm1) is such that the concentration of the anionic hydrophilic groups on the side of the surface opposite to the side adjacent to the substrate (i.e., substrate (Sb0)) is higher than the concentration of the anionic hydrophilic groups at the depth of half the film thickness from the surface.

Here, the production of the acrylic resin film (Xm1) may be carried out by the first method or by the second method. As described above, however, the production is preferably carried out according to the second method in that the use of a solvent does not have to be essential and that the forming of the acrylic resin film (Xm1) can be carried out stably.

Specific examples of substrates usable for forming the acrylic resin film (Xm) include those which are the same as described above in the aforementioned section "Substrate", as described above in the aforementioned section "Acrylic Resin Film (Xm1)".

An acrylic resin film other than the acrylic resin film (Xm1) (i.e., an acrylic resin film (Xm0)) can be obtained by a conventionally known suitable producing method as long as an acrylic resin film falling under the acrylic resin film (Xm1) is not generated. For example, it can be obtained using the same producing method as for the acrylic resin film (Xm1) except that only either one of the hydrophilic monomer (I) having an anionic hydrophilic group and the crosslinking monomer (II) is used.

Step (S1)

In the present invention, the step (S1) is the step of treating the surface of the acrylic resin film (Xm) (which may be the acrylic resin film (Xm1) or the acrylic resin film (Xm0)) with the compound (A). This step (S1) causes the graft reaction by the compound (A) to the acrylic resin constituting the acrylic resin film (Xm), forming the modified acrylic resin film (Cm). Here, in the present invention, the step (S0) is preferably carried out prior to the step (S1).

Here, in the present invention, examples of particularly preferable acrylic resin films (Xm) include the acrylic resin film (Xm1). The acrylic resin film (Xm1) is an acrylic resin film which has an anionic hydrophilic group and in which the concentration of the anionic hydrophilic groups at the surface is higher than the concentration of the anionic hydrophilic groups at the depth of half the film thickness from the surface. Accordingly, when the acrylic resin film (Xm1) is used as an acrylic resin film, the treatment with the compound (A) in the step (S1) is carried out to the surface on which the concentration of the anionic hydrophilic groups is high in the acrylic resin film (Xm1).

In other words, in this aspect, the step (S1) is carried out specifically as

Step (S1-1): the step of forming a modified acrylic resin film (Cm) by treating the surface of the acrylic resin film (Xm1)

with a compound (A) having, in the molecule, one or more of anionic hydrophilic groups forming an ion pair with an onium ion of an amino silicone, and one or more of groups selected from the group consisting of groups containing a polymerizable carbon-carbon double bond, amino groups, mercapto groups, and hydroxyl groups.

Here, in the acrylic resin film (Xm1) serving in the step (S1), the Sa/Da is preferably 1.2 or greater, and more preferably 1.3 or greater. While the upper limit is not limited, the ratio is usually 20 or less. In the present invention, the ratio Sa/Da of the acrylic resin film (Xm1) is a value prior to the treatment with the compound (A). In a case where the film is treated with the compound (A) while the polymerization is still incomplete as will be described later, the ratio Sa/Da is a value of the incompletely polymerized mixture.

Whether the acrylic resin film (Xm1) or the acrylic resin film (Xm0) is used as the acrylic resin film (Xm), the treatment of the step (S1) carried out in the present invention is usually carried out by applying a solution containing the compound (A), a solvent and optionally a surfactant (a leveling agent) to the surface of the acrylic resin film (Xm), thereafter drying the solvent, then applying a radiation or heat to the coating to perform graft reaction, and finally removing the compound (A) that has not been involved in the graft reaction by washing or the like. The solution may be applied after the acrylic resin film (Xm) has been irradiated with a radiation or the like to generate radicals. Alternatively, the acrylic resin film (Xm) may be produced without completing the polymerization and the solution may be applied to such a film. To render the polymerization incomplete, for example, the dose of radiation may be appropriately decreased from the level required for complete curing.

The degree of polymerization of the (meth)acrylic resin is usually calculated from the amount of residual (meth)acrylic groups. The residual (meth)acrylic groups may be quantitatively determined by analyzing the $>C=CH_2$ peak (808 $cm^1$) by IR.

In general, films having a degree of polymerization of (meth)acrylic resins that is as low as about 10 mol % or below, particularly 3 mol %, often tend to incur problems such as the breakage of the acrylic resin film (Xm) during the grafting treatment, and/or the elution in the grafting treatment liquid of the hydrophilic (meth)acrylate having anionic hydrophilic groups with a gradient on the film surface and inside near the film surface. On the other hand, films that have been polymerized approximately to the same level as the usual radiation polymerization, that is, films having a polymerization degree of, for example, more than 60 mol % disadvantageously tend to incur a decrease in the grafting rate (a decrease in the graft amount) due to the lowering of the polymer radical concentration at the surface and inside near the surface.

Accordingly, the degree of polymerization of the (meth) acrylic resin constituting the acrylic resin film (Xm) to be graft treated, i.e., the degree of polymerization of the (meth) acrylic groups in the acrylic resin film (Xm) to be graft treated is preferably approximately 3 to 60 mol %, more preferably 20 to 60 mol %, still more preferably 35 to 55 mol %.

From the viewpoint of solvent properties, the solvents used in the present invention are preferably high polarity solvents. Examples include alcohols such as methanol, ethanol, isopropanol (IPA), n-propanol, n-butanol, ethylene glycol monomethyl ether (EGM) and 1,2-propylene glycol monomethyl ether (EGM), nitrogen-containing solvents such as acetonitrile and N,N-dimethylformamide (DMF), sulfur-containing solvents such as dimethylsulfoxide (DMSO) and sulfolane, water and mixtures of these solvents. Of these, alcohols, water and mixtures of these solvents are preferably used in light of relatively high solvent properties. From the viewpoint of safety, ethanol, water and a mixture of these solvents are more preferable.

The concentration of the compound (A) dissolved in the solvent may vary depending on the solvent selected, and is approximately 0.001 wt % to the saturated solubility, preferably 0.01 to 50 wt %, more preferably 0.01 to 20 wt %, still more preferably 0.1 to 10 wt %.

Here, the compound (A') may be compounded into the solution containing the compound (A), if necessary. The use of the solution containing the compound (A') as the solution containing the compound (A) in carrying out the surface treatment with the compound (A) also makes it possible to obtain a modified acrylic resin cured product (C) having excellent antifouling properties and antifogging properties. In this case, the compounding ratio of the compound (A) to the compound (A') can be a ratio described above in the aforementioned section "Compound (A')".

Surfactants (leveling agents) may be added if necessary mainly for the purpose of preventing the cissing of the coating liquid. Examples include carboxylate salts such as alkylcarboxylic acids and alkali metal or alkaline earth metal salts thereof, and polyoxyethylene alkylether carboxylic acids and alkali metal or alkaline earth metal salts thereof; sulfonate salts such as alkylbenzenesulfonic acids and alkali metal or alkaline earth metal salts thereof, alkylnaphthalenesulfonic acids and alkali metal or alkaline earth metal salts thereof, polycondensates of alkali metal or alkaline earth metal salts of alkylnaphthalenesulfonic acids with formalin, polycondensates of alkali metal or alkaline earth metal salts of melaminesulfonic acids with formalin, dialkylsulfosuccinate esters and alkali metal or alkaline earth metal salts thereof, α-olefinsulfonic acids and alkali metal or alkaline earth metal salts thereof, and N-acylsulfonic acids and alkali metal or alkaline earth metal salts thereof; sulfate ester salts such as sulfonated oils, alkali metal or alkaline earth metal salts of alkylsulfuric acids, alkali metal or alkaline earth metal salts of alkylether sulfuric acids, alkali metal or alkaline earth metal salts of polyoxyethylene alkylether sulfuric acids, and alkali metal or alkaline earth metal salts of alkylamide sulfuric acids; phosphate ester salts such as alkylphosphoric acids and alkali metal or alkaline earth metal salts thereof, polyoxyethylene alkylether phosphoric acids and alkali metal or alkaline earth metal salts thereof, and alkylaryl ether phosphoric acids and alkali metal or alkaline earth metal salts thereof; anionic surfactants such as aliphatic amine salts, quaternary ammonium salts, benzalkonium chlorides, benzethonium chlorides, pyridinium salts and imidazolinium salts; amphoteric surfactants such as carboxybetaine, aminocarboxylate salts, imidazolinium betaine, lecithin and alkylamine oxides;
nonionic surfactants such as polyoxyethylene alkyl and aryl ethers, polyoxypropylene alkyl and aryl ethers, polyoxyethylene alkyl and aryl ethers of polyhydric alcohol esters, polyethylene glycol fatty acid esters, aliphatic alkanolamides and polyoxyethylene aliphatic amides; fluorine surfactants such as MEGAFACE manufactured by DIC Corporation, EFTOP manufactured by Mitsubishi Materials Electronic Chemicals Co., Ltd., SURFLON manufactured by ASAHI GLASS CO., LTD., Ftergent manufactured by NEOS COMPANY LIMITED, UNIDYNE manufactured by DAIKIN INDUSTRIES, LTD., Fluorad manufactured by Sumitomo 3M Limited, and Zonyl manufactured by Du Pont Kabushiki Kaisha; and silicone surfactants such as AQUALEN 8020, AQUALEN HS-01, AQUALEN SB-630, POLYFLOW KL-100, POLYFLOW KL-800 and POLYFLOW WS-30 manufactured by KYOEISHA CHEMICAL CO., LTD. Of these, silicone surfactants are relatively preferable.

The amount of the surfactants added as required is approximately in the range of 0.0001 to 20 wt %, preferably 0.001 to 10 wt %, and more preferably 0.01 to 5 wt % relative to the total of the compound (A) and the solvent.

The treatment liquid in the present invention which contains the compound (A) may include, in addition to the compound (A), the solvent and the surfactant (the leveling agent), various organic compounds and inorganic compounds such as UV polymerization initiators, radical (heat) polymerization initiators, UV absorbers, HALS and fillers as long as the object of the present invention can be achieved.

The treatment liquid in the present invention which contains the compound (A) may be applied by various methods such as, for example, dip coating methods, pouring coating methods, spray coating methods, bar coating methods, gravure coating methods, reverse roll coating methods, knife coating methods, kiss-roll coating methods and spin coating methods. The coating methods may be selected appropriately in accordance with the configurations such as shapes of the films.

After the application, the solvent may be dried by various methods such as natural drying, air guns, fans, dryers and ovens. Ovens tend to be suitably used. In the case of an oven, the drying conditions may be such that the temperature is approximately in the range of 30 to 120° C. and the drying time is, for example, 1 minute to 10 hours. The drying of the solvent is not an essential step. For example, the solvent may be dried simultaneously with the graft reaction, or the graft reaction may be performed without the drying of the solvent.

When the compound (A) is grafted to the acrylic resin film by the application of radiations, electron beams or UV (ultraviolet) rays in the range of 200 to 400 nm are preferably used. The energy applied for the graft reaction is approximately 100 to 5000 mJ/cm$^2$.

When the graft reaction is performed with heat, the coated film is heated at a temperature approximately in the range of 30 to 250° C. for 0.1 to 24 hours.

After the graft reaction, the treated film (the modified acrylic resin film) is washed to remove the compound (A) that has not been involved in the graft reaction from the treated film (the modified acrylic resin film). High polarity solvents such as water and alcohols may be preferably used.

As described above, the grafting treatment of the acrylic resin film (Xm) with the compound (A) makes it possible to obtain the modified acrylic resin film (Cm) having an excellent slipperiness and transparency. In particular when the acrylic resin film (Xm1) is used as the acrylic resin film (Xm), the modified acrylic resin film (Cm) obtained in the form of the modified acrylic resin film (Cm1) can have a certain hydrophilicity. Further, the modified acrylic resin film (Cm) obtained by the surface treatment with the compound (A) in the copresence of the compound (A') can also have antifouling properties and the like.

In addition, the laminate according to the present invention contains such a modified acrylic resin film (Cm), and can hence have an excellent slipperiness and transparency, and the like similarly. Here, in obtaining a laminate having the acrylic resin film (Xm1) as the acrylic resin film (Xm), the acrylic resin film (Xm1) constituting the laminate is preferably such that the concentration of the anionic hydrophilic groups on the side of the surface opposite to the side adjacent to the substrate constituting the laminate (i.e., substrate (Sb1)) is higher than the concentration of the anionic hydrophilic groups at the depth of half the film thickness from the surface, in order for the film to efficiently have the effects of an excellent slipperiness and transparency, a certain hydrophilicity, and the like.

Such a laminate may be obtained by carrying out the step (S2) followed by sticking or layering a substrate (Sb1) other than a substrate (Sb0) onto the surface on which the substrate (Sb0) was present in the acrylic resin film (Xm1), or may be obtained by a producing method in which the step (S2) is not carried out. In the present invention, the producing method in which the step (S2) is not carried out is preferable, and in this case, the substrate (Sb0) in its entirety constitutes the substrate (Sb1).

[Applications]

The aforementioned modified acrylic resin cured product (C) according to the present invention, especially the modified acrylic resin film (Cm) according to the present invention, has an excellent slipperiness. Accordingly, the modified acrylic resin cured product (C) according to the present invention, in the form of a modified acrylic resin film (Cm) or a laminate thereof, can preferably serve various applications including: lense applications such as eyeglass lenses, sunglasses, goggles, camera lenses, optical pickup lenses, Fresnel lenses, prismatic lenses, and lenticular lenses; display applications such as touch panels and display panels; film applications such as shatterproof films, films for showcases, decorating films, and window films; transparent material applications such as mirrors, glass plates, and transparent plastic plates.

EXAMPLES

Hereinbelow, the present invention will be described in further detail by discussions such as examples. The scope of the present invention is not limited to such examples.

Properties of films in the present invention were evaluated as described below.

<Measurement of Degree of Polymerization of Acrylic Resin Films (Resin Films to be Subjected to Grafting Treatment)>

First, an acrylic resin coating liquid prepared to have a 20 wt % solid content was applied to a substrate silicon wafer using a bar coater #02 and dried with a warm air dryer at 60° C. for 2 minutes. Then, a measurement sample was analyzed by FT-IR before and after UV irradiation, and the $>C=CH_2$ peak intensity ratios (base-line method) at 808 cm$^{-1}$ relative to the base peak (1730 cm$^{-1}$) obtained before and after the UV irradiation were assigned to the following calculating equation to thereby calculate the degree of polymerization.

Degree of Polymerization(mol %)=(peak intensity before UV irradiation−peak intensity after UV irradiation)/peak intensity before UV irradiation×100

<Measurement of Anion and Cation Concentration Ratio>

A sample was cut at a slant as illustrated in the view of sample preparation in the FIGURE. The anion concentration (Sa) in the outer surface and the anion concentration (Da) at the middle point were measured with a time-of-flight secondary ion mass spectrometer (TOF-SIMS). The obtained values were expressed as an anion concentration ratio (Sa/Da) of the anion concentration in the outer surface of the film in contact with the outside air to the anion concentration at the middle point between the inner surface and the outer surface of the film.

(Analyzer and Measurement Conditions)

TOF-SIMS: TOF-SIMS5 manufactured by ION-TOF GmbH

Primary ions: $Bi_3^{2+}$ (accelerating voltage 25 kV)

Measurement area: 400 μm$^2$

In the measurement, a neutralizing gun for correcting electric charges was used.

(Sample Preparation and the Like)

As shown in the FIGURE, a portion of a sample consisting of a substrate 10 and a coating layer 20 disposed on the surface of the substrate 10 was cut out precisely obliquely in a cutting direction 30. Thereafter, the sample was cut into a piece of approximately 10 mm×10 mm, and a mesh was placed on the measurement surface. The resulting sample was then fixed to a sample holder, and the concentration of anions was measured at a surface 40 of the coating layer in contact with air and at an inner portion 50 of the coating layer located inside the film (at the 1/2 point in the thickness of the film, a surface of the inside of the coating layer in contact with the substrate 10), using the time-of-flight secondary ion mass spectrometer (TOF-SIMS).

(Evaluation)

The evaluation was carried out according to the equation below. The ion concentrations at the respective measurement points were relative intensities (relative to the total amount of the detected ions).

Sa/Da (ratio of concentrations of anions,gradient)
=concentration of anions at surface 40 of coating layer/concentration of anions at 1/2 point in the film thickness of coating layer 20

<Measurement of Water Contact Angle>

The water contact angle was measured at 3 points in each of the samples using a water contact angle meter, model CA-V, manufactured by Kyowa Interface Science Co., Ltd. The average of the thus obtained values was defined as the contact angle.

<Measurement of Haze>

The haze was measured with respect to 4 sites for each sample with use of haze meter NDH2000 manufactured by NIPPON DENSHOKU INDUSTRIES CO., LTD. The haze values measured were averaged.

<Evaluation of Adhesion>

The adhesion was evaluated by a crosscut adhesion test.

<Evaluation of Antifouling Properties>

The surface was marked with oil-based marker "Mackee Gokuboso (ultrafine)" (black, code: MO-120-MC-BK) manufactured by ZEBRA CO., LTD. Water droplets were dropped on the marked surface, allowed to stand for 30 seconds, and wiped with tissue paper. The antifouling properties were evaluated to be "O" when the mark came off, and "X" when the mark did not come off and remained.

<Evaluation of Resistance to Breath Fogging>

The resistance to breath fogging was evaluated to be "O" when the surface did not become fogged with breath, and "X" when the surface became fogged with breath.

<Measurement of Coefficient of Dynamic Friction>

Apiece of cloth (either TORAYSEE made by Toray Industries, Inc. or BEMCOT® M-3II made by Asahi Kasei Corporation) was placed between a weight and the surface of a test sample, and an evaluation test was carried out in accordance with ASTM D1894.

load: 199 g test width: 30 mm test speed: 200 mm/minute test environment: 23° C., 50% RH Example 1-1

Preparation of Polymerizable Composition 1

A uniform polymerizable composition 1 having a solid content of 80 wt % was prepared in accordance with the compounding ratio shown in Table 1 below. The undermentioned surfactant (PELEX TR) used for preparing this polymerizable composition 1 has sodium dialkylsulfosuccinate as its main component.

TABLE 1

| Polymerizable Composition 1 (Solid Content: 80%) | | | |
|---|---|---|---|
| Description | Compounding Amount (g) | Concentration (wt %) | Remarks |
| SPA-K | 1.74 | 1.37 | hydrophilic monomer |
| EA-5721 | 20.00 | 15.70 | crosslinking monomer |
| A-BPE-10 | 10.00 | 7.85 | crosslinking monomer |
| U-15HA | 70.00 | 54.93 | crosslinking monomer |
| S-EED | 0.10 | 0.08 | stabilizer |
| 70% PELEX TR, Kao Corporation | 0.15 | 0.11 | surfactant |
| Water | 0.72 | 0.56 | solvent 1 |
| PGM: 1-methoxy-2-propanol | 24.72 | 19.40 | solvent 2 |
| | 127.43 | 100.00 | |

Solid Content (wt %) = 80.0%

SPA-K
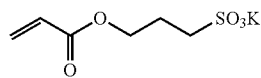
EA-5721
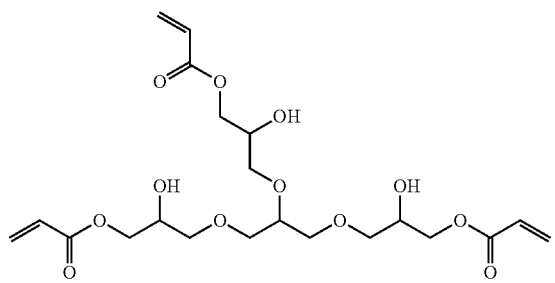
A-BPE-10
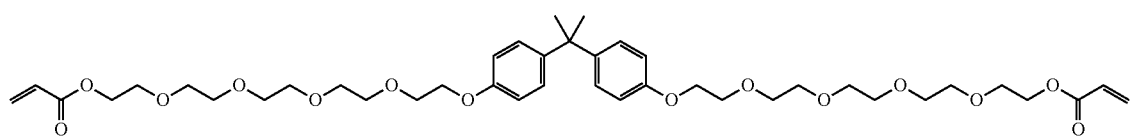
U-15HA
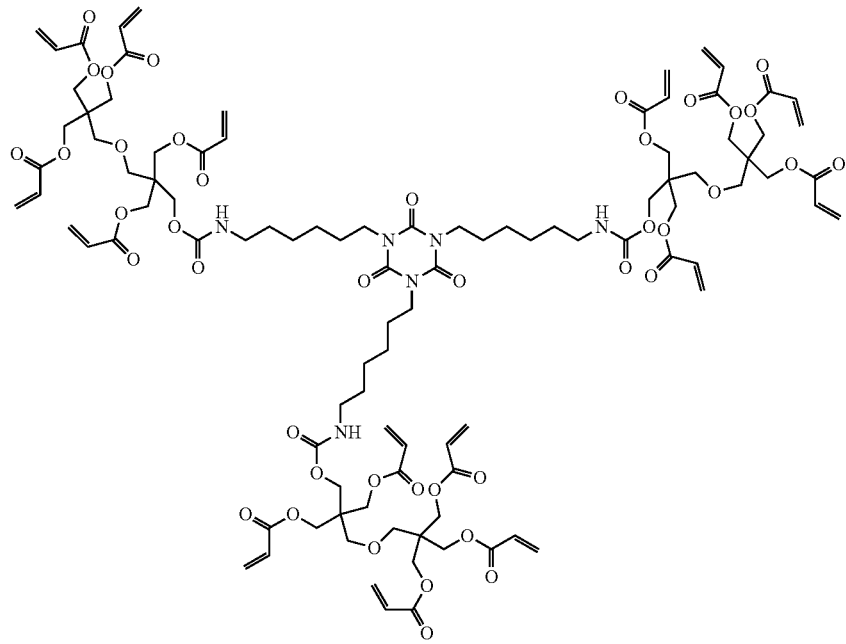
S-EED
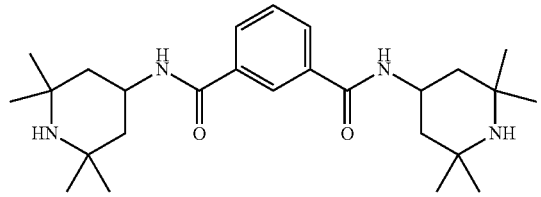

(Preparation of Coating Solution 1)

A coating solution 1 having a solid content of 40 wt % was prepared according to Table 2 below.

TABLE 2

| Coating Solution 1 | |
|---|---|
| Description | Compounding g |
| 80%-polymerizable composition 1 | 10.0 |
| Darocur 1173 | 0.24 |
| PGM | 10.3 |
| Total | 20.54 |

NV(wt %) = 40%

(Formation of Gradient Films for Grafting: formation of films in which the concentration of anionic hydrophilic groups at the surface is higher than the concentration of anionic hydrophilic groups at the depth of half the film thickness from the surface (hereinafter, may be referred to as "depth").

The coating solution 1 was applied onto a polycarbonate sheet (hereinafter, referred to as PC sheet) as a substrate with a spin coater (dripping at 500 rpm, stretching at 4000 rpm×40 seconds, 2 μm as dry) at room temperature (26° C., 20% RH), and dried with a warm air dryer at 60° C. for 2 minutes.

The resulting coating was then passed one time through a UV conveyer (manufactured by Fusion UV Systems, Japan, an electrodeless discharge lamp, H valve 240 W/cm, output 30%, height 65 mm, conveyer speed 30 m/minute) (illuminance 25 mW/cm$^2$, accumulated dose 6 mJ/cm$^2$, the 250 to 445 nm UV measuring instrument UV Power Puck), thereby forming a gradient film with a film thickness of 2 μm on the PC sheet. In the coating film, the degree of polymerization of acrylic groups was 46 mol %. In addition, property measurements and TOF-SIMS analysis were performed. The results are shown in Table 3.

This gradient film corresponds to the acrylic resin film (Xm1) mentioned in the present invention.

TABLE 3

| | Gradient Film for Grafting |
|---|---|
| Sulfonic acid group intensity at the film surface* Sa | 7.6E−02 |
| Sulfonic acid group intensity at the middle of the film thickness* Da | 3.1E−02 |
| Gradient degree (Sa/Da) | 2.5 |

(Preparation of Grafting Treatment Liquid)

As a liquid mixture for grafting treatment, grafting treatment liquids ATBS-1, ATBS-2, and ATBS-n each were prepared in accordance with the compounding described in Tables 4-1 to 4-3.

The grafting treatment liquids ATBS-1 and ATBS-2 correspond to the compound (A) mentioned in the present invention, and the grafting treatment liquid ATBS-n corresponds to the compound (A') mentioned in the present invention.

TABLE 4-1

Grafting Treatment Liquid ATBS-1 (Solid Content: 25 wt %, pH = 7.0)

| Description | Compounding Amount (g) | Remarks |
|---|---|---|
| ATBS | 1.53 | hydrophilic compound |
| UMBA | 23.27 | counter cation |
| Water | 2.76 | solvent 2 |
| GIP: 2-isopropoxy-1-ethanol | 72.24 | solvent 1 |
| AQUALEN HS-01, Kyoeisha Chemical Co., Ltd. | 0.20 | surface conditioner |
| Total | 100.00 | |

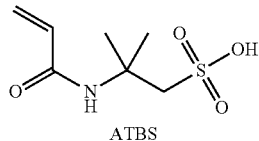
ATBS

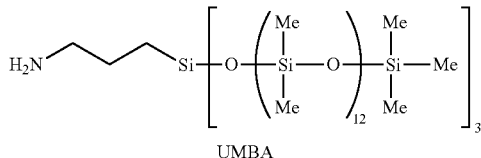
UMBA
weight average molecular weight = 3,100

The compounds produced in the system by the preparation of the grafting treatment liquids are as follows:

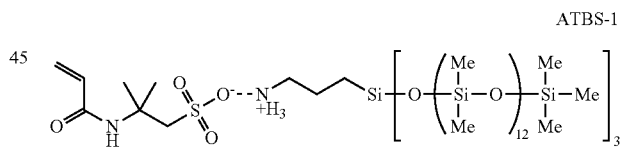
ATBS-1

TABLE 4-2

Grafting Treatment Liquid ATBS-2 (Solid Content: 25 wt %, pH = 7.3)

| Description | Compounding Amount (g) | Remarks |
|---|---|---|
| ATBS | 0.81 | hydrophilic compound |
| BRDA | 23.99 | counter cation |
| Water | 1.10 | solvent 2 |
| GIP: 2-isopropoxy-1-ethanol | 73.90 | solvent 1 |
| AQUALEN HS-01, Kyoeisha Chemical Co., Ltd. | 0.20 | surface conditioner |
| Total | 100.00 | |

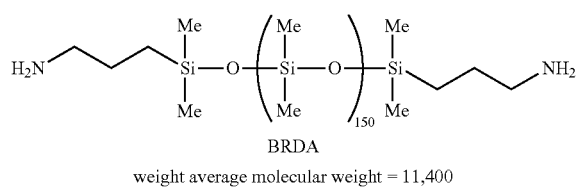

BRDA weight average molecular weight = 11,400

The compounds produced in the system by the preparation of the grafting treatment liquids are as follows:

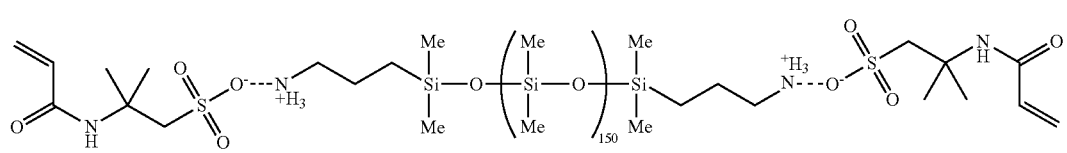 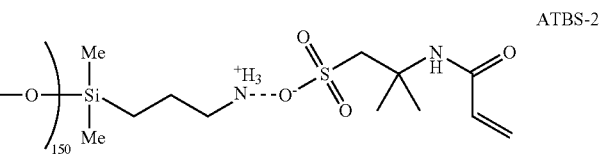

ATBS-2

TABLE 4-3

Grafting Treatment Liquid ATBS-n (Solid Content: 27 wt %, pH = 7.0)

| Description | Compounding Amount (g) | Concentration (wt %) | Remarks |
|---|---|---|---|
| ATBS | 549.1 | 22.45 | hydrophilic compound |
| NaOH flakes | 107.3 | 4.39 | counter cation |
| Water | 1,170.0 | 47.84 | solvent 1 |
| PGM: 1-methoxy-2-propanol | 204.0 | 8.34 | solvent 2 |
| PenOH: 1-pentanol | 410.0 | 16.77 | solvent 3 |
| 25 wt %-AQUALEN SB-630, Kyoeisha Chemical Co., Ltd. | 3.0 | 0.12 | surface conditioner |
| 70%-PELEX TR, Kao Corporation | 2.0 | 0.08 | surfactant |
| Total | 2,445.4 | 100.00 | |

The compounds produced in the system by the preparation of the grafting treatment liquids are as follows:

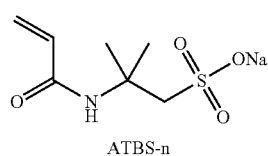

ATBS-n (Grafting Treatment)

The grafting treatment liquid ATBS-1 was applied to the surface of the gradient film for grafting obtained above with a spray gun (air pressure: 1.5 Kgf/cm$^2$), allowed to stand at room temperature for one minute, passed one time through a UV conveyer (manufactured by Fusion UV Systems, Japan, an electrodeless discharge lamp, H valve, output 100%, height 65 mm, conveyer speed 5 m/minute) (illuminance 1400 mW/cm$^2$, accumulated dose 1800 mJ/cm$^2$, the 250 to 445 nm UV measuring instrument UV Power Puck), thereby carrying out grafting treatment on the surface of the coating film and completely curing the film. Finally, the surface was rubbed and washed with running water and dried with an air gun, followed by polishing the surface softly with TORAYSEE (Toray), to complete the coating (measurement sample).

The thus obtained measurement sample was used for various tests. The results are shown in Table 5.

Examples 1-2 to 1-3

The tests were carried out in the same manner as in Example 1-1 except that the grafting treatment liquid was changed from ATBS-1 to a mixture of ATBS-1 and ATBS-n (the compounding ratios of ATBS-1 to ATBS-n are described in Table 5). The results are shown in Table 5.

Example 1-4

The test was carried out in the same manner as in Example 1-1 except that the grafting treatment liquid was changed from ATBS-1 to ATBS-2. The results are shown in Table 5.

Examples 1-5 to 1-6

The tests were carried out in the same manner as in Example 1-1 except that the grafting treatment liquid was changed from ATBS-1 to a mixture of ATBS-2 and ATBS-n (the compounding ratios of ATBS-2 to ATBS-n are described in Table 5). The results are shown in Table 5.

Comparative Example 1-1

The test was carried out in the same manner as in Example 1-1 except that the grafting treatment liquid was changed from ATBS-1 to ATBS-n. The results are shown in Table 5.

Comparative Example 1-2

UV irradiation was performed again in the same manner as in Example 1-1 without applying the grafting treatment liquid. In other words, only the formation of a gradient film for grafting was carried out to a substrate PC (polycarbonate) and grafting treatment was not carried out in this Comparative Example. The results are shown in Table 5.

Comparative Example 1-3

The test results with the substrate PC (polycarbonate) are shown in Table 5.

TABLE 5

Test Results of Examples 1-1 to 1-6 and Comparative Examples 1-1 to 1-3

| | Grafting Treatment Liquid (weight ratio in the case of two-component mixing) | Appearance | Water Contact Angle (°) | Haze (%) | Coefficient of Dynamic Friction | | Remarks |
|---|---|---|---|---|---|---|---|
| | | | | | TORAYSEE | BEMCOT M-311 | |
| Example 1-1 | ATBS-1 | transparent | 71 | 0.4 | 0.27 | 0.06 | antifouling properties: ○ |
| Example 1-2 | ATBS-1/ATBS-n = 1/1 | transparent | 24 | 0.3 | 0.27 | 0.05 | antifouling properties: ○ |
| Example 1-3 | ATBS-1/ATBS-n = 1/4 | transparent | 10 | 0.3 | 0.38 | 0.08 | antifogging properties: ○ |
| Example 1-4 | ATBS-2 | transparent | 45 | 0.3 | 0.12 | 0.12 | |
| Example 1-5 | ATBS-2/ATBS-n = 1/1 | transparent | 41 | 0.2 | 0.12 | 0.13 | |
| Example 1-6 | ATBS-2/ATBS-n = 1/4 | transparent | 40 | 0.5 | 0.20 | 0.17 | |
| Comparative Example 1-1 | ATBS-n | transparent | 6 | 0.4 | 1.23 | 0.49 | response rate: 80 mol % |
| Comparative Example 1-2 | only single coat DBH | transparent | 7 | 0.2 | 0.94 | 0.33 | |
| Comparative Example 1-3 | Substrate PC | transparent | 86 | 0.1 | 0.99 | 0.62 | |

Examples 2-1 to 2-9 (Preparation of Grafting Solution)

In Examples 2-1 to 2-9, reaction liquid mixtures were prepared in accordance with the compounding described in Tables 6-1 to 6-9 respectively, and filtered through a 5 μm filter finally, and the filtrate was used as a grafting treatment liquid.

TABLE 6-1

Example 2-1: Grafting Treatment Liquid SPA

| Mixing Order | Description | Compounding Amount (g) | Remarks |
|---|---|---|---|
| 1 | *SPA | 1.44 | hydrophilic compound |
| 2 | GIP: 2-isopropoxy-1-ethanol | 75.00 | solvent 1 |
| 3 | UMBA | 23.36 | counter cation |
| 4 | AQUALEN HS-01, Kyoeisha Chemical Co., Ltd. | 0.20 | surface conditioner |
| Total | | 100.00 | |

*SPA: 3-sulfopropyl acrylate

The compounds produced in the system by the preparation of the grafting treatment liquids are as follows.

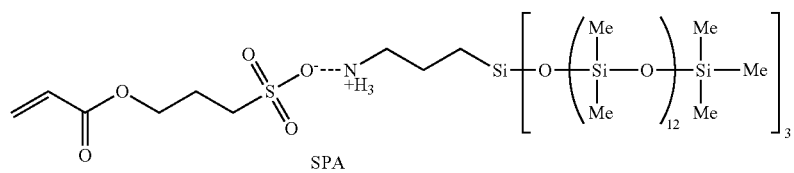

SPA

TABLE 6-2

Example 2-2: Grafting Treatment Liquid SPDA

| Mixing Order | Description | Compounding Amount (g) | Remarks |
|---|---|---|---|
| 1 | *SPDA-K | 2.82 | hydrophilic compound |
| 2 | 5 wt % hydrochloric acid | 5.10 | desalting agent |
| 3 | GIP: 2-isopropoxy-1-ethanol | 69.90 | solvent1 |
| 4 | UMBA | 21.99 | counter cation |
| 5 | AQUALEN HS-01, Kyoeisha Chemical Co., Ltd. | 0.20 | surface conditioner |
| Total | | 100.00 | |

*SPDA-K: 2,2-bis(methacryloyloxymethyl)propionic acid-3'-sulfopropyl ester potassium salt The compounds produced in the system by the preparation of the grafting treatment liquids are as follows.

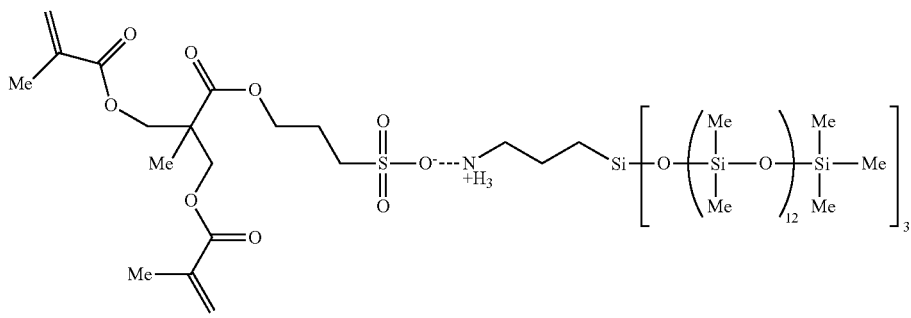

TABLE 6-3

Example 2-3 Grafting Treatment Liquid AS

| Mixing Order | Description | Compounding Amount (g) | Remarks |
|---|---|---|---|
| 1 | *AS-Na | 1.09 | hydrophilic compound |
| 2 | 5 wt % hydrochloric acid | 5.50 | desalting agent |
| 3 | GIP: 2-isopropoxy-1-ethanol | 69.50 | solvent 1 |
| 4 | UMBA | 23.71 | counter cation |
| 5 | AQUALEN HS-01, Kyoeisha Chemical Co., Ltd. | 0.20 | surface conditioner |
| Total | | 100.00 | |

*AS-Na: allylsulfonic acid sodium salt

The compounds produced in the system by the preparation of the grafting treatment liquids are as follows.

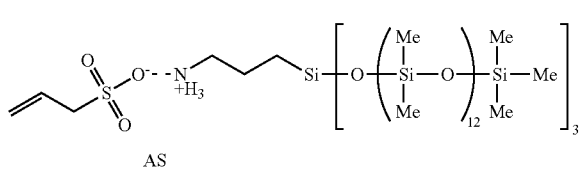

AS

TABLE 6-4

Example 2-4: Grafting Treatment Liquid VS

| Mixing Order | Description | Compounding Amount (g) | Remarks |
|---|---|---|---|
| 1 | *VS | 0.93 | hydrophilic compound |
| 2 | GIP: 2-isopropoxy-1-ethanol | 75.00 | solvent 1 |
| 3 | UMBA | 23.87 | counter cation |
| 4 | AQUALEN HS-01, Kyoeisha Chemical Co., Ltd. | 0.20 | surface conditioner |
| Total | | 100.00 | |

*VS: vinyl sulfonic acid

The compounds produced in the system by the preparation of the grafting treatment liquids are as follows.

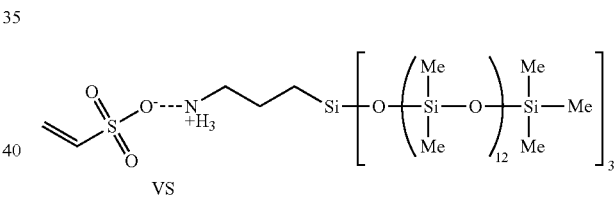

VS

TABLE 6-5

Example 2-5: Grafting Treatment Liquid STS

| Mixing Order | Description | Compounding Amount (g) | Remarks |
|---|---|---|---|
| 1 | *STS-Na•H$_2$O | 1.58 | hydrophilic compound |
| 2 | 5 wt % hydrochloric acid | 5.39 | desalting agent |
| 3 | GIP: 2-isopropoxy-1-ethanol | 69.61 | solvent 1 |
| 4 | UMBA | 23.22 | counter cation |
| 5 | AQUALEN HS-01, Kyoeisha Chemical Co., Ltd. | 0.20 | surface conditioner |

*STS-Na•H$_2$O: styrenesulfonic acid sodium salt hydrate

The compounds produced in the system by the preparation of the grafting treatment liquids are as follows.

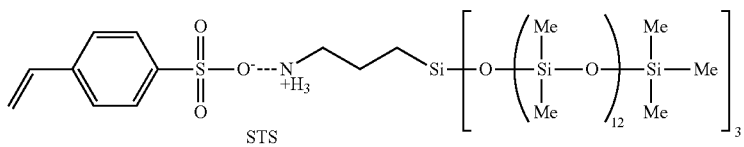

STS

TABLE 6-6

Example 2-6: Grafting Treatment Liquid AA

| Mixing Order | Description | Compounding Amount (g) | Remarks |
|---|---|---|---|
| 1 | *AA | 0.56 | hydrophilic compound |
| 2 | GIP: 2-isopropoxy-1-ethanol | 75.00 | solvent 1 |
| 3 | UMBA | 24.25 | counter cation |
| 4 | AQUALEN HS-01, Kyoeisha Chemical Co., Ltd. | 0.20 | surface conditioner |
| Total | | 100.00 | |

*AA: acrylic acid

The compounds produced in the system by the preparation of the grafting treatment liquids are as follows.

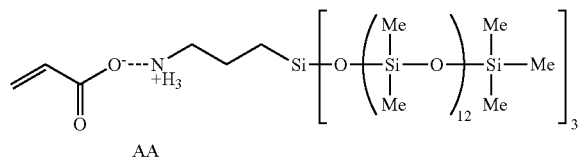

AA

TABLE 6-7

Example 2-7: Grafting Treatment Liquid P-1A

| Mixing Order | Description | Compounding Amount (g) | Remarks |
|---|---|---|---|
| 1 | *P-1A | 0.75 | hydrophilic compound |
| 2 | cyclohexane | 30.00 | solvent 2 |
| 3 | GIP: 2-isopropoxy-1-ethanol | 45.00 | solvent 1 |
| 4 | UMBA | 24.06 | counter cation |
| 5 | AQUALEN HS-01, Kyoeisha Chemical Co., Ltd. | 0.20 | surface conditioner |
| Total | | 100.00 | |

*P-1A: acryloyloxyethyl phosphoric acid

The compounds produced in the system by the preparation of the grafting treatment liquids are as follows.

TABLE 6-8

Example 2-8: Grafting Treatment Liquid MPS

| Mixing Order | Description | Compounding Amount (g) | Remarks |
|---|---|---|---|
| 1 | *MPS-Na | 1.33 | hydrophilic compound |
| 2 | 5 wt % hydrochloric acid | 5.45 | desalting agent |
| 3 | GIP: 2-isopropoxy-1-ethanol | 69.55 | solvent 1 |
| 4 | UMBA | 23.47 | counter cation |
| 5 | AQUALEN HS-01, Kyoeisha Chemical Co., Ltd. | 0.20 | surface conditioner |
| Total | | 100.00 | |

*MPS-Na: mercaptopropyl sulfonic acid sodium salt

The compounds produced in the system by the preparation of the grafting treatment liquids are as follows.

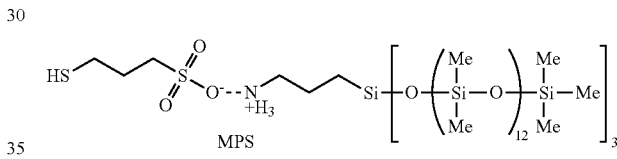

MPS

TABLE 6-9

Example 2-9: Grafting Treatment Liquid HNDS

| Mixing Order | Description | Compounding Amount (g) | Remarks |
|---|---|---|---|
| 1 | *HNDS-K | 1.42 | hydrophilic compound |
| 2 | 5 wt % hydrochloric acid | 2.71 | desalting agent |
| 3 | GIP: 2-isopropoxy-1-ethanol | 72.29 | solvent 1 |
| 4 | UMBA | 23.39 | counter cation |
| 5 | AQUALEN HS-01, Kyoeisha Chemical Co., Ltd. | 0.20 | surface conditioner |
| Total | | 100.00 | |

*HNDS-K: 7-hydroxy-1,3-naphthalene disulfonic acid dipotassium salt

The compounds produced in the system by the preparation of the grafting treatment liquids are as follows.

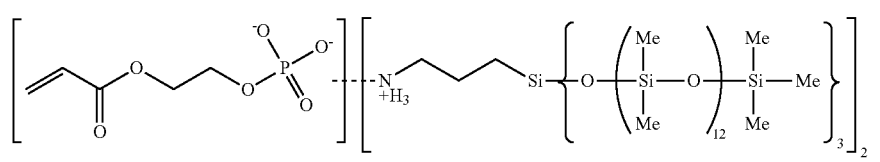

P-1A

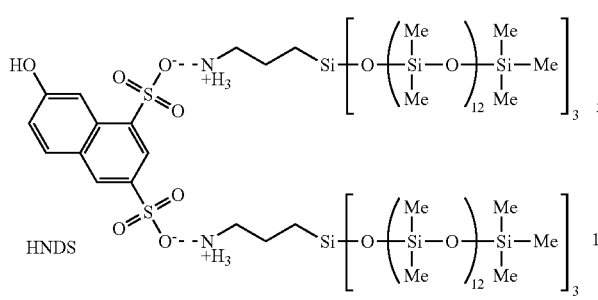

(Grafting Treatment)

The tests were carried out in the same manner as in Example 1-1 using the grafting treatment liquids each prepared in accordance with the compounding described in Tables 6-1 to 6-9. The results are shown in Table 7.

thickness of 2 μm on the substrate PC sheet (response rate: 12 mol %). This non-gradient acrylic resin film corresponds to the acrylic resin film (Xm0) mentioned in the present invention.

Then, the non-gradient acrylic resin film was graft-treated in the same manner as in Examples 1-1 to 1-3. In other words, the grafting treatment was carried out in Examples 3-1 to 3-3 in the same manner as in Examples 1-1 to 1-3 respectively, except that the non-gradient acrylic resin film was used in place of the gradient film for grafting obtained in Example 1-1. The results are shown in Table 8.

Comparative Example 3-1

UV irradiation was performed again in the same manner as in Example 1-1 without applying the grafting treatment liquid. The results are shown in Table 8.

TABLE 8

Test Results of Examples 3-1 to 3-3 and Comparative Example 3-1

|  | Grafting Treatment Liquid (compounding ratio by weight ratio) | Appearance | Water Contact Angle (°) | Haze (%) | Coefficient of Dynamic Friction TORAYSEE |
|---|---|---|---|---|---|
| Example 3-1 | ATBS-1 | transparent | 86 | 0.2 | 0.28 |
| Example 3-2 | ATBS-1/ATBS-n = 1/1 | transparent | 83 | 0.2 | 0.47 |
| Example 3-3 | ATBS-1/ATBS-n = 1/4 | transparent | 51 | 2.9 | 0.69 |
| Comparative Example 3-1 | only single coat A-9539 | transparent | 66 | 0.2 | 1.18 |

TABLE 7

Test Results of Examples 2-1 to 2-9

|  | Graft Compound | Appearance | Water Contact Angle (°) | Haze ( %) | Coefficient of Dynamic Friction TORAYSEE (Toray) |
|---|---|---|---|---|---|
| Example 2-1 | SPA | transparent | 83 | 0.2 | 0.23 |
| Example 2-2 | SPDA | transparent | 83 | 0.2 | 0.24 |
| Example 2-3 | AS | transparent | 85 | 0.3 | 0.18 |
| Example 2-4 | VS | transparent | 56 | 0.2 | 0.27 |
| Example 2-5 | STS | transparent | 81 | 0.3 | 0.27 |
| Example 2-6 | AA | transparent | 57 | 0.3 | 0.23 |
| Example 2-7 | P-1A | transparent | 75 | 0.5 | 0.25 |
| Example 2-8 | MPS | transparent | 81 | 0.3 | 0.29 |
| Example 2-9 | HNDS | transparent | 93 | 0.5 | 0.29 |

Examples 3-1 to 3-3

Added were 8.0 g of dipentaerythritol pentaacrylate (referred to as A-9530 for short), 0.24 g of Darocur 1173 (from BASF) as a UV polymerization initiator, and 12.0 g of PGM as a solvent, which were mixed and dissolved, to give a coating solution 2 having a solid content of 40 wt %.

The obtained coating solution 2 was applied, dried, and UV-irradiated in the same manner as in Example 1-1, forming a non-gradient acrylic resin film having a film Manufacturing Example 4-1

Making of Eyeglass Lens

A uniform solution was made by mixing and dissolving 50.6 g of MR-8A™, 23.9 g of MR-8B1™, 25.5 g of MR-8B2™, which are each made by Mitsui Chemicals, Inc., 0.035 g of dibutyltin chloride, 1.5 g of ultraviolet absorber (trade name: Biosorb 583, made by Kyodo Chemical Co., Ltd.), and 0.1 g of internal mold release agent (trade name: Internal Mold Release Agent for MR, made by Mitsui Chemicals, Inc.).

This uniform solution was defoamed under a reduced pressure of 400 Pa for one hour and filtered through a 1 μm PTFE-made filter, and the filtrate was injected into a mold composed of a glass mold and a tape. The mold with the liquid injected thereinto was loaded into a polymerization oven, heated gradually from 25° C. to 120° C. in 21 hours, and cured.

After cooling to room temperature, the tape and the glass mold were removed from the mold, and the plastic lens inside thereof was taken out, again heated at 120° C. for 2 hours to eliminate distortion, and slowly cooled to room temperature. The thus obtained MR-8™ plastic lense has a refractive index (ne) of 1.60, an Abbe number (ve) of 40, a specific gravity of 1.29, a heat-resistance of 90° C. or greater, and hence has preferable properties as a plastic lense for eyeglasses.

Example 4-1

Preparation of Primer Composition-100

Mixed were 40 g of TAKELAC A315 (made by Mitsui Chemicals, Inc.), 4.0 g of TAKENATE A10 (made by Mitsui Chemicals, Inc.), 836 g of 2-pentanone, and 132 mg of dioctyltin dilaurate to give a primer composition-100.

Preparation of Coating Composition-101

Mixed were 225 g of polymerizable composition 1 (solid content: 80 wt %), 100 g of 1-methoxy-2-propanol, 125 g of methanol, and 5.0 g of Darocur 1173 to give a coating composition-101.

Preparation of Grafting Treatment Liquid-102

To 9.0 g of the grafting treatment liquid ATBS-n with a solid content of 25 wt %, 1.0 g of the grafting treatment liquid ATBS-1 with a solid content of 25 wt % was added and stirred to give a grafting treatment liquid-102 with ATBS-1/ATBS-n=1/9 at 25 wt %.

Coating to Substrate

To the surface of the MR-8™ eyeglass lense obtained in the Manufacturing Example 4-1, the primer composition-100 obtained above was applied with a dip coater at a pull-up rate (1.0 mm/s), and cured in an oven at 110° C. for one hour. Then, to the MR-8™ eyeglass lense with the primer composition-100 cured thereon, the coating composition-101 was applied with a dip coater at a pull-up rate (10 mm/s), and dried in an oven at 60° C. for 3 minutes. Subsequently, the eyeglass lense was irradiated with ultraviolet rays having an accumulated dose of 22 mJ/cm$^2$ and an illuminance of 96 mW/cm$^2$ (illuminance: 30%, conveyer rate: 30 m, height: 70 mm), one side after the other (totaling 2 times), having the coating composition-101 half-cured. Further, to the surface of the half-cured coating composition-101, the grafting treatment liquid-102 was spray-coated with a pressure of 0.1 MPa, and allowed to stand for one minute, whereafter the eyeglass lense was irradiated with ultraviolet rays having an accumulated dose of 789 mJ/cm$^2$ and an illuminance of 721 mW/cm$^2$ (illuminance: 100%, conveyer rate: 5 m, height: 70 mm), one side after the other (totaling 2 times), having the coated film cured. Finally, the coated surface was rubbed and washed with running water and dried with an air gun, followed by polishing the surface softly with TORAYSEE (Toray Industries, Inc.), to give an antifogging eyeglass lense having an excellent slipperiness.

The obtained hydrophilic coat MR-8™ eyeglass lense (laminate) is transparent and very hydrophilic, and has excellent antifogging, antifouling, and slipperiness properties.

The results are shown in Table 9.

TABLE 9

|  | Example 4-1 |
| --- | --- |
| Substrate | MR-8 |
| Contact angle (°) | 13 |
| Coefficient of dynamic friction (TORAYSEE) | 0.4 |
| Antifogging properties | ○ |
| Antifouling properties | ○ |

REFERENCE SIGNS LIST

10: SUBSTRATE
20: COATING LAYER
30: CUTTING DIRECTION
40: COATING LAYER SURFACE
50: INSIDE OF COATING LAYER

The invention claimed is:

1. A modified acrylic resin cured product (C) obtained by treating the surface of a cured product (X) composed of an acrylic resin
with a compound (A) comprising, in the molecule,
one or more of anionic hydrophilic groups forming an ion pair with an onium ion of an amino silicone, and
one or more of groups selected from the group consisting of groups containing a polymerizable carbon-carbon double bond, amino groups, mercapto groups, and hydroxyl groups,
wherein the amino silicone has a molecular weight of 100 to 1,000,000 and is one or more selected from compounds represented by the following general formulae (a1) to (a3):

General Formula (a1):

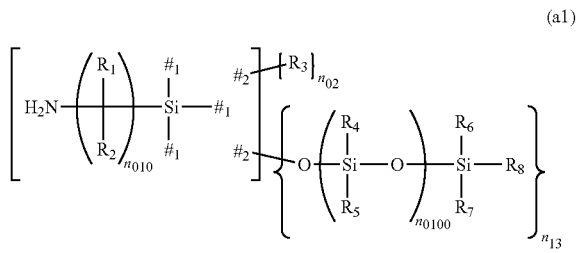

wherein in the formula (a1), $R_1$ to $R_8$ are independently a hydrogen atom, a $C_{1-6}$ alkyl group, or a $C_{1-6}$ alkoxy group; $n_{010}$ is an integer of 0 to 10; $n_{0100}$ is an integer of 0 to 100; $n_{02}$ is an integer of 0 to 2; $n_{13}$ is an integer of 1 to 3; $n_{02}+n_{13}=3$; $\#_1$ and $\#_2$ represent bonding hands; and $\#_1$ and $\#_2$ are bonded together;

General Formula (a2):

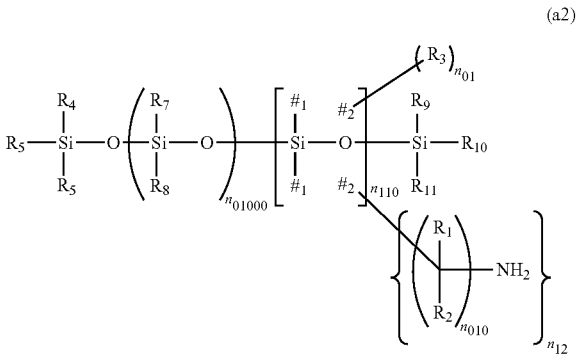

wherein in the formula (a2), $R_1$ to $R_{11}$ are independently a hydrogen atom, a $C_{1-6}$ alkyl group, or a $C_{1-6}$ alkoxy group; $n_{01000}$ is an integer of 0 to 1000; $n_{110}$ is an integer of 1 to 10; $n_{010}$ is an integer of 0 to 10; $n_{12}$ is an integer of 1 to 2; $n_{01}$ is an integer of 0 to 1; $n_{01}+n_{12}=2$; $\#_1$ and $\#_2$ represent bonding hands; $\#_1$ and $\#_2$ are bonded together; and the compounds represented by the formula (a2) do not include the compounds represented by the formula (a1);

General Formula (a3):

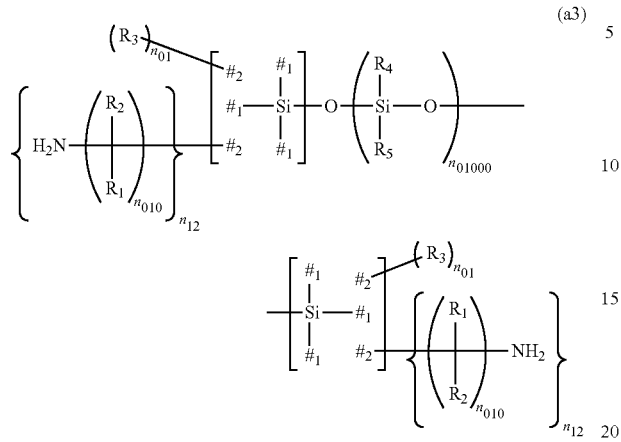

(a3)

wherein in the formula (a3), $R_1$ to $R_5$ are independently a hydrogen atom, a $C_{1-6}$ alkyl group, or a $C_{1-6}$ alkoxy group); $n_{01000}$ is an integer of 0 to 1000; $n_{010}$ is an integer of 0 to 10; $n_{01}$ is an integer of 0 to 2; $n_{12}$ is an integer of 1 to 3; $n_{01}+n_{12}=3$; $n_{01}$s and $n_{12}$s each may be the same as or different from one another; $\#_1$ and $\#_2$ represent bonding hands; and $\#_1$ and $\#_2$ are bonded together.

2. The modified acrylic resin cured product (C) according to claim 1, wherein the surface treatment is carried out in the copresence of
a compound (A') comprising, in the molecule,
one or more of anionic hydrophilic groups forming an ion pair with one or more selected from the group consisting of hydrogen ions, alkali metal ions, alkaline earth metal ions, ammonium ions, and amine ions other than an onium ion of the amino silicone, and
one or more of groups selected from the group consisting of groups containing a polymerizable carbon-carbon double bond, amino groups, mercapto groups, and hydroxyl groups.

3. The modified acrylic resin cured product (C) according to claim 1, wherein the compound (A) is one or more selected from compounds represented by the general formulae (A1) to (A6):

General Formula (A1):

(A1)

wherein in the formula (A1), $D_1$ is a (meth)acryloyloxy group (only when q is 1), a (meth)acryloylthio group (only when q is 1), a (meth)acrylamido group (only when q is 1), a vinyl group, an isopropenyl group, a (meth)allyl group, a styryl group, a mercapto group, an amino group, a methylamino group, or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups, and ester groups; and q is 0 or 1;

General Formula (A2):

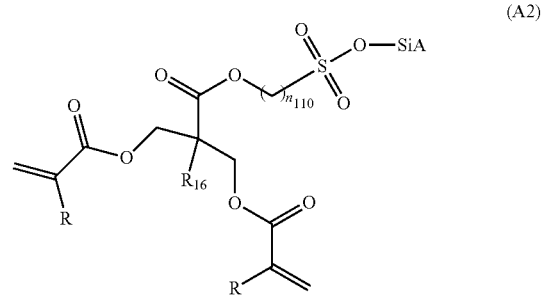

(A2)

wherein in the formula (A2), R represents a hydrogen atom or a methyl group; Rs may be the same as or different from one another; $R_{16}$ is a hydrogen atom or a $C_{1-6}$ alkyl group; SiA is an onium ion of an amino silicone having a molecular weight of 100 to 1,000,000; and $n_{110}$ is an integer of 1 to 10;

General Formula (A3):

(A3)

wherein in the formula (A3), $D_1$ is a (meth)acryloyloxy group (only when q is 1), a (meth)acryloylthio group (only when q is 1), a (meth)acrylamido group (only when q is 1), a vinyl group, an isopropenyl group, a (meth)allyl group, a styryl group, a mercapto group, an amino group, a methylamino group or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups, and ester groups; and q is 0 or 1;

General Formula (A4):

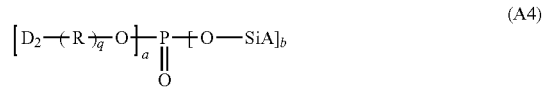

(A4)

wherein in the formula (A4), $D_2$ is a (meth)acryloyloxy group, a (meth)acryloylthio group, a (meth)acrylamido group, a vinyl group, an isopropenyl group, a (meth)allyl group, a styryl group, a mercapto group, an amino group, a methylamino group or an ethylamino group; SiA is an onium ion of an amino silicone having a molecular weight of 100 to 1,000,000; R is a main chain having 1 to 100 carbon atoms and may include, therein, one or more groups selected from aromatic rings, alicyclic groups, ether groups, and ester groups; a and b are independently an integer of 1 or 2; a+b=3; when a is 2, $D_2$s and Rs each may be the same as or different from one another; when b is 2, SiAs may be the same as or different from one another; and q is 0 or 1;

General Formula (A5):

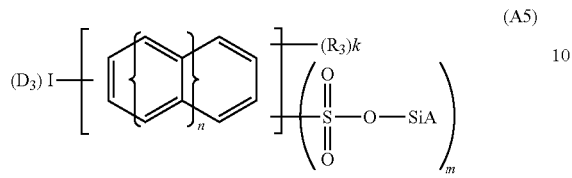

wherein in the formula (A5), $D_3$, $R_3$, and $SO_3SiA$ are groups bonded to carbons on rings included in the formula; $D_3$ is independently a vinyl group, an isopropenyl group, a (meth)allyl group, a styryl group, a mercapto group, an amino group, a methylamino group, an ethylamino group, or a hydroxyl group; SiA is an onium ion of an amino silicone having a molecular weight of 100 to 1,000,000; $R_3$ is independently a hydrogen atom, a methyl group, an ethyl group, a methoxy group, an ethoxy group, a fluorine atom, a chlorine atom, a bromine atom, or an iodine atom; k is an integer of 0 to 10; l and m are independently an integer of 1 to 11; $k+l+m=6+2n$; n is an integer of 0 to 3; when l is 2 or greater, $D_3$s may be the same as or different from one another; when k is 2 or greater, $R_3$s may be the same as or different from one another; and when m is 2 or greater, SiAs may be the same as or different from one another;

General Formula (A6):

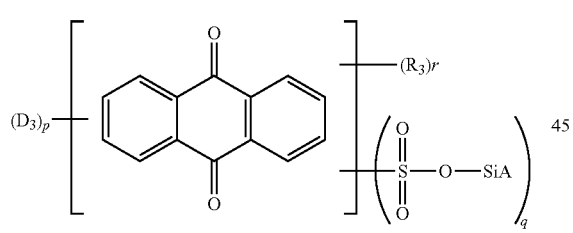

wherein in the formula (A6), $D_3$, $R_3$, and $SO_3SiA$ are groups bonded to carbons on rings included in the formula; $D_3$ is independently a vinyl group, an allyl group, an isopropenyl group, a styryl group, a mercapto group, an amino group, a methylamino group, an ethylamino group, or a hydroxyl group; SiA is an onium ion of an amino silicone having a molecular weight of 100 to 1,000,000; $R_3$ is independently a hydrogen atom, a methyl group, an ethyl group, a methoxy group, an ethoxy group, a fluorine atom, a chlorine atom, a bromine atom, or an iodine atom; r is an integer of 0 to 6; q and p are independently an integer of 1 to 7; $p+q+r=8$; when p is 2 or greater, $D_3$s may be the same as or different from one another; when r is 2 or greater, $R_3$s may be the same as or different from one another; and when q is 2 or greater, SiAs may be the same as or different from one another.

4. The modified acrylic resin cured product (C) according to claim 3, wherein the compound represented by the general formula (A1) is a compound represented by the general formula (A7):

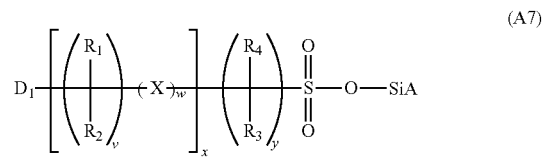

wherein in the formula (A7), $D_1$ is a (meth)acryloyloxy group (when any of x and y is 1 or greater), a (meth)acryloylthio group (when any of x and y is 1 or greater), a (meth)acrylamido group (when any of x and y is 1 or greater), a vinyl group, an isopropenyl group, a (meth)allyl group, a styryl group, a mercapto group, an amino group, a methylamino group or an ethylamino group; X is an oxygen atom, a sulfur atom, —NH—, or —$NCH_3$—; SiA is an onium ion of an amino silicone having a molecular weight of 100 to 1,000,000; $R_1$ to $R_4$ are independently a hydrogen atom, a $C_{1-6}$ alkyl group, or a $C_{1-6}$ alkoxy group; v and y are independently an integer of 0 to 10; w is 0 or 1 (when any of v and y is 0, w is 0); x is an integer of 0 to 10; when v is 2 or greater, $R_1$s and $R_2$s each may be the same as or different from one another; when y is 2 or greater, $R_3$s and $R_4$s each may be the same as or different from one another; when x is 2 or greater, $R_1$s and $R_2$s each may be the same as or different from one another.

5. The modified acrylic resin cured product (C) according to claim 1, which is a modified acrylic resin film.

6. The modified acrylic resin cured product (C) according to claim 5,
wherein the cured product (X) composed of an acrylic resin is
an acrylic resin film (Xm1) which has an anionic hydrophilic group and in which the concentration of the anionic hydrophilic groups at the surface is higher than the concentration of the anionic hydrophilic groups at the depth of half the film thickness from the surface.

7. A laminate including a substrate and the modified acrylic resin cured product (C) according to claim 5.

8. A method for producing a modified acrylic resin film (Cm), comprising the following step (S1):
Step (S1): the step of treating the surface of an acrylic resin film (Xm)
with a compound (A) comprising, in the molecule,
one or more of anionic hydrophilic groups forming an ion pair with an onium ion of an amino silicone, and
one or more of groups selected from the group consisting of groups containing a polymerizable carbon-carbon double bond, amino groups, mercapto groups, and hydroxyl groups,
wherein the amino silicone has a molecular weight of 100 to 1,000,000 and is one or more selected from compounds represented by the following general formulae (a1) to (a3):

General Formula (a1):

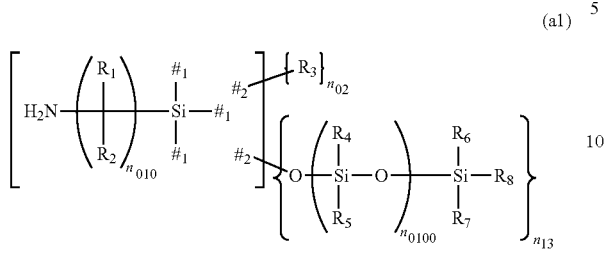

wherein in the formula (a1), $R_1$ to $R_8$ are independently a hydrogen atom, a $C_{1-6}$ alkyl group, or a $C_{1-6}$ alkoxy group; $n_{010}$ is an integer of 0 to 10; $n_{0100}$ is an integer of 0 to 100; $n_{02}$ is an integer of 0 to 2; $n_{13}$ is an integer of 1 to 3; $n_{02}+n_{13}=3$; $\#_1$ and $\#_2$ represent bonding hands; and $\#_1$ and $\#_2$ are bonded together;

General Formula (a2):

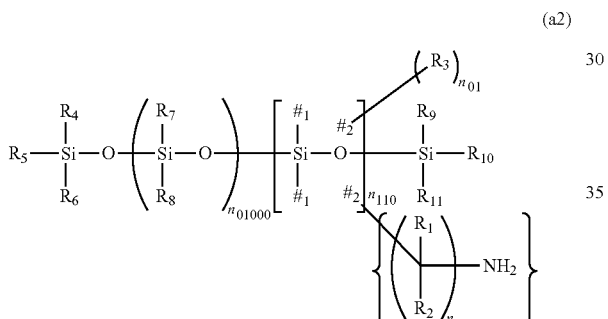

wherein in the formula (a2), $R_1$ to $R_{11}$ are independently a hydrogen atom, a $C_{1-6}$ alkyl group, or a $C_{1-6}$ alkoxy group; $n_{01000}$ is an integer of 0 to 1000; $n_{110}$ is an integer of 1 to 10; $n_{010}$ is an integer of 0 to 10; $n_{12}$ is an integer of 1 to 2; $n_{01}$ is an integer of 0 to 1; $n_{01}+n_{12}=2$; $\#_1$ and $\#_2$ represent bonding hands; $\#_1$ and $\#_2$ are bonded together and the compounds represented by the formula (a2) do not include the compounds represented by the formula (a1);

General Formula (a3):

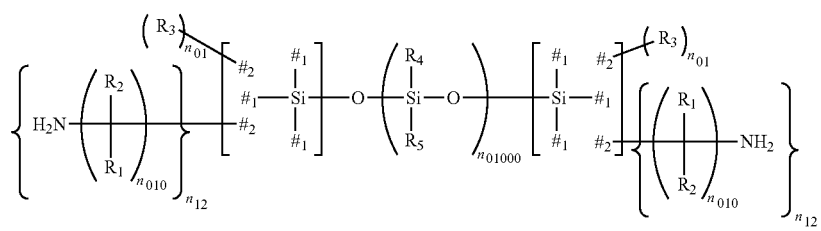

wherein in the formula (a3), $R_1$ to $R_5$ are independently a hydrogen atom, a $C_{1-6}$ alkyl group, or a $C_{1-6}$ group; $n_{01000}$ is an integer of 0 to 1000; $n_{010}$ is an integer of 0 to 10; $n_{01}$ is an integer of 0 to 2; $n_{12}$ is an integer of 1 to 3; $n_{01}+n_{12}=3$; $n_{01}$s and $n_{12}$s each may be the same as or different from one another; $\#_1$ and $\#_2$ represent bonding hands; and $\#_1$ and $\#_2$ are bonded together.

9. A method for producing a modified acrylic resin film (Cm), comprising the following step (S1):

Step (S1): the step of treating the surface of an acrylic resin film (Xm1) which has an anionic hydrophilic group and in which the concentration of the anionic hydrophilic groups at the surface is higher than the concentration of the anionic hydrophilic groups at the depth of half the film thickness from the surface with a compound (A) comprising, in the molecule, one or more of anionic hydrophilic groups forming an ion pair with an onium ion of an amino silicone, and one or more of groups selected from the group consisting of groups containing a polymerizable carbon-carbon double bond, amino groups, mercapto groups, and hydroxyl groups, wherein the amino silicone has a molecular weight of 100 to 1,000,000 and is one or more selected from compounds represented by the following general formulae (a1) to (a3):

General Formula (a1):

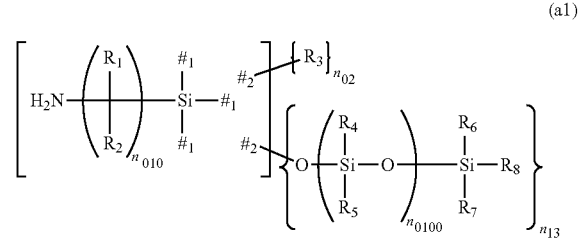

wherein in the formula (a1), $R_1$ to $R_8$ are independently a hydrogen atom, a $C_{1-6}$ alkyl group, or a $C_{1-6}$ alkoxy group; $n_{010}$ is an integer of 0 to 10; $n_{0100}$ is an integer of 0 to 100; $n_{02}$ is an integer of 0 to 2; $n_{13}$ is an integer of 1 to 3; $n_{02}+n_{13}=3$; $\#_1$ and $\#_2$ represent bonding hands; and $\#_1$ and $\#_2$ are bonded together;

General Formula (a2):

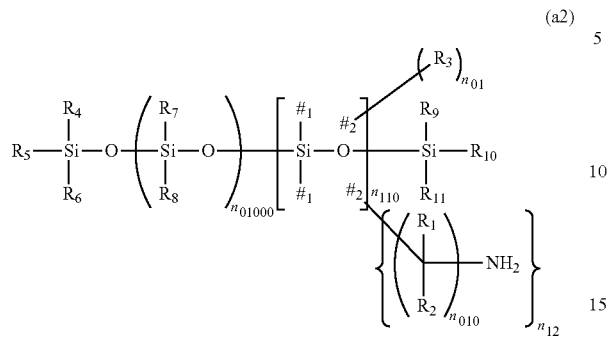

wherein in the formula (a2), $R_1$ to $R_{11}$ are independently a hydrogen atom, a $C_{1-6}$ alkyl group, or a $C_{1-6}$ alkoxy group; $n_{01000}$ is an integer of 0 to 1000; $n_{110}$ is an integer of 1 to 10; $n_{010}$ is an integer of 0 to 10; $n_{12}$ is an integer of 1 to 2; $n_{01}$ is an integer of 0 to 1; $n_{01}+n_{12}=2$; $\#_1$ and $\#_2$ represent bonding hands; $\#_1$ and $\#_2$ are bonded together; and the compounds represented by the formula (a2) do not include the compounds represented by the formula (a1);

General Formula (a3):

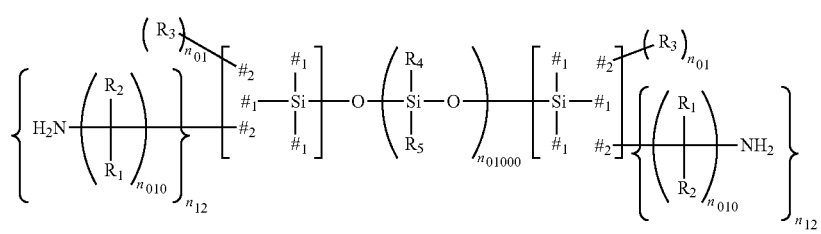

wherein in the formula (a3), $R_1$ to $R_5$ are independently a hydrogen atom, a $C_{1-6}$ alkyl group, or a alkoxy group; $n_{01000}$ is an integer of 0 to 1000; $n_{010}$ is an integer of 0 to 10; $n_{01}$ is an integer of 0 to 2; $n_{12}$ is an integer of 1 to 3; $n_{01}+n_{12}=3$; $n_{01}$s and $n_{12}$s each may be the same as or different from one another; $\#_1$ and $\#_2$ represent bonding hands; and $\#_1$ and $\#_2$ are bonded together.

10. A method for producing a laminate including a substrate and a modified acrylic resin film (Cm), comprising the following steps (S0) and (S1):

Step (S0): the step of forming an acrylic resin film (Xm) on the substrate;

Step (S1): the step of forming the modified acrylic resin film (Cm) by treating the surface of the acrylic resin film (Xm)

with a compound (A) comprising, in the molecule, one or more of anionic hydrophilic groups forming an ion pair with an onium ion of an amino silicone, and one or more of groups selected from the group consisting of groups containing a polymerizable carbon-carbon double bond, amino groups, mercapto groups, and hydroxyl groups, wherein the amino silicone has a molecular weight of 100 to 1,000,000 and is one or more selected from compounds represented by the following general formulae (a1) to (a3):

General Formula (a1):

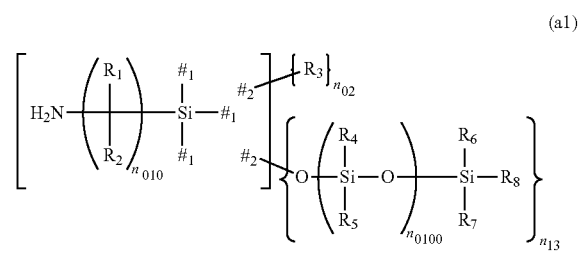

wherein in the formula (a1), $R_1$ to $R_8$ are independently a hydrogen atom, a $C_{1-6}$ alkyl group, or a $C_{1-6}$ alkoxy group; $n_{0101}$ is an integer of 0 to 10; $n_{0100}$ is an integer of 0 to 100; $n_{02}$ is an integer of 0 to 2; $n_{13}$ is an integer of 1 to 3; $n_{02}+n_{13}=3$; $\#_1$ and $\#_2$ represent bonding hands; and $\#_1$ and $\#_2$ are bonded together;

General Formula (a2):

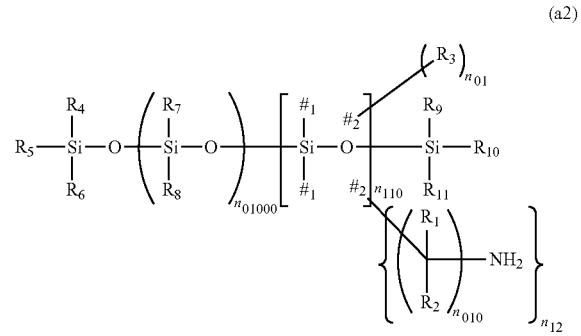

wherein in the formula (a2), $R_1$ to $R_{11}$ are independently a hydrogen atom, a $C_{1-6}$ alkyl group, or a $C_{1-6}$ alkoxy group; $n_{01000}$ is an integer of 0 to 1000; $n_{110}$ is an integer of 1 to 10; $n_{010}$ is an integer of 0 to 10; $n_{12}$ is an integer of 1 to 2; $n_{01}$ is an integer of 0 to 1; $n_{01}+n_{12}=2$; $\#_1$ and $\#_2$ represent bonding hands; $\#_1$ and $\#_2$ are bonded together; and the compounds represented by the formula (a2) do not include the compounds represented by the formula (a1);

General Formula (a3):

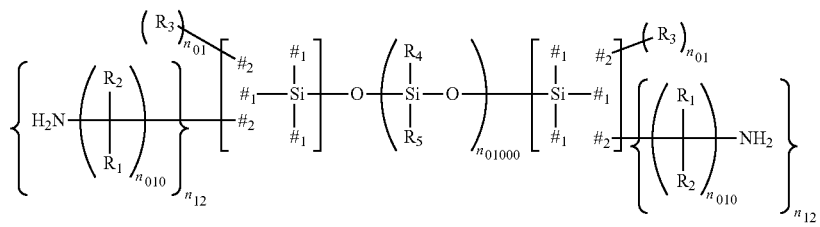

wherein in the formula (a3), $R_1$ to $R_5$ are independently a hydrogen atom, a $C_{1-6}$ alkyl group, or a $C_{1-6}$ alkoxy group; $n_{01000}$ is an integer of 0 to 1000; $n_{010}$ is an integer of 0 to 10; $n_{01}$ is an integer of 0 to 2; $n_{12}$ is an integer of 1 to 3; $n_{01}+n_{12}=3$; $n_{01}$s and $n_{12}$s each may be the same as or different from one another; $\#_1$ and $\#_2$ represent bonding hands; and $\#_1$ and $\#_2$ are bonded together.

11. A method for producing a laminate including a substrate and a modified acrylic resin film (Cm), comprising the following steps (S0-1) and (S1-1):

Step (S0-1): the step of forming, on the substrate, an acrylic resin film (Xm1) which has an anionic hydrophilic group and in which the concentration of the anionic hydrophilic groups at the surface is higher than the concentration of the anionic hydrophilic groups at the depth of half the film thickness from the surface;

Step (S1-1): the step of forming the modified acrylic resin film (Cm) by treating the surface of the acrylic resin film (Xm1)

with a compound (A) comprising, in the molecule, one or more of anionic hydrophilic groups forming an ion pair with an onium ion of an amino silicone, and one or more of groups selected from the group consisting of groups containing a polymerizable carbon-carbon double bond, amino groups, mercapto groups, and hydroxyl groups, wherein the amino silicone has a molecular weight of 100 to 1,000,000 and is one or more selected from compounds represented by the following general formulae (a1) to (a3):

General Formula (a1):

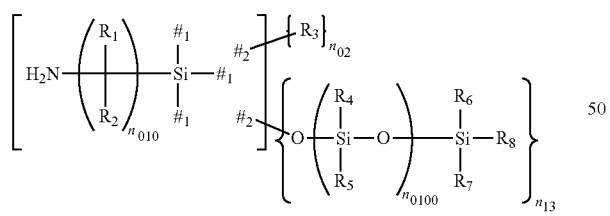

wherein in the formula (a1), $R_1$ to $R_8$ are independently a hydrogen atom, a $C_{1-6}$ alkyl group, or a $C_{1-6}$ alkoxy group; $n_{010}$ is an integer of 0 to 10; $n_{0100}$ is an integer of 0 to 100; $n_{02}$ is an integer of 0 to 2; $n_{13}$ is an integer of 1 to 3; $n_{02}+n_{13}=3$; $\#_1$ and $\#_2$ represent bonding hands; and $\#_1$ and $\#_2$ are bonded together;

General Formula (a2):

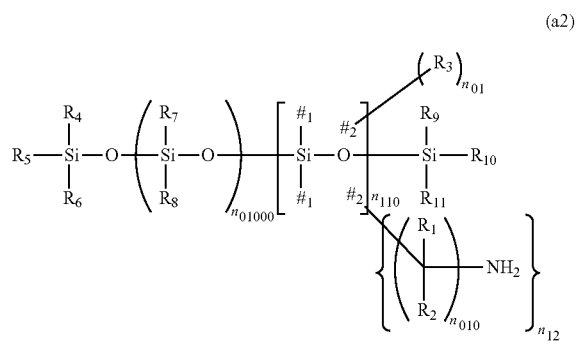

wherein in the formula (a2), $R_1$ to $R_{11}$ are independently a hydrogen atom, a $C_{1-6}$ alkyl group, or a $C_{1-6}$ alkoxy group; $n_{01000}$ is an integer of 0 to 1000; $n_{110}$ is an integer of 1 to 10; $n_{010}$ is an integer of 0 to 10; $n_{12}$ is an integer of 1 to 2; $n_{01}$ is an integer of 0 to 1; $n_{01}+n_{12}=2$; $\#_1$ and $\#_2$ represent bonding hands; $\#_1$ and $\#_2$ are bonded together; and the compounds represented by the formula (a2) do not include the compounds represented by the formula (a1);

General Formula (a3):

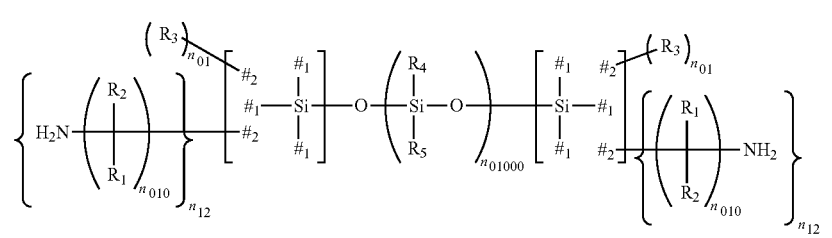

wherein in the formula (a3), $R_1$ to $R_5$ are independently a hydrogen atom, a $C_{1-6}$ alkyl group, or a $C_{1-6}$ alkoxy group; $n_{01000}$ is an integer of 0 to 1000; $n_{010}$ is an integer of 0 to 10; $n_{01}$ is an integer of 0 to 2; $n_{12}$ is an integer of 1 to 3; $n_{01}+n_{12}=3$; $n_{01}$s and $n_{12}$s each may be the same as or different from one another; $\#_1$ and $\#_2$ represent bonding hands; and $\#_1$ and $\#_2$ are bonded together.

12. The method for producing a laminate according to claim 11, wherein the acrylic resin film (Xm1) is such that the concentration of the anionic hydrophilic groups on the surface opposite to the side adjacent to the substrate constituting the laminate is higher than the concentration of the anionic hydrophilic groups at the depth of half the film thickness from the surface.

\* \* \* \* \*